(12) United States Patent
Nakayama

(10) Patent No.: US 6,865,299 B1
(45) Date of Patent: Mar. 8, 2005

(54) CODING APPARATUS AND METHOD

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 09/618,461

(22) Filed: Jul. 18, 2000

(30) Foreign Application Priority Data

| Jul. 27, 1999 | (JP) | ............................................ 11-212713 |
| Aug. 31, 1999 | (JP) | ............................................ 11-246722 |
| Apr. 14, 2000 | (JP) | ...................................... 2000-114178 |
| Apr. 14, 2000 | (JP) | ...................................... 2000-114179 |

(51) Int. Cl.$^7$ .............................................. G06K 9/46
(52) U.S. Cl. ...................................... 382/246; 382/240
(58) Field of Search ........................ 382/246, 232–233, 382/236, 238, 239, 245, 251, 244; 341/51, 65, 67, 63, 106, 107; 375/240.03, 240.11, 240.12, 240.18–240.2, 240.23, 240.25, 240.16; 358/476, 426.07–426.16; 709/247

(56) References Cited

U.S. PATENT DOCUMENTS

| 5,581,373 | A | | 12/1996 | Yoshida ........................ 358/476 |
| 5,751,860 | A | * | 5/1998 | Su et al. ........................ 382/244 |
| 5,764,374 | A | * | 6/1998 | Seroussi et al. ............. 382/244 |
| 5,801,650 | A | | 9/1998 | Nakayama ....................... 341/67 |
| 5,818,970 | A | | 10/1998 | Ishikawa et al. .............. 382/248 |
| 5,841,381 | A | | 11/1998 | Nakayama ....................... 341/67 |
| 5,960,116 | A | * | 9/1999 | Kajiwara ........................ 382/238 |
| 5,986,594 | A | | 11/1999 | Nakayama et al. .......... 341/107 |
| 6,233,355 | B1 | * | 5/2001 | Kajiwara ........................ 382/238 |
| 6,263,109 | B1 | * | 7/2001 | Ordentlich et al. .......... 382/232 |
| 6,272,180 | B1 | * | 8/2001 | Lei ............................ 375/240.16 |
| 6,560,365 | B1 | * | 5/2003 | Nakayama et al. .......... 382/233 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

A method of performing variable-length coding for a multilevel image with simple processing, and a processing apparatus for executing this variable-length coding method at a high speed have not been established yet. According to this invention, discrete wavelet transformation processing is performed for multilevel image data to quantize the image data in units of subblocks of respective frequency components. An optimal shift parameter is easily determined at a high speed for each subblock. This realizes high-speed variable-length coding based on the parameter.

59 Claims, 44 Drawing Sheets

FIG. 3

| FREQUENCY COMPONENT | QUANTIZATION STEP q |
|---|---|
| LL | 1 |
| HL3 | 2 |
| LH3 | 2 |
| HH3 | 2 |
| HL2 | 4 |
| LH2 | 4 |
| HH2 | 4 |
| HL1 | 8 |
| LH1 | 8 |
| HH1 | 8 |

FIG. 4

| V \ k | 0 | 1 | 2 |
|---|---|---|---|
| 0 | 1 | 10 | 100 |
| 1 | 01 | 11 | 101 |
| 2 | 001 | 010 | 110 |
| 3 | 0001 | 011 | 111 |
| 4 | 00001 | 0010 | 0100 |
| 5 | 000001 | 0011 | 0101 |
| 6 | 0000001 | 00010 | 0110 |
| 7 | 00000001 | 00011 | 0111 |

FIG. 5

| QUANTIZED VALUE | 3 | 8 | -2 | -5 | -4 | 0 | 1 |
|---|---|---|---|---|---|---|---|
| SIGN BIT | 0 | 0 | 1 | 1 | 1 | 0 | 0 |
| VARIABLE-LENGTH CODE AREA | 1 | 0 | 1 | 0 | 0 | 1 | 1 |
|  |  | 0 |  | 1 | 1 |  |  |
|  |  | 1 |  |  |  |  |  |
| FIXED-LENGTH CODE AREA | 1 | 0 | 1 | 0 | 0 | 0 | 0 |
|  | 1 | 0 | 0 | 1 | 0 | 0 | 1 |

(k = 2)

```
/* FOLLOWING PROCESSING IS PERFORMED FOR ALL
QUANTIZED ABSOLUTE VALUES V IN SUBBLOCK */ int t = V ;
int p = 0 ;            /* INITIALIZATION */
do {
    S[ p++ ] += t ;    /* Sp = Sp + (V>>p),p = p+1 */
} while ( t>>= 1 )     /* PROCESSING CONTINUES FOR (V>>p)>0 */
```

```
/* FOLLOWING PROCESSING IS PERFORMED FOR ALL
QUANTIZED ABSOLUTE VALUES V IN SUBBLOCK */ int  t = V ;
int  p = 0 ;            /* INITIALIZATION */
do {
    S[ p + + ] + = t ;   /* Sp = Sp + (V > > p), p = p+1          */
    B[ p ] + = (t & 1);  /* Bp = Bp + ((V > > p) &1 )             */
} while ( t > > = 1 )    /* PROCESSING CONTINUES FOR (V > > p) > 0 */
```

| INPUT: 15 BITS | OUTPUT: 4 BITS |
|---|---|
| 000000000000000 | 0000 |
| 100000000000000 | 0001 |
| 110000000000000 | 0010 |
| 111000000000000 | 0011 |
| 111100000000000 | 0100 |
| 111110000000000 | 0101 |
| 111111000000000 | 0110 |
| 111111100000000 | 0111 |
| 111111110000000 | 1000 |
| 111111111000000 | 1001 |
| 111111111100000 | 1010 |
| 111111111110000 | 1011 |
| 111111111111000 | 1100 |
| 111111111111100 | 1101 |
| 111111111111110 | 1110 |
| 111111111111111 | 1111 |

F I G. 42

| OUTPUT FROM THIRD COMPARATOR | 0 | 0 | 1 | 1 | 1 | 1 |
|---|---|---|---|---|---|---|
| OUTPUT FROM FIRST COMPARATOR | 0 | 1 | 0 | 1 | 1 | 1 |
| OUTPUT FROM SECOND COMPARATOR | 0 | 0 | 0 | 1 | 0 | 1 |
| OUTPUT FROM FOURTH COMPARATOR | 0 | 0 | 0 | 0 | 0 | 1 |
| COUNT AMOUNT | +4 | +1 | ±0 (STOP) | -1 | -4 | |

CODING APPARATUS AND METHOD

FIELD OF THE INVENTION

The present invention relates to a coding apparatus and method for performing variable-length coding for multilevel image data.

BACKGROUND OF THE INVENTION

In general, an image, and particularly a multilevel image contain many pieces of information. In accumulating/transmitting such an image, the processing data amount is very large. To prevent this, an image is accumulated/transmitted using high-efficiency coding of reducing the data amount by removing the redundancy of the image while degradation of the image quality is permitted to a certain degree.

One of the high-efficiency coding methods is JPEG compression coding. According to this method, a multilevel image is transformed into a frequency component by DCT (Discrete Cosine Transformation) in units of blocks, and the obtained transformation coefficient is quantized to achieve variable-length coding.

In coding using DCT, a high compression ratio causes a block distortion in a decoded image. To solve this distortion, a new coding method using wavelet transformation has recently been proposed.

Variable-length coding is often applied as part of various high-efficiency coding methods.

However, a method of performing variable-length coding for a multilevel image with simple processing, and a processing apparatus for executing this variable-length coding method at a high speed have not been established yet.

SUMMARY OF THE INVENTION

The present invention has been proposed to solve the conventional problems, and has as its object to provide a coding apparatus and method for easily performing variable-length coding for a multilevel image at a high speed.

According to the present invention, the foregoing object is attained by providing a coding method of coding a symbol set at a variable-length code portion and a fixed-length code portion on the basis of a parameter, comprising the step of evaluating a code amount at the variable-length code portion for respective values of the parameter, thereby determining an optimal value of the parameter.

In accordance with the present invention as described above, a parameter applied to coding can be determined at a high speed by a simple method.

According to the present invention, the foregoing object is attained by providing a coding apparatus for performing discrete wavelet transformation for two-dimensional image data to quantize and code the image data, comprising:

means for quantizing the image data in units of subblocks of respective frequencies obtained by discrete wavelet transformation in accordance with quantization coefficients set for the respective subblocks; and means for, when each quantized subblock is coded at a fixed-length code portion and a variable-length code portion in accordance with a shift parameter, evaluating a code amount at the variable-length code portion while the shift parameter is changed stepwise, thereby determining the shift parameter.

In accordance with the present invention as described above, a shift parameter used in performing discrete wavelet transformation for a two-dimensional image and quantizing and coding the image can be determined at a high speed by a simple arrangement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of the quantization step used for the frequency component (subblock);

FIG. 4 is a table showing an example of a code obtained by Golomb Rice coding;

FIG. 5 is a table showing an example of a Golomb Rice code for each bit plane in the embodiment;

FIG. 42 is a view showing a control example of an up/down counter in the 29th embodiment.

DETAILED DESCRIPTION OF THE PREFERRED EMBODIMENTS

Preferred embodiments of the present invention will now be described in detail in accordance with the accompanying drawings.

<First Embodiment>

The first embodiment will exemplify coding of 8-bit monochrome image data. However, the present invention is not limited to this, and can also be applied to coding of a monochrome image having pixels each expressed by 4 bits, or a color multilevel image having color components (RGB/Lab/YCrCb) expressed by 8 bits in each pixel. When the present invention is applied to a color multilevel image, the image is coded by processing each color component as a monochrome image.

Figure 1:
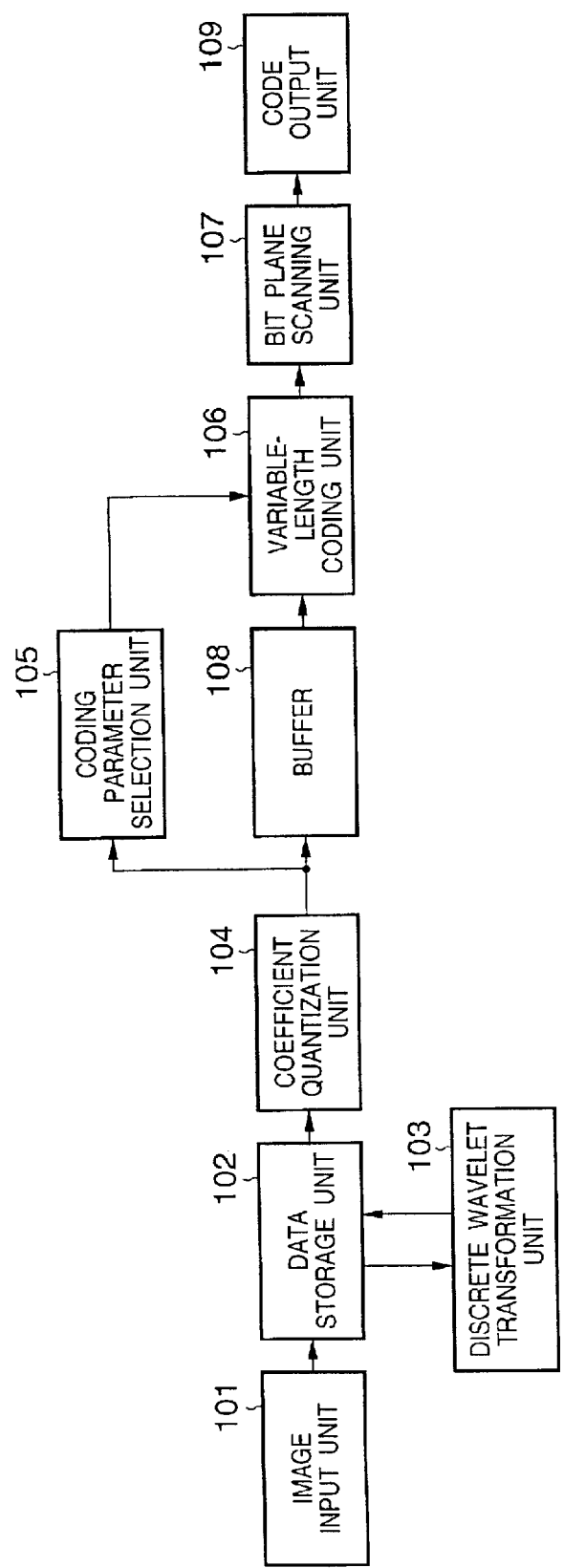
FIG. 1 is a block diagram showing the arrangement of a coding apparatus in an embodiment according to the present invention.

FIG. 1 is a block diagram showing the arrangement of a coding apparatus to which each embodiment of the present invention is applied. In FIG. 1, reference numeral 101 denotes an image input unit; 102, a data storage unit; 103, a discrete wavelet transformation unit; 104, a coefficient quantization unit; 105, a coding parameter selection unit; 106, a variable-length coding unit; 107, a bit plane scanning unit; 108, a buffer; and 109, a code output unit.

The image input unit 101 inputs image data to be coded in the raster scan order. Examples of the image input unit 101 include an image sensing apparatus such as a scanner or digital camera, an image sensing device such as a CCD, and image data input processing via the interface of a network line.

An image may be input to a recording medium such as a RAM, ROM, hard disk, or CD-ROM.

The data storage unit 102 is constituted by, e.g., a RAM, and stores image data input from the image input unit 101. The data storage unit 102 may be constituted by a recording medium such as an MO, hard disk, or magnetic tape.

The discrete wavelet transformation unit 103 performs well-known discrete wavelet transformation for image data of one frame stored in the data storage unit 102, and decomposes the data into a plurality of frequency bands. In the first embodiment, discrete wavelet transformation for an image data stream x(n) is executed by $$r(n)=\text{floor}\{(x(2n)+x(2n+1))/2\}$$

$$d(n)=x(2n+2)-x(2n+3)+\text{floor}\{(-r(n)+r(n+2)+2)/4\}$$

In these equations, r(n) and d(n) are transformation coefficients, r(n) is a low-frequency component, and d(n) is a high-frequency component.

Figure 2A:
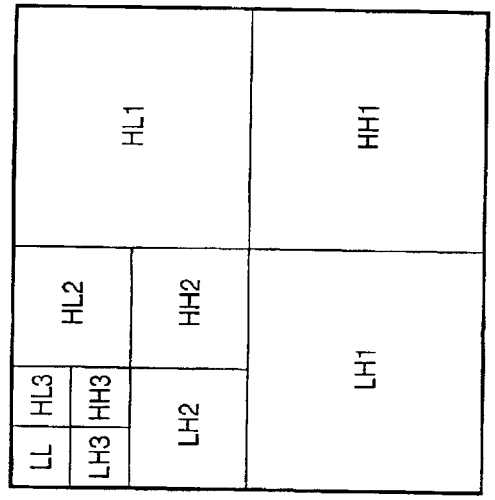
FIGS. 2A to 2C are views each showing a discrete wavelet transformation state.

In these equations, floor{X} is the maximum integer value not exceeding X. These transformation equations are for one-dimensional data. This transformation can be sequentially applied in the horizontal and vertical directions to realize two-dimensional transformation. The two-dimensional transformation is done for an input image data stream to divide it into four frequency bands (subblocks) LL, HL, LH, and HH, as shown in FIG. 2A. These transformed data are smoothly output to the coefficient quantization unit 104, or stored in the data storage unit 102 in order to further perform wavelet transformation.

Figure 2B:
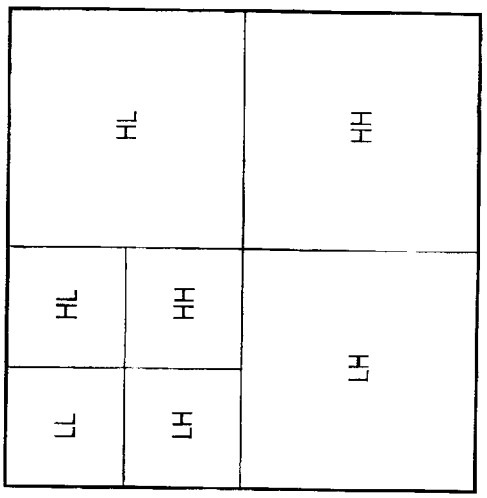
Figure 2C:
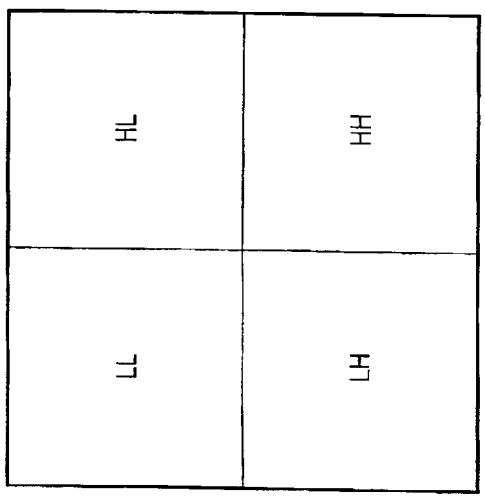

Discrete wavelet transformation is further done for the generated LL component by the same procedures as described above to divide it into seven frequency bands (subblocks), as shown in FIG. 2B. Discrete wavelet transformation is done again to divide the image data stream into 10 frequency bands (subblocks) LL, HL3, LH3, HH3, HL2, LH2, HH2, HL1, LH1, and HH1. The transformation coefficients are stored in the data storage unit 102.

The transformation coefficients are output from the data storage unit 102 to the coefficient quantization unit 104 in the order of the subblocks LL, HL3, LH3, HH3, HL2, LH2, HH2, HL1, LH1, and HH1 and in the raster scan order for each subblock.

The coefficient quantization unit 104 quantizes each wavelet transformation coefficient for each frequency component by a predetermined quantization step, and outputs the quantized value to the coding parameter selection unit 105 and buffer 108.

Letting X be the coefficient value, and q be the value of the quantization step for a frequency component belonging to this coefficient, a quantized value Q(X) after quantization is given by $$Q(X)=\text{floor}\{(X/q)+0.5\}$$

FIG. 3 shows the relationship between each frequency component and the quantization step in the first embodiment. As shown in FIG. 3, the quantization step is larger for a high-frequency component (HL1, LH1, HH1, or the like) than for a low-frequency component (LL or the like). This reduces information of the high-frequency component at which visual degradation is hardly be noticeable, and increases the compression ratio.

The quantized value is evaluated by the coding parameter selection unit 105, and held in the buffer 108 until the variable-length coding unit 106 determines a k parameter necessary for coding the quantized value.

The coding parameter selection unit 105 selects a k parameter used by the variable-length coding unit 106 on the basis of the quantized value.

The "k parameter" is a value representing the code length of a fixed-length portion in performing variable-length coding called Golomb Rice coding. For descriptive convenience, Golomb Rice coding processing in the variable-length coding unit 106 will be explained before a description of the coding parameter selection unit 105.

The basic method of Golomb Rice coding processing in the variable-length coding unit 106 is well known, and the basic operation of this coding and the features of the present invention will be described.

First, data of one subblock are sequentially read out from the buffer 108 which stores quantized values. Then, the variable-length coding unit 106 executes the following pre-processing and Golomb Rice coding processing based on a k parameter corresponding to the subblock.

The variable-length coding unit 106 checks whether each input quantized value is positive/negative, and outputs a sign bit. More specifically, when the quantized value is 0 or positive, the variable-length coding unit 106 outputs "0", or when the quantized value is negative, outputs "1". Then, the variable-length coding unit 106 transforms the quantized value into an absolute value.

Strictly speaking, this processing is not included in Golomb Rice coding processing. In the first embodiment, however, this processing is executed as pre-processing of Golomb Rice coding in the variable-length coding unit 106.

The absolute value undergoes Golomb Rice coding. Letting V be the absolute value of a quantized value to be coded, and k be the value of a k parameter applied to a subblock to be processed, Golomb Rice coding processing is performed by the following procedures.

Binary V is shifted to the right by k bits, "0"s are successively arranged in correspondence with the obtained value, and "1" is arranged as a delimiter bit. Then, the lower k bits of original V are arranged to generate a variable-length code (Golomb Rice code).

FIG. 4 shows an example of the Golomb Rice code for V=0 to 7 and k=0, 1, and 2. For V=4 and k=1, 4 is expressed by "100B (B represents a binary number)". After V is shifted to the right by the k (=1) bit, the remainder is "10B", i.e., "2". Thus, two "0"s, a delimiter "1", and the lower k (=1) bit of 4 (=100B) are arranged to obtain "0010".

As is apparent from FIG. 4, the code length of each variable-length code obtained by the absolute value V and k parameter is easily estimated to be V>>k (value obtained by shifting V to the right by k bits)+1 (delimiter bit)+k (parameter value) bits. If a sign bit representing a positive or negative value is added, the code length further increases by 1 bit.

As is apparent from FIG. 4, the Golomb Rice code length for the quantized value V=0 is shorter for the k parameter=0 than for k=1, 2. This means that coding with a smaller k parameter is suitable because quantized values to be coded concentrate to 0.

The code table as shown in FIG. 4 need not be actually held for Golomb Rice coding, and coding/decoding can be executed by simple calculation. Invariable-length coding such as general Huffman coding, a table representing a variable-length code for a value to be coded must be held. Particularly when a plurality of variable-length codes are properly switched for a value to be coded, a plurality of tables must be prepared.

In this manner, coded data made up of a sign bit (representing +/−) for an input quantized value and a variable-length code (Golomb Rice code) is generated and output to the bit plane scanning unit 107.

The processing principle of generating the k parameter necessary for the variable-length coding unit 106 by the coding parameter selection unit 105 will be explained.

Letting p be the k parameter value, a total code amount T of a subblock to be coded is given by $$T_p = \Sigma(Vi\!>\!>\!p \text{ (value obtained by shifting } Vi \text{ to the right by } p \text{ bits})+2 \text{ (sign bit and delimiter bit)}+p) \quad (1)$$

Assuming that the number of quantized values in a subblock to be coded is N, equation (1) is rewritten into $$T_p = (p+2) \times N + \Sigma Vi\!>\!>\!p \quad (2)$$

In equation (2), the first term: (p+1)×N represents a code amount at a fixed-length code portion, and the second term: ΣVi>>p represents a code amount at a variable-length code portion. Only the second term, i.e., variable-length code amount is expressed as $S_p$:

$$S_p = \Sigma Vi\!>\!>\!p \quad (3)$$

$S_p$ is larger for a smaller p value. To the contrary, the code amount at the fixed-length code portion increases in proportion to the p value, and when p increases by one, the code amount-increases by N bits.

The number of "1"s in each bit plane for binary Vi will be considered. Letting $B_{p+1}$ be the number of "1"s in the least significant bit plane of ΣVi>>p, and $B_{p+1}$ is given by $$B_{p+1} = \Sigma(Vi\!>\!>\!p)\&1 \quad (4)$$

That is, $B_1$ represents the number of "1"s in the least significant bit plane of Vi, and $B_2$ represents the number of "1"s in the second plane from the least significant bit of Vi. From this, the relation:

$$\Sigma Vi\!>\!>\!p = 2 \times \Sigma Vi\!>\!>\!(p+1) + \Sigma(Vi\!>\!>\!p)\&1 \quad (5)$$

and from equations (3) and (4), the relation:

$$S_p = 2 \times S_{p+1} + B_{p+1} \quad (6)$$

are obtained.

Letting $D_p$ be the difference between $S_{p-1}$ and $S_p$ whose k parameter values are different by one, $$D_p = S_{p-1} - S_p = (2 \times S_p + B_p) - S_p = S_p + B_p \, (p \geq 1) \quad (7)$$

$D_p$ represents an increase in variable-length code amount by changing the k parameter value from p to p−1. If $D_p$ is smaller than N, the total code amount decreases by $N-D_p$, and thus the k parameter value is set to p−1 more efficiently than p. If $D_p \geq N$, the k parameter value is preferably set to p.

Similarly, let $DD_p$ be the difference between $S_{p-2}$ and $S_p$ whose k parameter values are different by two, i.e., $DD_p = S_{p-2} - S_p$. If $DD_p$ is smaller than 2N, changing the k parameter value from p to p−2 decreases the variable-length code amount by $2N-DD_p$, and thus the k parameter value is set to p−2 more preferably than p. If $DD_p \geq 2N$, the k parameter value is preferably set to p.

Equation (7) is rewritten into $$\begin{aligned} D_{p-1} &= S_{p-1} + B_{p-1} \\ &= (2 \times S_p + B_p) + B_{p-1} \\ &= (S_p + B_p) + S_p + B_{p-1} \\ &= D_p + S_p + B_{p-1} \end{aligned}$$

Since $S_p, B_{p-1} \geq 0$, $$D_{p-1} \geq D_p \quad (8)$$

From equation (8) and the above description, "A sequence: $D_1, D_2, D_3, \ldots, D_{p-1}, D_{p+1}, \ldots, D_m$ has a relation: $D_1 \geq D_2 \geq D_3 \geq \ldots \geq D_{p-1} \geq D_p \geq D_{p-1} \geq \ldots \geq D_m$. If q satisfying $D_q \geq N \geq D_{q+1}$ exists, q is one of optimal k parameter values (N is the number of quantized values in the subblock)."

The "optimal value" means a value, which minimizes the total code amount in Golomb Rice coding, m is the largest p value among $B_p \neq 0$, and $S_m$ corresponding to this m is 0. This is because shifting the largest quantized absolute value to the right by m bits results in zero. Hence, $D_m = B_m \leq N$ holds.

More specifically, if the k parameter changes from q to q+1, the code amount increases by $N-D_{q+1}$, and if the k parameter changes from q to q−1, the code amount increases by $D_q - N$. However, for $D_{q+1} = N$ or $D_q = N$, the code amount does not increase and remains minimum. For $D_{1+1} = N$, q+1 becomes an optimal value, and for $D_q = N$, q−1 also becomes an optimal value.

The k parameter has a maximum of three optimal values. As such conditions, $D_q = N = D_{q+1}$ is established, and in other words, $S_{q-1} = 0$, $S_q = N$, and $S_{q+1} = 2N$ hold. At this time, q−1, q, and q+1 are optimal k parameter values, and the total code amount T takes an extreme value (minimum value). Therefore, as the k parameter moves apart from the optimal value, the total code amount increases.

If no q exists, $N > D_1$ is established. In this case, a k parameter value of 0 minimizes the total code amount. The total code amount monotonically increases with a change (increase) in the k value.

To generalize the relationship between the sequence nd the optimal value, $D_0 = D_1 + 2N$ is defined. From this, "A sequence: $D_0, D_1, D_2, D_3, \ldots, D_{p-1}, D_p, D_{p+1}, \ldots, D_m$ has a relation: $D_0 \geq D_1 \geq D_2 \geq D_3 \geq \ldots \geq D_{p-1} \geq D_p \geq D_{p+1} \geq \ldots \geq D_m$. If q satisfying $D_q \geq N \geq D_{1+1}$ exists, q is one of optimal k parameter values."

Accordingly, the presence of the optimal value q is specified.

The principle of coding parameter selection processing in the first embodiment has been described. This principle is similarly applied to the following embodiments.

According to the above principle, the local minimum value of the total code amount Tk with respect to a change in the k parameter is a global minimum value in the whole range of the k parameter. In searing for an optimal k parameter value, whether the total code amount Tk is minimized need not be evaluated for all k values, and only a k value at which Tk is locally minimized is searched. This simplifies the k parameter search method.

From the above-described relationships, several methods (embodiments of the present invention) for determining an optimal k parameter value can be taken. One method according to the first embodiment is shown in the flow chart of FIG. 7.

The code amount $S_p$ (p=0, 1, 2, . . . , m−1) at the variable-length code portion is calculated in step S501, and the maximum p value for $S_p \neq 0$ is incremented by one in step S501a to obtain m.

This m is set to i in step S502, and $D_i = S_{i-1} - S_i$ is calculated in step S503.

$D_i$ is compared with N in step S504. If Di<N (YES in step S504), the flow shifts to step S505; and if NO, to step S507.

In step S505, i=i−1 is calculated to update the candidate value of the k parameter. In step S506, whether the updated i value is 0 is checked. If YES in step S506, the flow shifts to step S507; and if NO, to step S503 to continue loop processing.

In step S507, i is determined as a k parameter value.

Figure 8:
FIG. 8 is a view showing an example of a program for calculating a code amount $S_p$ of a variable-length code for each k parameter value.

FIG. 8 shows a calculation program example (written in the C language) for the code amount $S_p$ at the variable-length code portion in step S501. In this example, addition is performed at least once even for V=0. Alternatively, a do-while statement may be executed only when $V \neq 0$ is detected by an if statement.

After processing in FIG. 8 is performed for all (N) V in the subblock, the upper limit candidate value m of the k parameter is obtained in step S501a. This value is obtained by calculating in advance the theoretical maximum value of the variable p in FIG. 8 from the theoretical maximum value of V, and sequentially evacuating values in S[ ].

In step S502, m is set to i.

In step S503, $D_m = S_{m-1} - S_m$ is calculated. This $D_m$ is the smallest among all $D_i$, is N at maximum, and does not exceed N. This indicates the number of "1"s in the bit plane of the most significant bit ($\neq 0$) of the largest value V.

$D_{1(-m)} < N$ is determined in step S504, and the flow advances to step S505.

The value i is decremented by one from m to become m−1 in step S505, and whether the value i is 0 is checked in step S506. In this case, $i \neq 0$ is determined, and the flow returns to step S503.

Processing in steps S503 to S506 is repetitively executed, and if $D_i > N$ or i=0 is determined, the code amount does not decrease even by changing the k parameter value. Thus, the flow escapes to step S507 to determine i as a k parameter value.

The coding parameter selection unit 105 derives an optimal k parameter by the above processing, and the variable-length coding unit 106 executes coding processing based on the k parameter. Coded data is output to the bit plane scanning unit 107.

The bit plane scanning unit 107 receives coded/output data for respective quantized values, rearranges them in units of bit planes, and outputs the rearranged data. The bit plane scanning unit 107 performs this processing in units of frequency components (subblocks).

First, the bit plane scanning unit 107 divides coded data generated by the variable-length coding unit 106 into a fixed-length code portion determined by the k parameter value and a variable-length code portion. Note that the code contains a 1-bit fixed sign bit.

Then, the bit plane scanning unit 107 starts scanning from important information. First, the bit plane scanning unit 107 scans sign bits for all the quantized values in the subblock. Then, the bit plane scanning unit 107 sequentially scans the variable-length code portion having information about the upper bits of the quantized value from the upper bit plane. Finally, the bit plane scanning unit 107 sequentially scans the fixed-length code portion from the upper bit plane.

FIG. 5 shows an example of a Golomb Rice code (divided into a variable-length code portion and fixed-length code portion) for each quantized value that is generated for a k parameter of 2 in this embodiment, and the scanning order of the Golomb Rice code.

Scanning at the variable-length code portion will be described in detail with reference to FIG. 5. Since the code length of the variable-length code is not constant, arrangement of short and long codes is not uniquely determined. In the first embodiment, short and long codes are arranged such that the first bits of variable-length codes are aligned on the same plane. That is, the variable-length code is arranged and embedded in the variable-length code area shown in FIG. 5 from the top. When the bit plane information is scanned from the upper bit, no information is found from an intermediate plane on a short code, and scanning of the short code is skipped. Hence, information (code bits) to be scanned becomes smaller as scanning comes close to a low bit plane.

Figure 6:
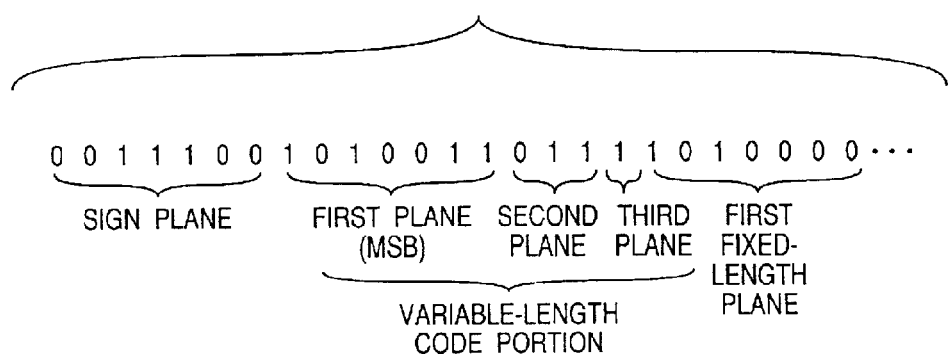
FIG. 6 is a view showing an example of a finally output bit stream in the embodiment.

FIG. 6 shows the arrangement of bit information obtained by scanning the code shown in FIG. 5 from the above-mentioned order (sign bit, variable-length code, and fixed-length code).

The bit plane scanning unit 107 executes this bit plane scanning in units of subblocks in the order of LL, HL3, LH3, HH3, HL2, LH2, HH2, HL1, LH1, and HH1.

Bit streams output from the bit plane scanning unit 107 are sequentially transferred from the code output unit 109. The transfer destination may be a recording medium such as a hard disk or DVD, or an interface such as the Internet, general public line, or radio channel.

Coded data generated in the first embodiment appropriately contains, as accessory information, various pieces of information necessary for decoding, i.e., the image size, the number of bits per pixel, the quantization step for each frequency component, and the k parameter value.

As described above, the first embodiment can determine an optimal parameter at a high speed by evaluating only the difference value between code amounts at variable-length code portion for respective parameter values in coding a symbol at the variable-length code portion and fixed-length code portion based on a given parameter.

<Second Embodiment>

The second embodiment according to the present invention will be described. The arrangement of a coding apparatus in the second embodiment is the same as in FIG. 1.

A method slightly different from the parameter selection method, i.e., k parameter generation method in the coding parameter selection unit 105 of the first embodiment will be described with reference to FIG. 9. The same reference numerals as in FIG. 7 in the first embodiment denote the same processing steps.

The second embodiment uses equation (7): $D_p = S_p + B_p$. Step S901 replaces step S501, and step S903 replaces step S503.

The code amount $S_p$ (p=0, 1, 2, ..., m−1) and the number $B_p$ (p=0, 1, 2, ..., m−1) of "1"s in each bit plane are calculated in step S901, and $D_i = S_i + B_i$ is calculated in step S903.

Figure 10:
FIG. 10 is a view showing a program for calculating both the code amount $S_p$ and the number $B_p$ of "1"s in each bit plane.

FIG. 10 shows a calculation program example (written in the C language) for $S_p$ and $B_p$ in step S901. Accumulation processing is done for $S_0$ and $B_1$ in the first cycle of a do-while statement in this program, and for $S_{p-1}$ and $B_p$ in the pth cycle.

The most striking feature of the second embodiment is calculation of $D_i$ by equation (7). For this purpose, necessary $S_i$ and $B_i$ are obtained in step S901, and $D_i$ is calculated in step S903. The remaining processing is the same as in the first embodiment, and a description thereof will be omitted.

<Third Embodiment>

The third embodiment according to the present invention will be described. The arrangement of a coding apparatus in the third embodiment is the same as in FIG. 1.

Figure 11:
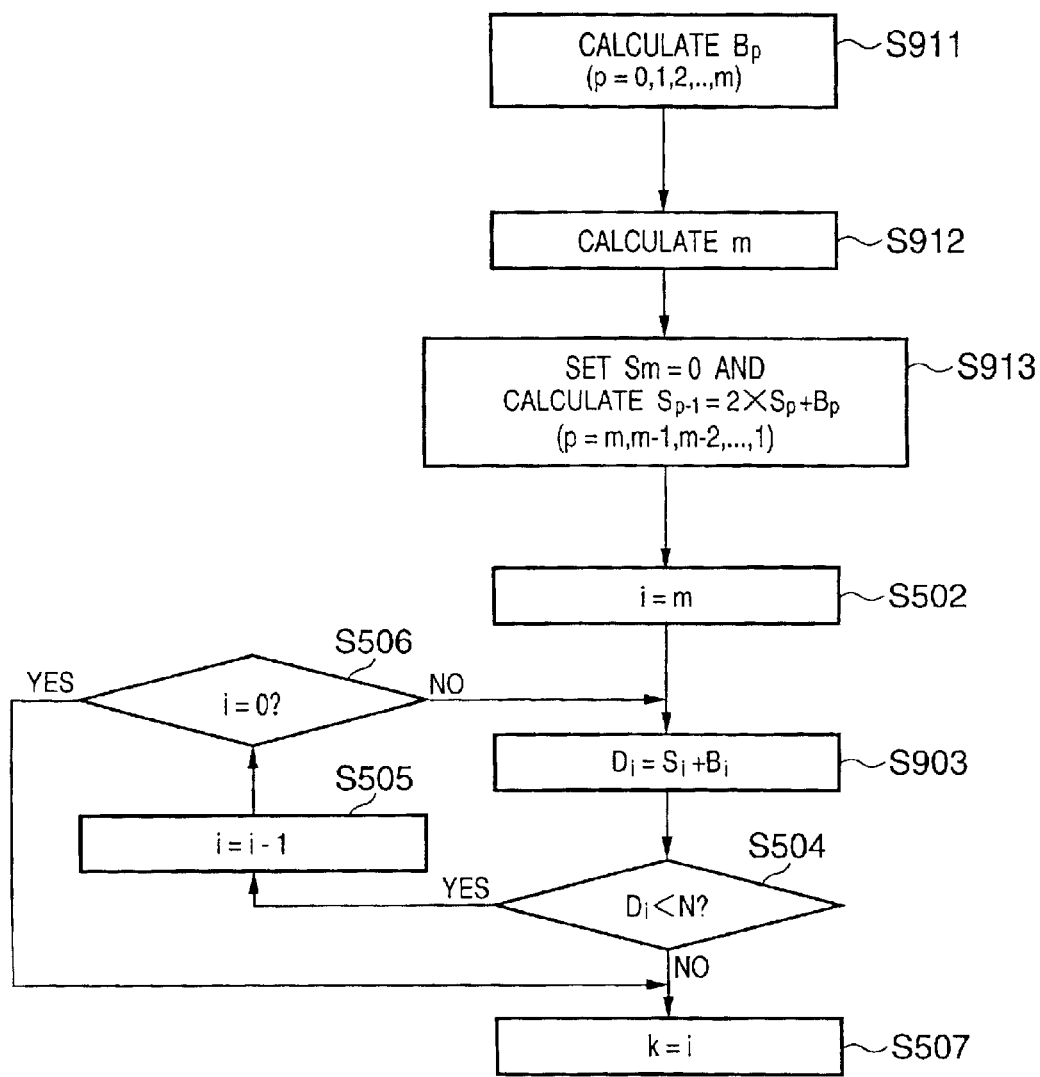
FIG. 11 is a flow chart showing parameter selection processing in the third embodiment.

A method slightly different from the k parameter generation method in the second embodiment will be described with reference to FIG. 11. The same reference numerals as in FIG. 9 in the second embodiment denote the same processing steps.

The third embodiment uses equation (6): $S_p = 2 \times S_{p+1} + B_{p+1}$. That is, calculation of $S_p$ and $B_p$ (p=0, 1, 2, ..., m) in Step S901 of the second embodiment is replaced by processing in steps S911 to S913 shown in FIG. 11.

In step S911, $B_p$ (p=0, 1, 2, ..., m) is calculated.

In step S912, the maximum value m of p for $B_p \neq 0$ is calculated.

In step S913, $S_m$ is initialized to 0, and $S_{p-1} 1 = 2 \times S_p + B_p$ (p=m, m−1, m−2, ..., 1) is calculated.

The remaining processing is the same as in the second embodiment, and a description thereof will be omitted. Note that processing in step S913 may be changed to "initialize $S_{m-1}$ to $B_m$, and calculate $S_{p-1} = 2 \times S_p + B_p$ (p=m−1, m−2, ..., 1)".

<Fourth Embodiment>

The fourth embodiment according to the present invention will be described. The arrangement of a coding apparatus in the fourth embodiment is the same as in FIG. 1.

The fourth embodiment uses an equality: $D_p \geq S_p$ easily derived from equation (7): $D_p = S_p + B_p$. From $D_p \geq S_p$, if $S_p < N$, $D_p < N$ holds.

Figure 9:
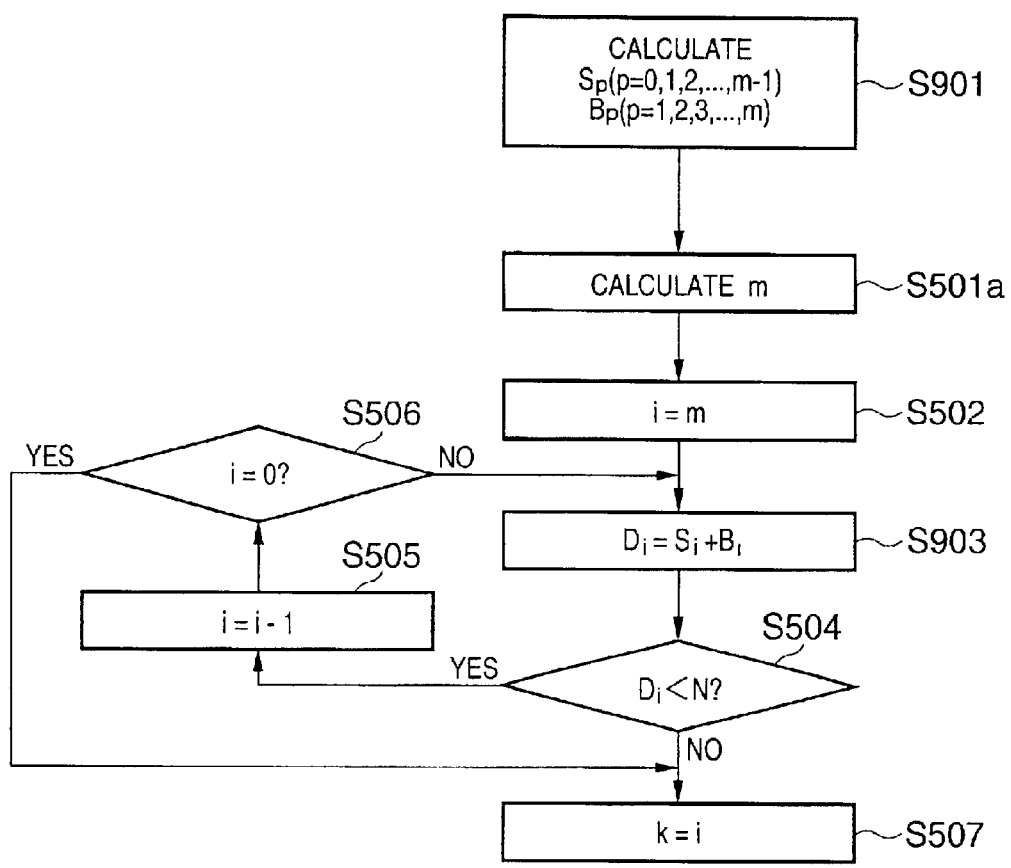
FIG. 9 is a flow chart showing parameter selection processing in the second embodiment.
Figure 12:
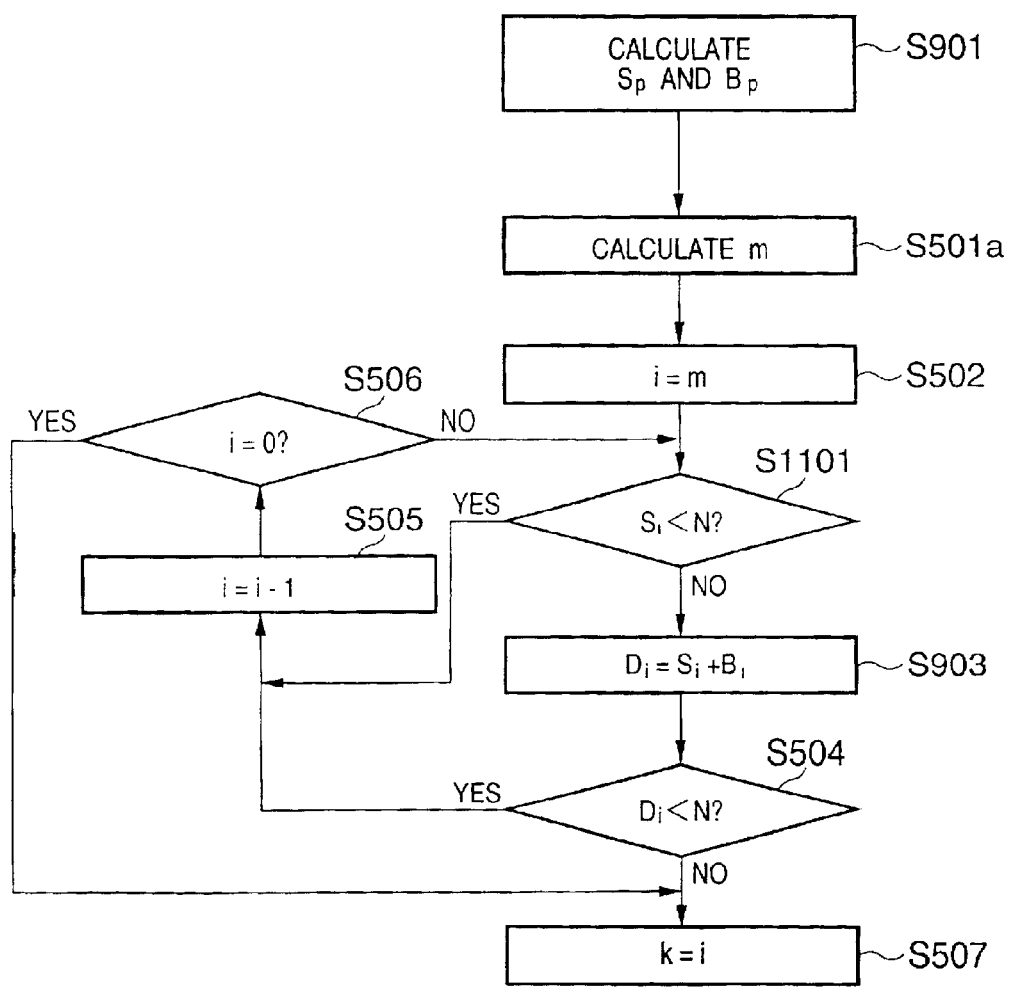
FIG. 12 is a flow chart showing parameter selection processing in the fourth embodiment.

In the fourth embodiment, in the flow chart shown in FIG. 12, step S1101 of checking whether $S_i < N$ is established is inserted before step S903 in FIG. 9 according to the second embodiment. If this relation is established, the flow skips steps S903 and S904.

Note that the fourth embodiment can also be applied to the first embodiment. In this case, step S1101 is inserted before step S503 in FIG. 7, and if the above relation is established, the flow skips steps S503 and S504.

<Fifth Embodiment>

The fifth embodiment according to the present invention will be described. The arrangement of a coding apparatus in the fifth embodiment is the same as in FIG. 1.

A method slightly different from the coding parameter selection methods in the first and second embodiments will be described.

The fifth embodiment uses the difference between $S_{p-2}$ and $S_p$ whose k parameter values are different by two, i.e., $DD_p = S_{p-2} - S_p$.

As described in the first embodiment, if $DD_p$ is smaller than 2N, changing the k parameter value from p to p−2 decreases the variable-length code amount by $2N - DD_p$, and thus the k parameter value is set to p−2 more preferably than p. If $DD_p \geq 2N$, the k parameter value is preferably set to p.

Using $DD_p$ can update the candidate value of the k parameter at a high speed in units of 2.

Figure 13:
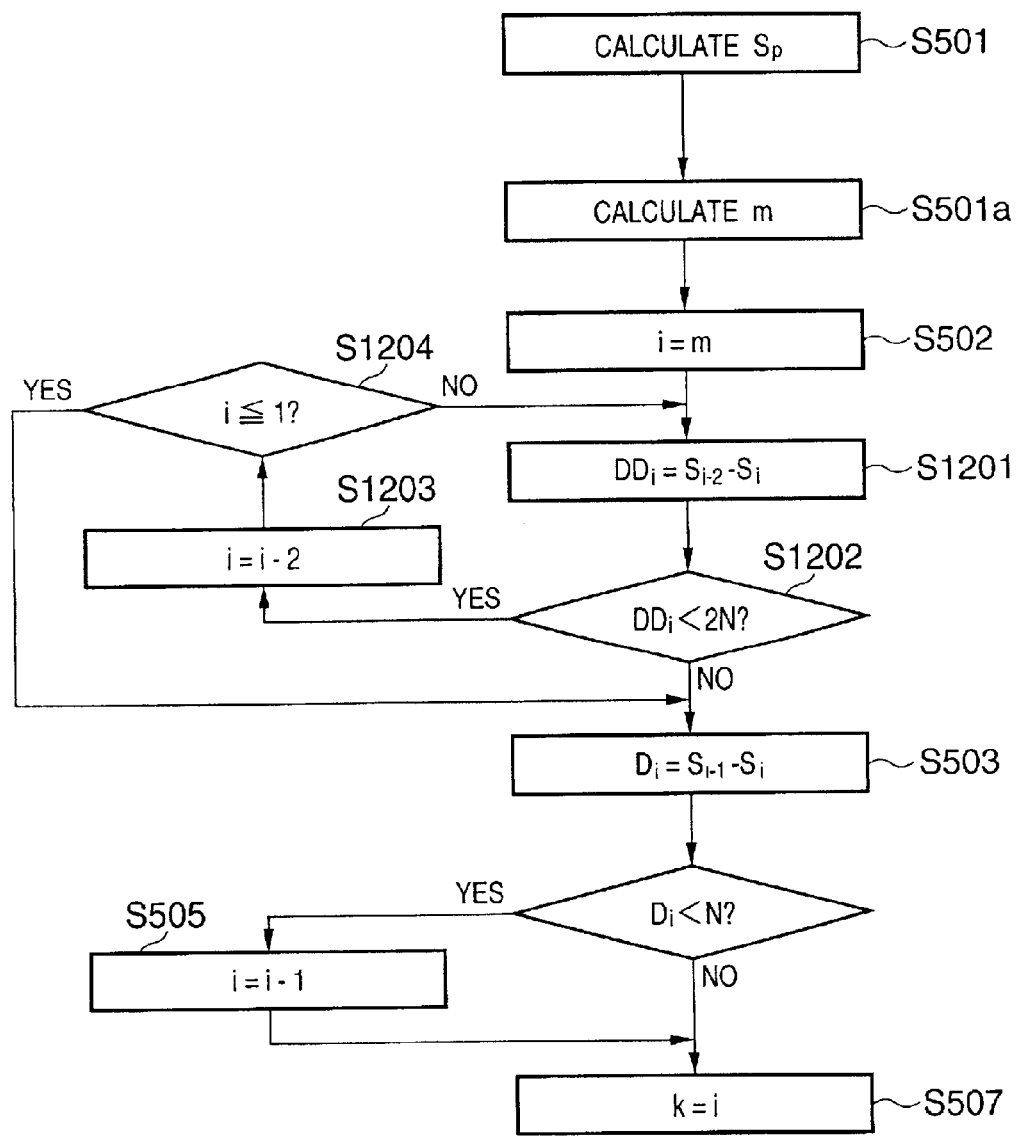
FIG. 13 is a flow chart showing parameter selection processing in the fifth embodiment.

FIG. 13 is a flow chart showing a parameter selection method in the fifth embodiment. The same reference numerals as in FIG. 7 in the first embodiment denote the same processing steps.

Figure 7:
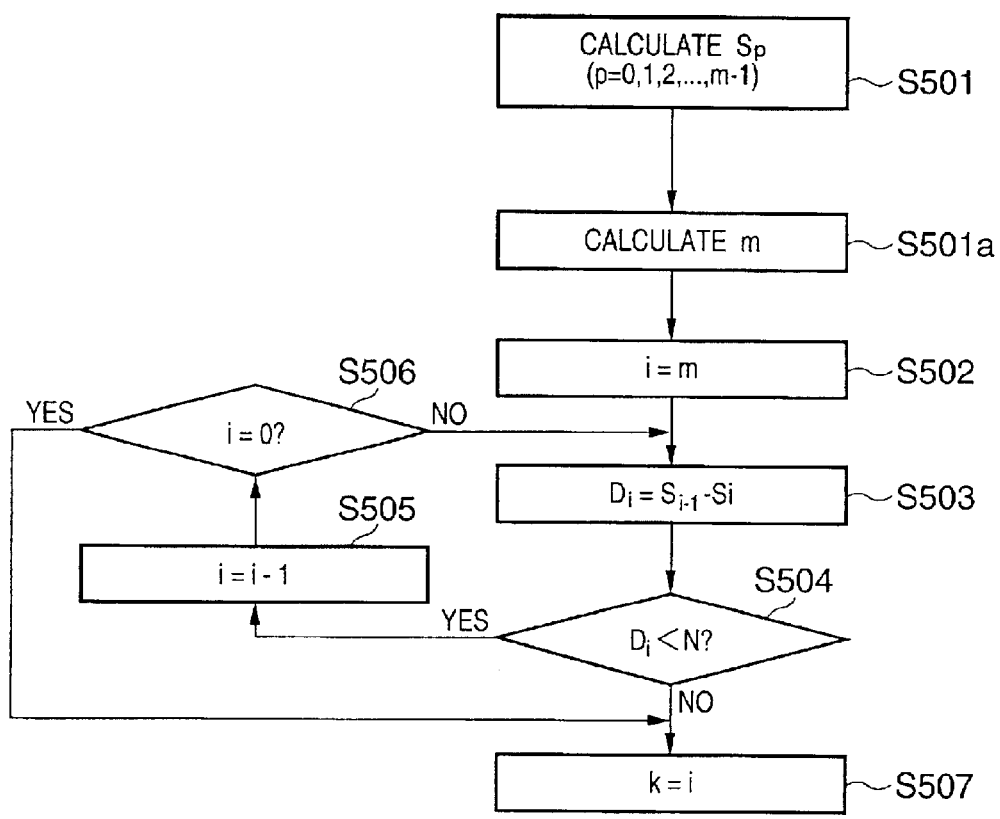
FIG. 7 is a flow chart showing parameter selection processing in the first embodiment.

In the fifth embodiment, steps S1201 to S1204 of performing another loop processing are inserted between steps S502 and S503 of FIG. 7 in the first embodiment.

In step S1201, $DD_i = S_{i-2} - S_i$ as the most striking feature of the fifth embodiment is calculated. In step S1202, $DD_i$ is compared with 2N. In step S1203, i is updated in units of 2. In step S1204, whether i is 1 or less is checked.

Loop processing in steps S1201 to S1204 is very similar to loop processing in steps S503 to S506 in the first embodiment except that the update unit for i is 2. $DD_i$ calculated in step S1201 is compared with 2N in step S1202 to check whether to update i to i−2. If YES in step S1202, the i value is updated by i=i−2 in step S1203.

If $i \leq 1$, no $S_{-1}$ exists, so step S1201 cannot be executed. Thus, if $i \leq 1$ is detected in step S1204, the flow shifts to processing at the next stage (step S503); and if i>1, returns to step S1201 to continue loop processing.

The flow escapes from this loop processing when the code amount does not decrease even by changing the k parameter from i to i−2. However, if the k parameter is changed from i to i−1, the code amount may decrease.

To check whether the k parameter can be changed from i to i−1, $D_i = S_{i-1} - S_i$ is calculated in step S503, and $D_i$ is compared with N in step S504. If $D_i$<N (YES in step S504), the k parameter can be changed from i to i−1, and the flow shifts to step S505; and if NO, the k parameter is kept at i, and the flow shifts to step S507 to determine the i value as a k parameter value.

In the fifth embodiment, i is first updated in units of 2. Alternatively, i may be updated in units of 4 using $S_{i-4} - S_i$ or in another unit using another calculation method.

If i is updated in units of 4, four optimal k parameters i to i−3 are conceivable when the flow escapes from the first loop processing. To specify one of the four values at the next stage, whether i can be updated in units of 1 may be checked three times at maximum to update the i value.

<Sixth Embodiment>

The sixth embodiment according to the present invention will be described. The arrangement of a coding apparatus in the sixth embodiment is the same as in FIG. 1.

Figure 14:
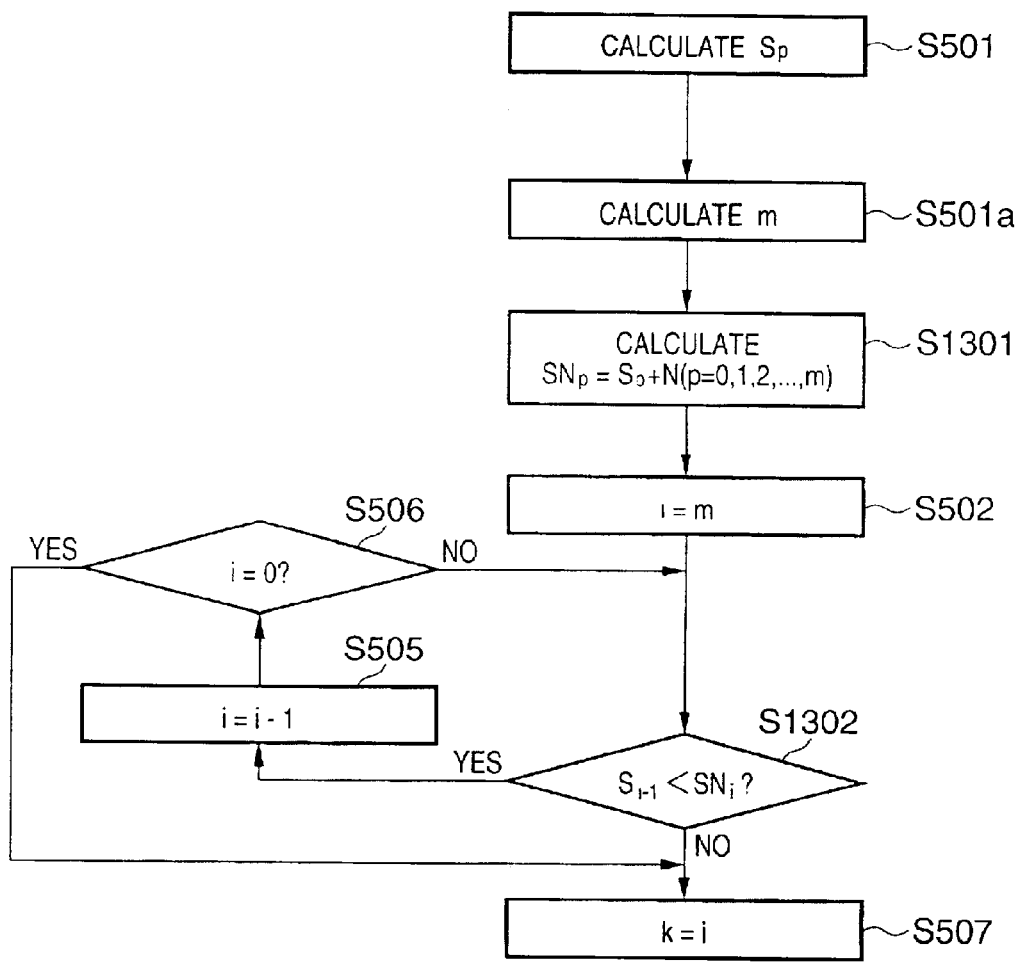
FIG. 14 is a flow chart showing parameter selection processing in the sixth embodiment.

A coding parameter selection method in the sixth embodiment will be explained with reference to FIG. 14. The same reference numerals as in FIG. 7 in the first embodiment denote the same processing steps.

The sixth embodiment uses $SN_p = S_p + N$ (p=0, 1, 2, 3, ..., m) without using $D_i$.

$SN_p$ is calculated in step S1301, and $S_{i-1}$ is compared with $SN_1$ in step S1302.

The remaining processing is the same as in the first embodiment.

$SN_p$ as the sum of $S_p$ (p=0, 1, 2, 3, ..., m) calculated in step S501 and N is calculated in step S1301, and i is initialized in step S502.

To check whether i as the candidate value of the k parameter can be updated to i−1, $S_{i-1}$ is compared with SN in step S1302. If $S_{i-1}$<$SN_i$ (YES in step S1302), the code amount can decrease, and the flow shifts to step S506; and if NO, the flow shifts to step S504 to determine i as a k parameter value.

After i is changed to i−1, whether i=0 is checked in step S506. If i=0 (YES in step S506), the i value cannot be updated anymore, and the flow escapes from loop processing, and advances to step S504. If NO in step S506, the flow returns to step S1302 to continue i update processing.

<Seventh Embodiment>

The seventh embodiment according to the present invention will be described. The arrangement of a coding apparatus in the seventh embodiment is the same as in FIG. 1.

In all the above embodiments, the initial value of the loop control variable i is set to m. In the seventh embodiment, the initial value of the control variable i is set to 0.

The seventh embodiment can be basically applied to all the above embodiments. An application of the seventh embodiment to FIG. 5 described in the first embodiment will be explained with reference to FIG. 15.

Figure 15:
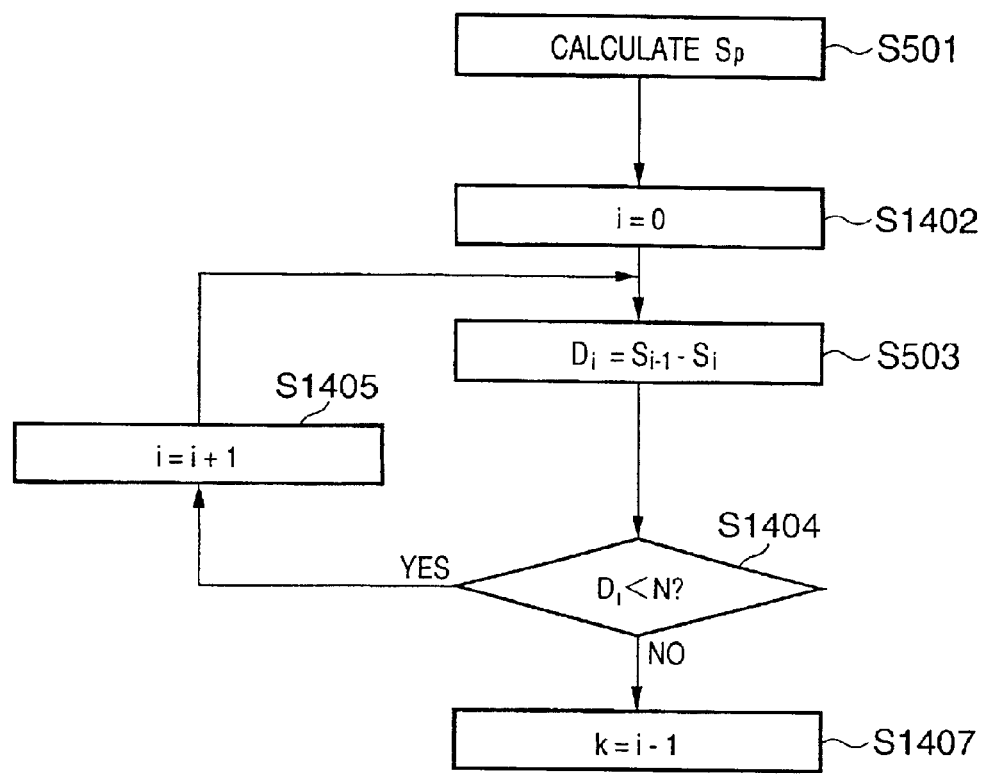
FIG. 15 is a flow chart showing parameter selection processing in the seventh embodiment.

In FIG. 15, i is set to an initial value of 0 in step S1402, and $D_i$ is compared with N in step S1404. If Di> N (YES in step S1404), the flow shifts to step S1405; and if NO, to step S1407. In step S1405, i is incremented by one, and the flow returns to step S503.

In step S1407, the k parameter value is determined to i−1.

The seventh embodiment can eliminate step S501a of calculating m and step S506 of checking whether i=0 which are necessary for the above embodiments.

Since $D_m \leq N$, the i value increases up to m. Before this, $D_i \leq N$ holds. Therefore, the final branch destination of step S1404 is always step S1407 where the k value is determined.

In step S1407, the k parameter value is set not to i but to i−1 because $D_{i-1} > N \geq D_i$ is established when the flow branches from step S1404 to step S1407. As described above, an optimal k parameter value is i−1 in this relation.

The seventh embodiment can take the simplest processing form among the above-mentioned embodiments.

<Eighth Embodiment>

The eighth embodiment according to the present invention will be described. The arrangement of a coding apparatus in the eighth embodiment is the same as in FIG. 1.

In the eighth embodiment, the initial value of the control variable i is changed in accordance with the result of preceding comparison processing.

An optimal k parameter value may exist near i=m or near i=0. Search efficiently starts from i=m in the former case, and from i=0 in the latter case.

Before loop processing, the initial value from which search starts must be determined.

As the outline of the eighth embodiment, $D_h$ for h=floor{m/2} is calculated and compared with N. If $D_h$<N, i is set to 0 to perform processing; otherwise, i is set to m to perform processing.

Figure 16:
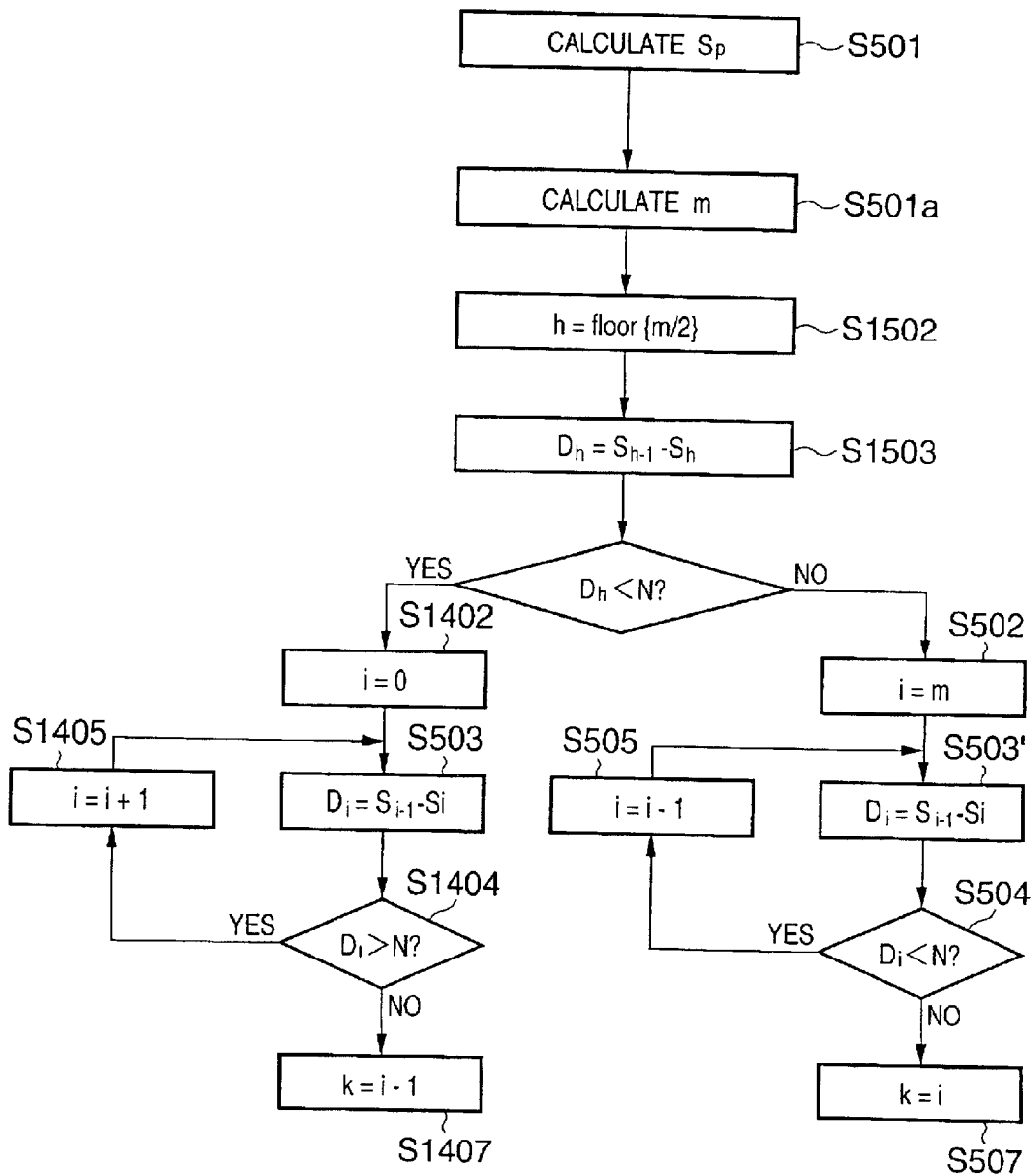
FIG. 16 is a flow chart showing parameter selection processing in the eighth embodiment.

Parameter selection processing in the eighth embodiment will be explained in more detail with reference to the flow chart of FIG. 16. In FIG. 16, h=floor{m/2} is calculated in step S1502. In step S1503, $D_h$ corresponding to h is calculated.

In step S1504, $D_h$ is compared with N. If $D_h$<N (YES in step S1504, the flow branches to step S1402; and if NO, to step S502.

The remaining processing steps are the same as the processing steps having the same reference numerals in FIG. 7 or 15.

Processing in step S1402 and subsequent steps is the same as in the seventh embodiment. Processing in step S502 and subsequent steps is basically the same as in the first embodiment except for a slight difference. The difference is that whether i reaches a predetermined value (corresponding to step S506) is not determined in loop processing.

This determination is not executed because if the i value gradually decreases from the initial value m one by one to reach h in loop processing, the flow escapes from this loop processing upon determination in step S504, and reliably branches to step S507. This is apparent from the condition ($D_h \geq N$) under which the flow branches from step S1504 to step S502.

Similarly, the upper limit of the i value is h when the flow escapes from loop processing in steps S503, S1404, and S1405. This is apparent from the condition ($D_h < N$) under which the flow branches from step S1504 to step S1402.

Since the eighth embodiment can halve the upper loop count of loop processing until the k parameter is determined, the k parameter can be determined at a higher speed.

As an application of the eighth embodiment, the number of branches to loop processing of determining the k parameter is increased. This can further decrease the upper loop count of each loop processing, and the k parameter can be determined at a higher speed.

<Ninth Embodiment>

The ninth embodiment according to the present invention will be described. The arrangement of a coding apparatus in the ninth embodiment is the same as in FIG. 1.

Figure 17:
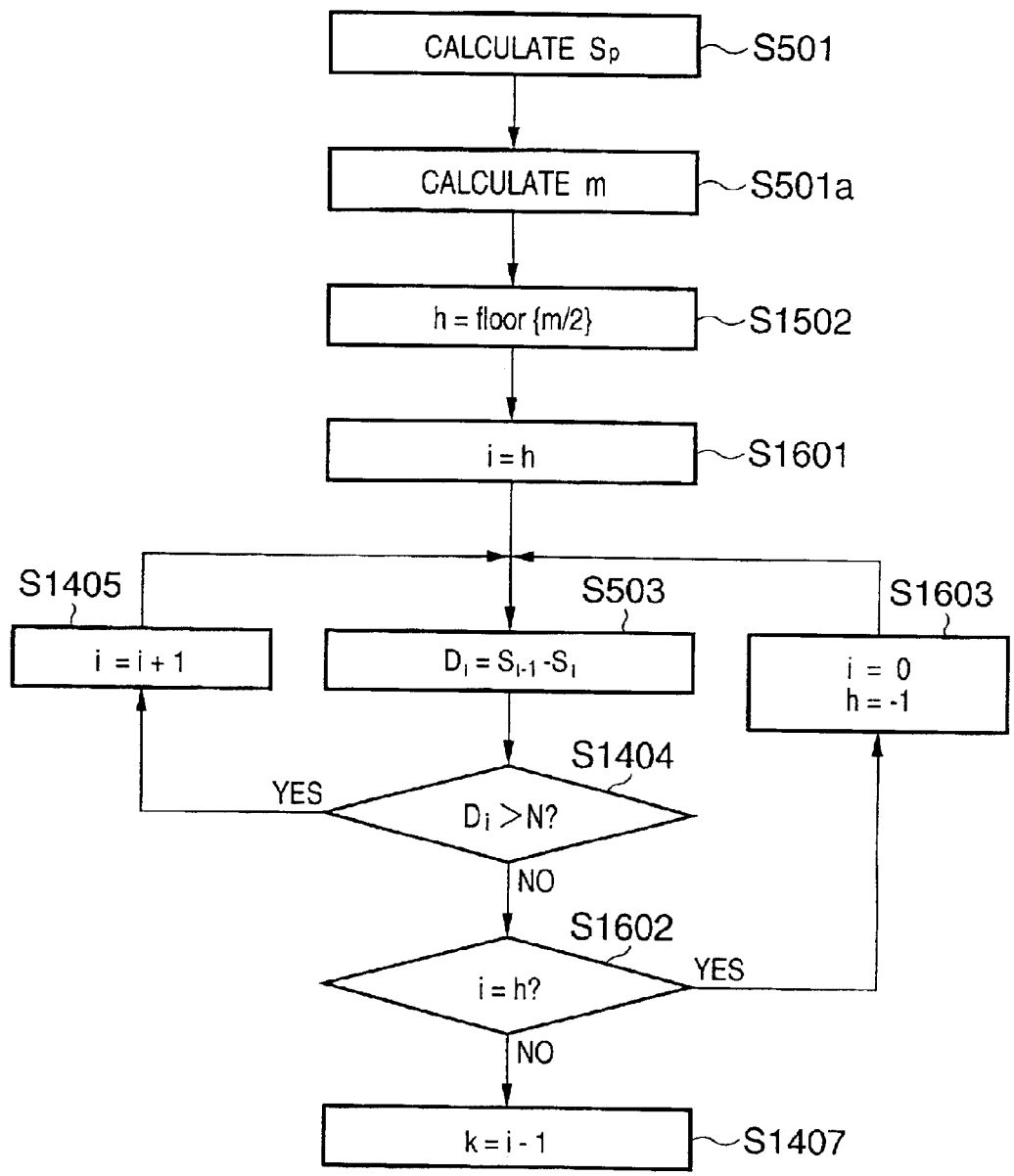
FIG. 17 is a flow chart showing parameter selection processing in the ninth embodiment.

In the eighth embodiment, two loop processes must be prepared for a case wherein the control variable i increases and a case wherein the control variable i decreases. In the ninth embodiment, a processing method when the two loop processes are combined will be explained with reference to the flow chart of FIG. 17.

In the ninth embodiment, the initial value of i is set to h in step S1601. In step S1602, whether i=h is checked. In step S1603, the initial value of i is reset to 0, and h is set to −1.

The remaining processing steps are the same as in FIG. 16 described in the eighth embodiment.

By the same calculation method as in the eighth embodiment, h is calculated (step S1502), and i is set to h in step S1601. Then, the flow shifts to step S503 to calculate $D_h = S_{h-1} - S_h$. In step S1404, whether $D_h > N$ is checked. This processing is substantially the same as in the eighth embodiment though the structure of the flow chart is different.

If $D_h > N$ (YES in step S1404), i=h is set as an initial value, and the same processing as loop processing executed when the control variable i increases is performed in steps S503, S1404, and S1405. Since the flow passes at least once through step S1405 of calculating i=i+1 in escaping from this loop processing, the i value is larger than h. After determination in step S1602, the k parameter value is determined to i−1 in step S1407.

If NO in step S1404, the flow branches to step S1602 in the first cycle. At this time, since i=h, the flow branches to step S1603 to reset the initial value of i to o and set h to −1. By setting h to a value (−1) which is not taken by i, the second determination in step S1602 can be prevented from being YES (establishing i=h).

Processing after the initial value of i is reset to o is the same as loop processing in steps S503, S1404, and S1405 in the eighth embodiment. When the flow escapes from this loop processing, the i value is floor {m/2} at maximum.

The variable h value is set to −1 in step S1603, so i=h is not established in step S1602. Thus, the flow branches to step S1407 to determine i−i as a k parameter value.

The ninth embodiment combines the processes in the eighth embodiment, which causes a corresponding overhead. More specifically, determination processing in step S1602 necessary for resetting the initial value of i to 0 is performed ½ times in initialization (because the probability of performing this determination processing in initialization is about ½), and once in escaping from loop processing (because this determination processing cannot be avoided). However, the merit of a compact processing routine attained in the ninth embodiment is larger than this overhead.

<10th Embodiment>

The 10th embodiment according to the present invention will be described. The arrangement of a coding apparatus in the 10th embodiment is the same as in FIG. 1. The 10th embodiment will exemplify a hardware arrangement for realizing parameter selection processing in a coding parameter selection unit 105.

The following principle is derived from the principle of parameter selection processing described in the first embodiment.

$C_p$ serving as the comparison result between $D_p$ as the difference value between the variable-length code amounts $S_{p-1}$, and $S_p$, and N as the number of quantized values in the subblock is defined as follows:

$C_p = 1$: for $D_p > N$ $C_p = 0$: for $D_p > N$

From the relation: $D_0 \geq D_1 \geq D_2 \geq D_3 \geq \ldots \geq D_{p-1} D_p \geq D_{p+1} \geq \ldots \geq D_m$, a relation: $C_0 \geq C_1 \geq C_2 \geq C_3 \geq \ldots \geq C_{p-1} \geq C_p \geq C_{p+1} \geq \ldots \geq C_m$ can be obtained. This represents that a sequence: $C_O, C_1, C_2, C_3, \ldots, C_{p-1}, C_p, C_{p+1}, \ldots, C_m$ starts from $C_0 = 1$ and ends at $C_m = 0$ without any change point from 0 to 1 except for one change point from 1 to 0.

The point at which the value changes from 1 to 0 in the sequence ($C_0, C_1, C_2, \ldots$) is a point at which the magnitude between $D_p$ and N is reversed.

When the number of "1"s starting from $C_1$ except for $C_0 = 1$ is q, i.e., $C_q = 1$ and $C_{q+1} = 0$, $D_q \geq N \geq D_{q-1}$ holds. Therefore, q is an optimal k parameter value.

This principle is similarly applied to the subsequent embodiments.

Figure 18:
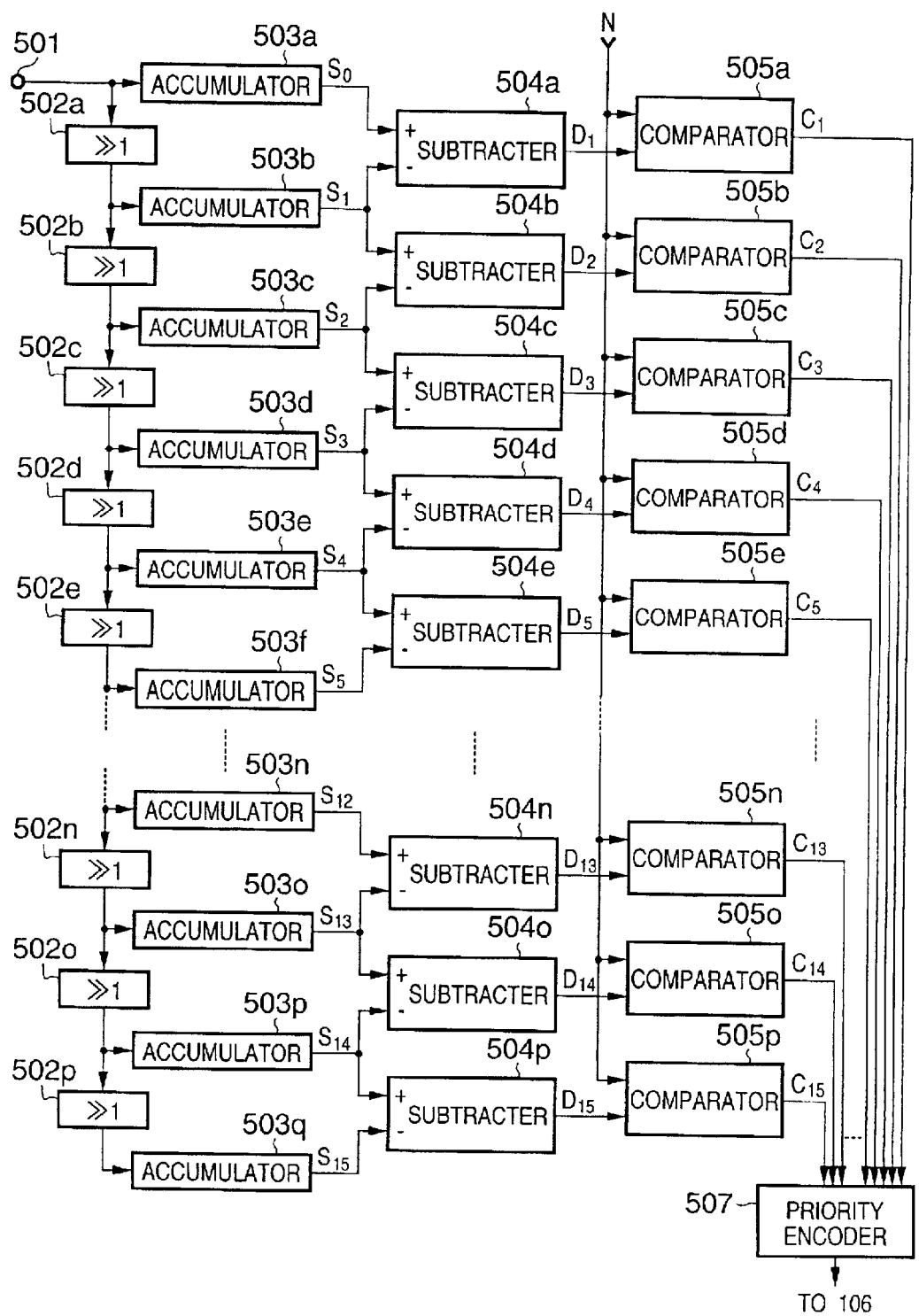
FIG. 18 is a block diagram showing the detailed arrangement of a coding parameter selection unit 105 in the 10th Embodiment.

Using the above principle, the 10th embodiment constitutes the coding parameter selection unit 105. FIG. 18 shows the block arrangement of the coding parameter selection unit 105. In FIG. 18, reference numeral 501 denotes a terminal for inputting a quantized value sent from a coefficient quantization unit 104; 502a, 502b, 502c, ..., 502p, bit shifters for sequentially shifting the input quantized value to the right in units of bits; 503a, 503b, 503c, ..., 503q, accumulators for adding N sequentially input values; 504a, 504b, 504c, ..., 504p, subtracters for calculating the difference between outputs from two adjacent accumulators; 505a, 505b, 505c, ..., 505p, comparators for comparing outputs from the subtracters with a predetermined value N; and 507, a priority encoder for obtaining an optimal k parameter from a plurality of comparison results by the comparators.

The bit shifters 502 shown in FIG. 18 are adopted for descriptive convenience, and hardly have any entity in the circuit arrangement. That is, since the signal width is different only by 1 bit between the input and output of each bit shifter, the signal shifts on the wiring to the upper side by one bit every time a signal passes through one bit shifter.

Letting Vi be the ith quantized value input from the terminal 501, outputs from the bit shifters 502a, 502b, 502c, ... are Vi>>1, Vi>>2, Vi>>3, ...

The accumulators 503 are initialized to 0 by the first input data of a subblock, and sequentially add and accumulate input data and outputs from corresponding bit shifters. For example, the accumulator 503c accumulates Vi>>2 (i=1, 2, ..., N−1, N).

As a result, the code amount at the variable-length code portion for the k parameter=0, 1, 2, ... is output from each accumulator. More specifically, the accumulator 503a, 503b, and 503c output $S_0 = \Sigma Vi>>0$, $S_1 = \Sigma Vi>>1$, and $S_2 = \Sigma Vi>>2$.

Outputs from these accumulators 503 are input to the subtracters 504, which calculate the difference in the code amount at the variable-length code portion for k parameter values different by only one, i.e., $D_p=S_{p-1}-S_p$ in equation (6) for all parameter values (p=1, 2, 3, ..., m).

The subtracters 504a, 504c, ... output $D_1=S_0-S_1$, $D_3=S_2-S_3$, ...

Outputs from these subtracters are compared with the number N of quantized values in the subblock to perform determination by equation (8), and the determination results $C_p$ are output from the respective comparators 505.

As described above, $C_0$, $C_1$, $C_2$, ..., $C_p$, ..., $C_m$ are aligned in a given order, and "1"s are output before "0"s. The number of "1"s in the first half determines an optimal k parameter value. The number of "1"s is converted into a k parameter value using the priority encoder 507.

Figure 19:
FIG. 19 is a view showing the input/output relationship of a priority encoder in the 10th embodiment.

The priority encoder 507 receives 15 bits and outputs 4 bits. In other words, the priority encoder 507 receives 15 comparison results, and outputs a value of 0 to 15 as a k parameter value. FIG. 19 shows the input/output relationship of the priority encoder 507.

The arrangement of the coding parameter selection unit 105 shown in FIG. 18 employs pluralities of subtracters and comparators in order to perform parallel processing at all parallel-processable portions. Alternatively, the coding parameter selection unit 105 may employ only one subtracter and one comparator, sequentially calculate $D_p$ and $C_p$ in the order of p=1, 2, 3, ..., m until $C_p=0$ is established, and set the k parameter value to a value (p−1) obtained by subtracting one from a p value which satisfies $C_p=0$.

The 10th embodiment can determine an optimal k value at a high speed by comparing the difference value of the variable-length code amount with a predetermined value for each k by a simple arrangement in performing Golomb Rice coding for an image data stream based on the k parameter.

<11th Embodiment>

The 11th embodiment according to the present invention will be described. The arrangement of a coding apparatus in the 11th embodiment is the same as in FIG. 1.

Figure 20:
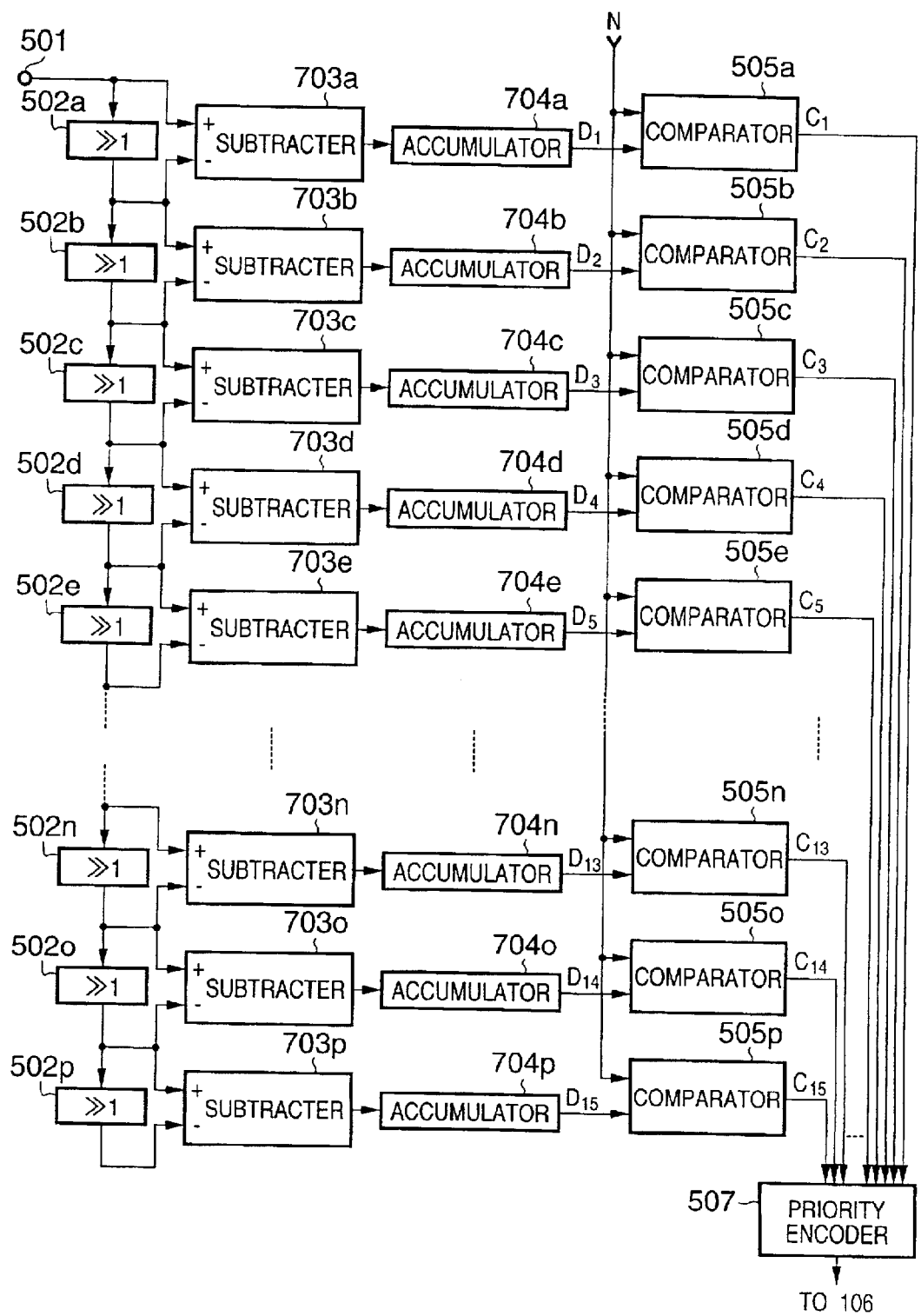
FIG. 20 is a block diagram showing the detailed arrangement of a coding parameter selection unit 105 in the 11th embodiment.

FIG. 20 shows the detailed arrangement of a coding parameter selection unit 105 in the 11th embodiment. In FIG. 20, the same reference numerals as in FIG. 18 described in the 10th embodiment denote the same parts, and a description thereof will be omitted.

In FIG. 20, reference numerals 703a, 703b, 703c, denote subtracters each for calculating the difference between the input and output of a corresponding bit shifter 502; and 704a, 704b, 704c, ..., accumulators for adding outputs from the subtracters.

The principle of determining an optimal k parameter value in the 11th embodiment is based on equation (10) obtained by substituting equation (3) into $S_{p-1}$ and $S_p$ in equation (7): $D_p=S_{9-1}-S_p$:

$$D_p=(\Sigma Vi>>(p-1))-(\Sigma vi>>p)=\Sigma(Vi>>(p-1)-(Vi>>p)) \quad (10)$$

(Vi>>(p−1))−(Vi>>p) in equation (10) represents the difference (input value−output value) between the input and output values of the pth bit shifter 502 from the top in FIG. 20. This difference value is calculated by the subtracter 703, and a part corresponding to the total sum ($\Sigma$) is calculated by the accumulator 704.

$D_p$ output from each accumulator 704 is equivalent to an output from each subtracter 504 in the 10th embodiment, so that processing by a comparator 505 and subsequent components is the same as in the 10th embodiment.

That is, the arrangement of the coding parameter selection unit 105 in the 11th embodiment is different from that in the 10th embodiment in that not only the subtracter and accumulator are exchanged, but also the subtracter is downsized. For example, for an N value of 64, the output bit width of the accumulator 704 is larger than the input bit width by 6 bits. In this case, the bit width of the subtracter 703 on the input side of the accumulator 704 becomes smaller by 6 bits than the bit width of the subtracter 703 on the output side (corresponding to the subtracter 504 in the 10th embodiment).

Also in the 11th embodiment, the coding parameter selection unit 105 may employ only one subtracter 703, sequentially compare $D_p$ with N in the order of p=1, 2, 3, ..., m until $C_p=0$ is established, and set the k parameter value to a value (p−1) obtained by subtracting one from a p value which satisfies $C_p=0$.

More specifically, comparison processing is executed in synchronism with counter operation starting from an initial value of 0. $D_1$ is compared with N at a count value of 0 to output $C_1$, and $D_2$ is compared with N at a count value of 1 to output $C_2$. Comparison processing is sequentially done until $C_p=0$ holds. Since the count value for $C_p=0$ is p−1, the count value is output as a k parameter value.

The 11th embodiment can determine an optimal k parameter value at a high speed by a simpler arrangement than the 10th embodiment.

<12th Embodiment>

The 12th embodiment according to the present invention will be described. The arrangement of a coding apparatus in the 12th embodiment is the same as in FIG. 1.

Figure 21:
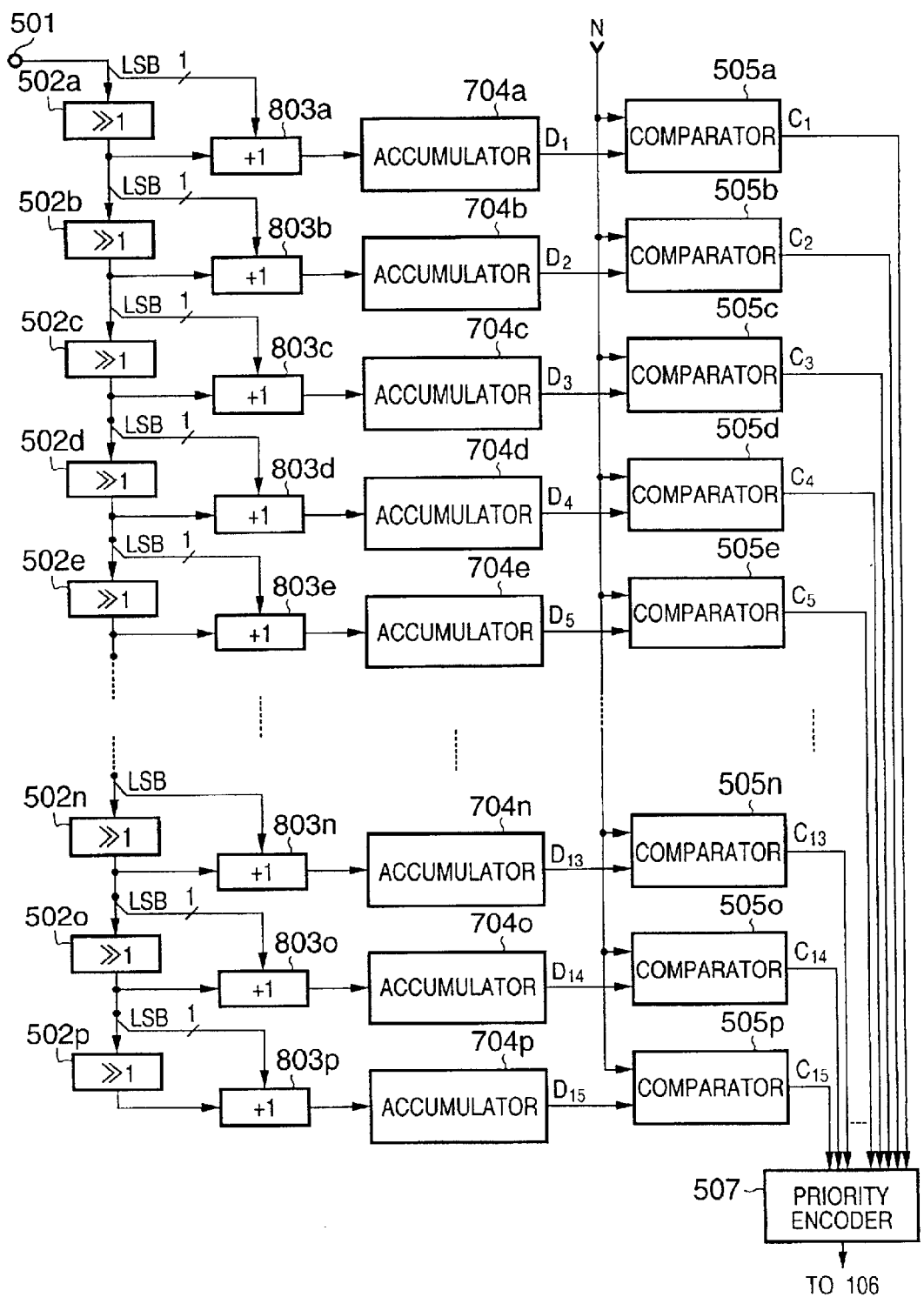
FIG. 21 is a block diagram showing the detailed arrangement of a coding parameter selection unit 105 in the 12th Embodiment.

FIG. 21 shows the detailed arrangement of a coding parameter selection unit 105 in the 12th embodiment. In FIG. 21, the same reference numerals as in FIG. 20 described in the 11th embodiment denote the same parts, and a description thereof will be omitted.

In FIG. 21, reference numerals 803a, 803b, 803c, ... denote +1 adders for adding 1 bit to a bit stream.

The principle of determining an optimal k parameter value in the 12th embodiment is based on equation (11) obtained by rewriting equation (5) and applying it to equation (10). That is, $$\Sigma Vi>>p=(2\times\Sigma Vi>>(p+1))+(\Sigma(Vi>>p)\&1) \quad (5)$$

is rewritten to obtain $$Vi>>(p-1)=2\times(Vi>>p)+((Vi>>(p-1))\&1)$$

This is substituted into equation (10):

$$D_p = \sum (Vi>>(p-1))-(Vi>>p))$$
$$= \sum ((2\times(Vi>>p)+((Vi>>(p-1))\&1)-(Vi>>p))$$
$$= \sum ((Vi>>p)+((Vi>>(p-1))\&1)) \quad (11)$$

(Vi>>p)+((Vi>>(p−1))&1) in equation (11) represents addition of the least significant bit (LSB) on the input side to an output value from the pth bit shifter 502 from the top in FIG. 21. The sum is calculated by the +1 adder 803, and a part corresponding to the total sum ($\Sigma$) is calculated by an accumulator 704.

A value output from the +1 adder 803 is equivalent to an output from the subtracter 703 in the 11th embodiment, so that processing by the accumulator 704 and subsequent components is the same as in the 11th embodiment.

In the arrangement of the coding parameter selection unit 105 according to the 12th embodiment, the +1 adder 803 replaces the subtracter 703 in the 11th embodiment, which can further downsize the hardware scale.

In the 12th embodiment, as well as the 11th embodiment, the coding parameter selection unit 105 may employ only one comparator 505, sequentially compare $D_p$ with N in the order of p=1, 2, 3, . . . , m until $C_p$=0 is established, and set the k parameter value to a value (p−1) obtained by subtracting one from a p value which satisfies $C_p$=0.

The 12th embodiment can determine an optimal k parameter value at a high speed by a simpler arrangement than the 11th embodiment.

<13th Embodiment>

The 13th embodiment according to the present invention will be described. The arrangement of a coding apparatus in the 13th embodiment is the same as in FIG. 1.

In the 13th embodiment, a full adder having a carry input function is used as the internal adder of an accumulator in the arrangement of a coding parameter selection unit 105. This eliminates the +1 adder 803 described in the 12th embodiment.

The accumulator (503, 704) described in each of the 10th to 12th embodiments can use both a half adder having no carry input and a full adder having a carry input. However, when the full adder is used, 0 must be supplied to the carry input.

Figure 22A:
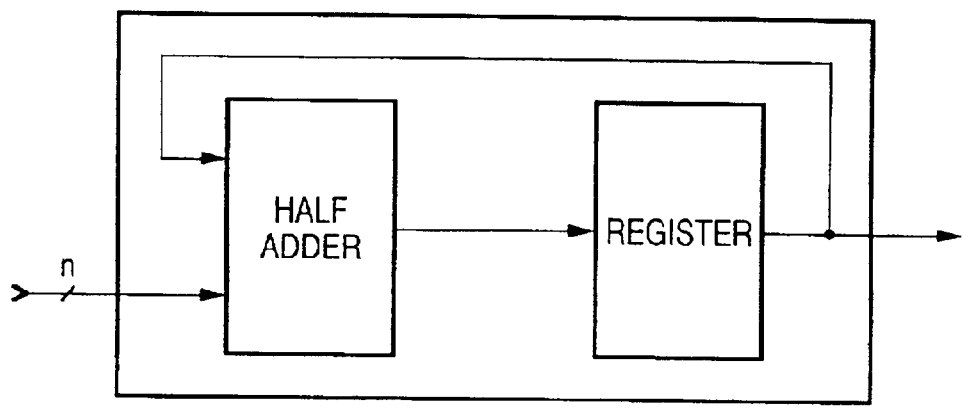
FIGS. 22A and 22B are block diagrams each showing the arrangement of an adder in the 13th embodiment.
Figure 22B:
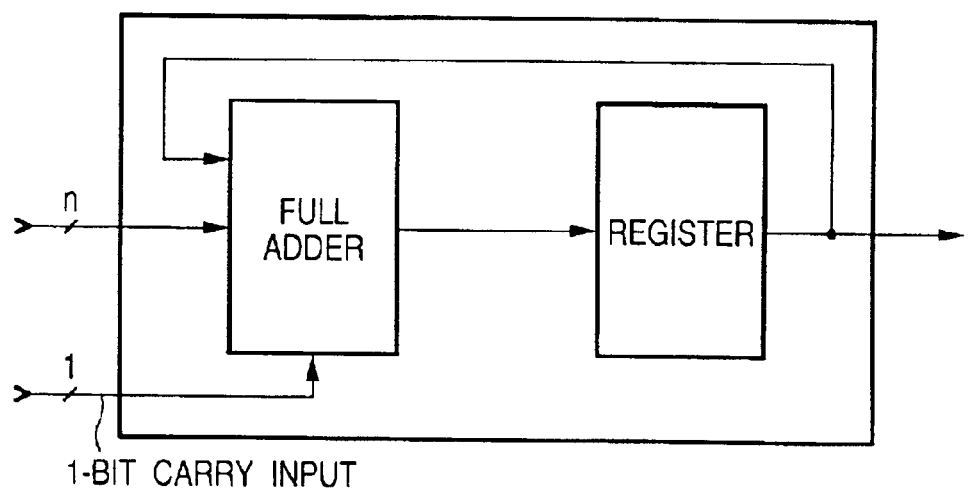

FIG. 22A shows the arrangement of a half adder type accumulator usable in the 10th to 12th embodiments, and FIG. 22B shows the arrangement of a full adder type accumulator used in the 13th embodiment.

The full adder has a function of adding one bit in addition to the function of the half adder. Hence, the function of the +1 adder 803 which must be arranged at the input stage of the accumulator in the 12th embodiment can be incorporated in the full adder in an accumulator 704. In this case, the full adder is larger in circuit scale than the half adder, but much smaller than a combination of the half adder and +1 adder independently arranged, like the 12th Embodiment.

The 13th embodiment can further downsize the hardware scale by integrating the +1 adder 803 and accumulator 704 in the 12th embodiment into the full adder type accumulator shown in FIG. 22B.

<14th Embodiment>

The 14th embodiment according to the present invention will be described. The arrangement of a coding apparatus in the 14th embodiment is the same as in FIG. 1.

Figure 23:
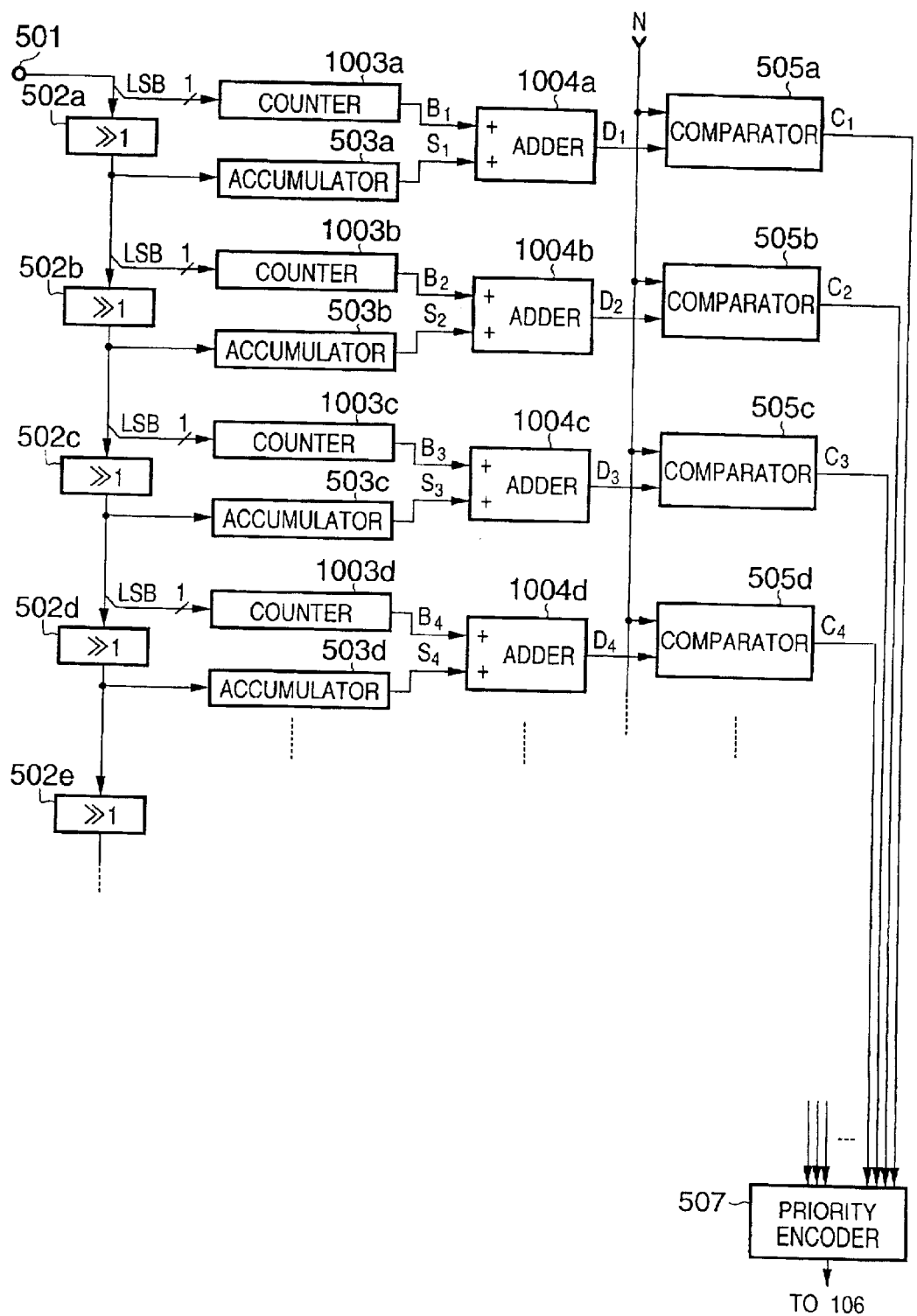
FIG. 23 is a block diagram showing the detailed arrangement of a coding parameter selection unit 105 in the 14th Embodiment.

FIG. 23 shows the detailed arrangement of a coding parameter selection unit 105 in the 14th embodiment. In FIG. 23, the same reference numerals as in FIG. 18 described in the 10th embodiment denote the same parts, and a description thereof will be omitted.

In FIG. 23, reference numerals 1003a, 1003b, 1003c, . . . denote counters; and 1004a, 1004b, 1004c, . . . , adders.

The principle of determining an optimal k parameter value in the 14th embodiment is based on the above-described equation (7):

$$D_p = S_p + B_p (p \geq 1) \qquad (7)$$

The counters 1003a, 1003b, 1003c, . . . count $B_p$ in equation (7) in units of bits for each plane, and the adders 1004a, 1004b, 1004c, . . . calculate $S_p + B_p$ in equation (7).

Outputs from the respective adders 1004 are equivalent to outputs from the subtracters 504a, 504b, 504c, . . . shown in FIG. 18 in the 10th embodiment. Similar to the 10th embodiment, comparators 505a, 505b, 505c, . . . compare outputs from the adders 1004 with the predetermined value N, and output their comparison results $C_p$ to a priority encoder 507 to convert them into a k parameter value.

The 14th embodiment can determine an optimal k parameter value at a high speed even using the counter.

<15th Embodiment>

The 15th embodiment according to the present invention will be described. The arrangement of a coding apparatus in the 15th embodiment is the same as in FIG. 1.

Figure 24:
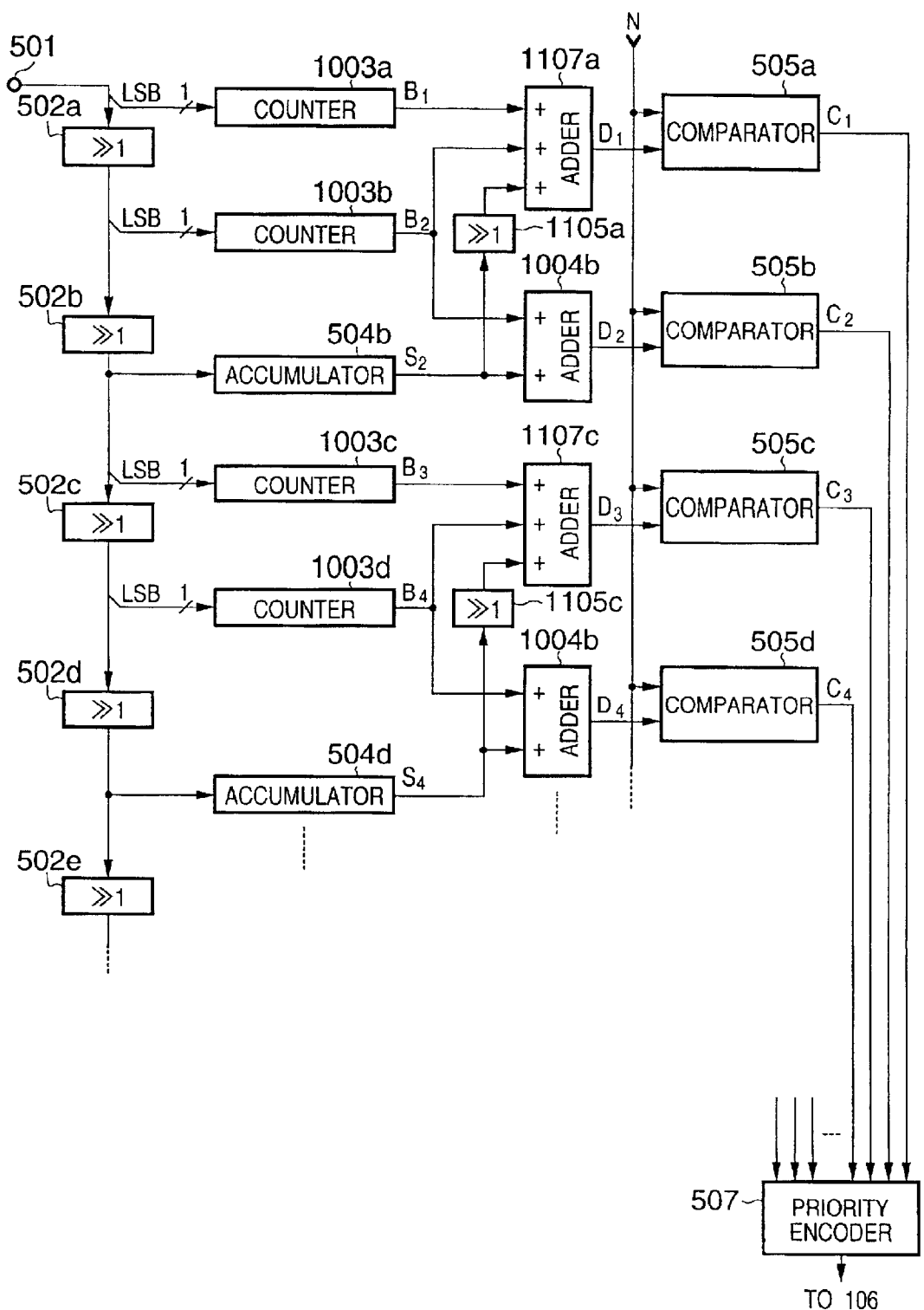
FIG. 24 is a block diagram showing the detailed arrangement of a coding parameter selection unit 105 in the 15th Embodiment.

FIG. 24 shows the detailed arrangement of a coding parameter selection unit 105 in the 15th embodiment. In FIG. 24, the same reference numerals as in FIG. 23 described in the 14th embodiment denote the same parts, and a description thereof will be omitted.

In FIG. 24, reference numerals 1105a, 1105c, . . . denote bit shifters for shifting an output from an accumulator by one bit to the left in order to double the output; and 1107a, 1107c, . . . , adders for adding data of three inputs.

In the 15th embodiment, equation (6) is applied to calculation of $S_1, S_3, S_5, \ldots, C_{2i+1}$:

$$S_p 32\ 2 \times S_{p+1} + B_{9+1} \qquad (6)$$

In other words, $S_{2i-1}$ is calculated from $2 \times S_{2i} + B_{2i}$, and $B_{2i-1}$ is added to $S_{2i-1}$ to obtain $D_{2i-1}$. $D_{2i}$ is obtained by the same calculation as in the 14th embodiment.

In the 15th embodiment, the bit shifters 1105a, 1105c, . . . calculate $2 \times S_{2i}$, and the adders 1107a, 1107c, . . . add three terms $2 \times S_{2i}$, $B_{2i}$, and $B_{2i-1}$. By this calculation, all $D_p$ (p=1, 2, 3, . . . ) necessary for the inputs of comparators 505 are prepared, and an optimal k parameter value can be attained by the same processing as in the 14th embodiment.

The 15th embodiment can determine an optimal k parameter value at a high speed with an arrangement from which the accumulators described in the 14th embodiment are eliminated.

<16th Embodiment>

The 16th embodiment according to the present invention will be described. The arrangement of a coding apparatus in the 16th embodiment is the same as in FIG. 1.

Figure 25:
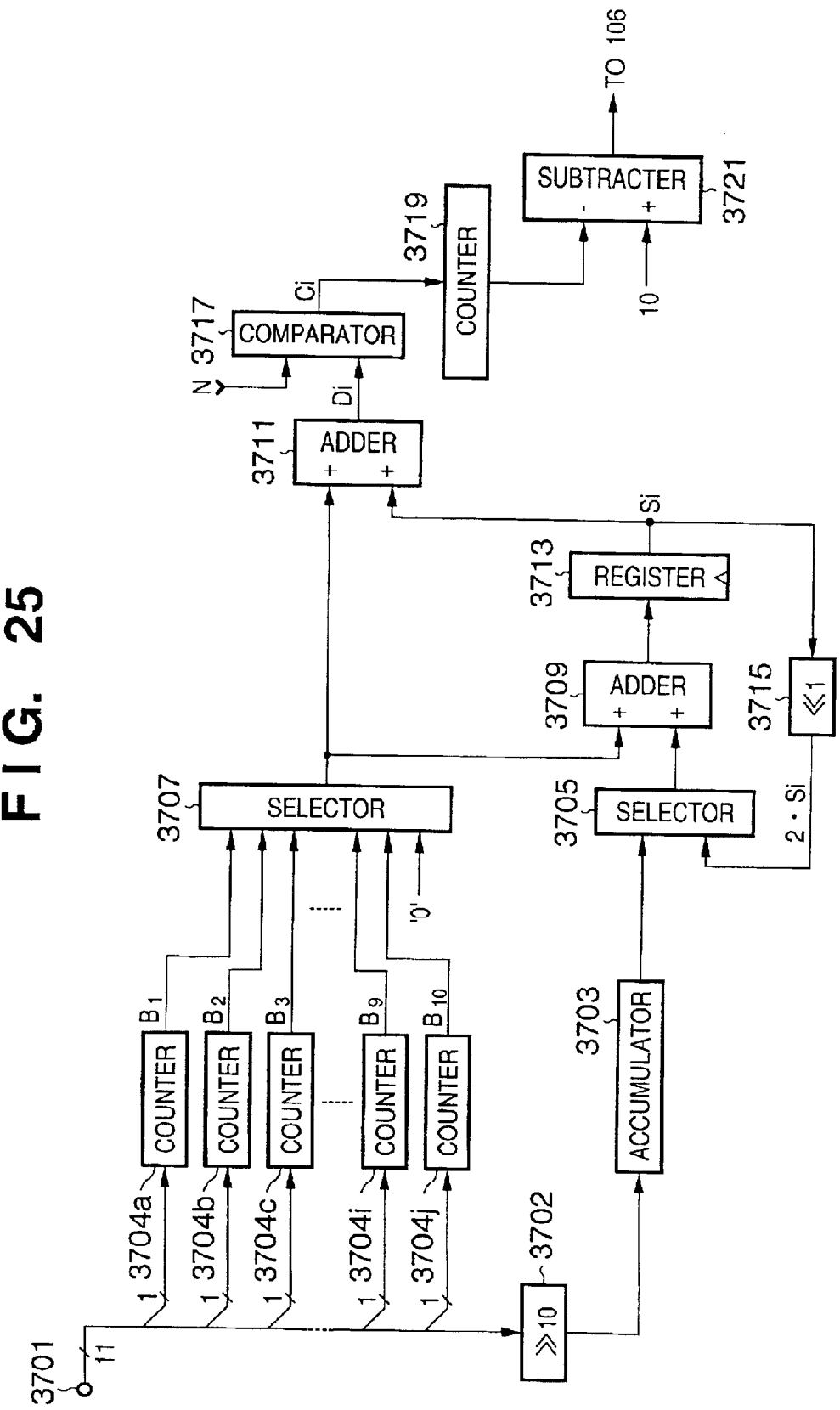
FIG. 25 is a block diagram showing the detailed arrangement of a coding parameter selection unit in the 16th embodiment.

FIG. 25 shows the block arrangement of a coding parameter selection unit 105 in the 16th embodiment.

In FIG. 25, reference numeral 3701 denotes a terminal for inputting quantized value data sent from a coefficient quantization unit 104. In this case, the maximum number of effective bits of data input from the terminal 3701 is 11.

Reference numeral 3702 denotes a shifter for shifting input data by 10 bits to the right; 3703, an accumulator for accumulating an output value from the shifter 3702; 3704a, 3704b, 3704c, . . . , 3704j, counters for counting the number of "1"s in each bit plane; 3705, a first selector for receiving an output from the accumulator 3703 as one input; 3707, a second selector for selecting one of $B_p$ outputs from the counters 3704; 3709, a first adder for recursively calculating $S_p$ based on equation (6); 3711, a second adder for calculating $D_p$; 3713, a register for holding the sum of the first adder 3709; 3715, a 1-bit shifter for shifting an input data value by 1 bit to the right in order to double the input data value; 3717, a comparator for comparing $D_p$ with the predetermined value N; 3719, a counter for counting the number of comparison results which satisfy $C_p$=0; and 3721, a subtracter for calculating the k parameter.

The 16th embodiment executes calculation processing based on the following two equations:

$$S_p = 2 \times S_{p+1} + B_{p+1} \qquad (6)$$

$$D_p = S_p + B_p (p \geq 1) \qquad (7)$$

Equation (6) is applied based on a variable-length code amount $S_{10}$ attained via the shifter 3702 and accumulator 3703 to sequentially obtain $S_9, S_8, S_7, S_6, S_5, S_4, S_3, S_2,$ and $S_1$. This requires $B_{10}$ to $B_1$ values, which are obtained as follows.

The 10 counters 3704a to 3704j respectively receive the least significant bit, second bit from the least significant bit, . . . , 10th bit from the least significant bit. Hence, the counters 3704a to 3704j can count the number of "1"s in each plane for a bit plane of 10 bits from the least significant bit, thereby obtaining the $B_1$ to $B_{10}$ values.

These count values ($B_1$ to $B_{10}$) and "0" are input to the second selector 3707, and selected and output in the order of 0, $B_{10}$, $B_9$, $B_8$, $B_7$, $B_6$, $B_5$, $B_4$, $B_3$, $B_2$, and $B_1$.

$S_{10}$ obtained by the accumulator 3703 is supplied to the first selector 3705, which selects and outputs $S_{10}$ at a timing at which the second selector 3707 selects and outputs "0".

$S_{10}$ and "0" output from the first and second selectors 3705 and 3707 are added by the first adder 3709, and the sum ($S_{10}$) is sent to the register 3713 where the sum is held.

In the next processing cycle, the register 3713 outputs $S_{10}$, the first selector 3705 outputs a value ($2 \times S_{10}$) obtained by doubling the register output ($S_{10}$) by the bit shifter 3715, and the second selector 3707 outputs $B_{10}$.

The second adder 3711 adds the output $S_{10}$ from the register 3713 and the output $B_{10}$ from the second selector 3707, and outputs $S_{10}+B_{10}=D_{10}$.

At this time, the first adder 3709 adds the output $2 \times S_{10}$ from the first selector 3705 and the output $B_{10}$ from the second selector 3707 to output $$2 \times S_{10} + B_{10} = S_9$$

which satisfies equation (6).

In this way, the first adder 3709 adds the input $2 \times S_p$ attained by passing the calculation result $S_p$ in a previous processing cycle through the register 3713, bit shifter 3715, and first selector 3705, and the input $B_p$ attained by the second selector 3707, thereby obtaining $2 \times S_p + B_p = S_{p-1}$ which satisfies equation (6).

In this recursive calculation, $S_9$, $S_8$, $S_7$, $S_6$, $S_5$, $S_4$, $S_3$, $S_2$, and $S_1$ are sequentially calculated using $S_{10}$ as an initial value, and these calculation results are input to one input of the second adder 3711.

The second selector 3707 outputs $B_p$ in calculating $S_{p-1}$ by the first adder 3709, as described above. At this time, the register 3713 outputs $S_p$ calculated in a previous cycle, so that $B_p$ and $S_p$ are simultaneously input to the second adder 3711.

The second adder 3711 adds the input $B_p$ and $S_p$ to output $D_p$. That is, the second adder 3711 first outputs $D_{10}$, and then $D_9$, $D_8$, $D_7$, $D_6$, $D_5$, $D_4$, $D_3$, $D_2$, and $D_1$ in the order named.

An output from the second adder 3711 is compared with the predetermined value N by the comparator 3717, which outputs a comparison result Cp based on equation (9).

The comparison result $C_p$ is supplied to the counter 3719, which counts a value which satisfies $C_p=0$. An input to the counter 3719 starts from $C_{10}=0$, and ends at $C_p=1$ or 0. When the value of the comparison result $C_p$ changes from "0" to "1" during count operation, the value changes at only one point. When the value changes to "1", the value of the counter 3719 is not incremented and is determined.

The subtracter 3721 subtracts the determined value of the counter 3719 from a fixed value "10" to obtain an optimal k parameter value in the 16th embodiment. For example, if $C_{10}$ to $C_7$ are "0", the value of the counter 3719 is "4", and the k parameter value is 10−4=6. If the comparison result remains "0" to the end, the counter 3719 counts up the count value to "10", and the k parameter value is "0" as the subtraction result of the subtracter 3721.

In this fashion, the code amount $S_p$ at the variable-length code portion is recursively calculated, and $B_p$ is added to $S_p$ to obtain the code amount difference value $D_p$ between adjacent parameter values. The counter 3719 is operated based on the comparison result between $D_p$ and the predetermined value N, thereby attaining an optimal k parameter.

Note that the counter 3719 and subtracter 3721 can be replaced by a down counter for holding "10" as an initial value and counting down the count value when the output $C_p$ from the comparator 3717 is "0".

An input to the accumulator 3703 in the 16th embodiment is 1 bit of 11-bit quantized value data shifted by 10 bits to the right. Thus, the accumulator 3703 may be replaced by a counter.

As described above, the 16th embodiment can determine an optimal k value at a high speed by recursively calculating the variable-length code amount for each k and comparing the difference value with a predetermined value by a simple arrangement in performing Golomb Rice coding for an image data stream based on the k parameter.

<17th Embodiment>

The 17th embodiment according to the present invention will be described. The arrangement of a coding apparatus in the 17th embodiment is the same as in FIG. 1.

The 16th embodiment uses a pair of calculation unit and comparator for recursively calculating the variable-length code amount. This arrangement requires a maximum of 11 cycles until the k parameter is obtained after the values of the counters 3704 and accumulator 3703 are determined. As the maximum number of effective bits of input data increases, a larger number of processing cycles are required.

To prevent this, the 17th embodiment comprises a plurality of pairs of calculation units and comparators to increase the processing speed.

Figure 26:
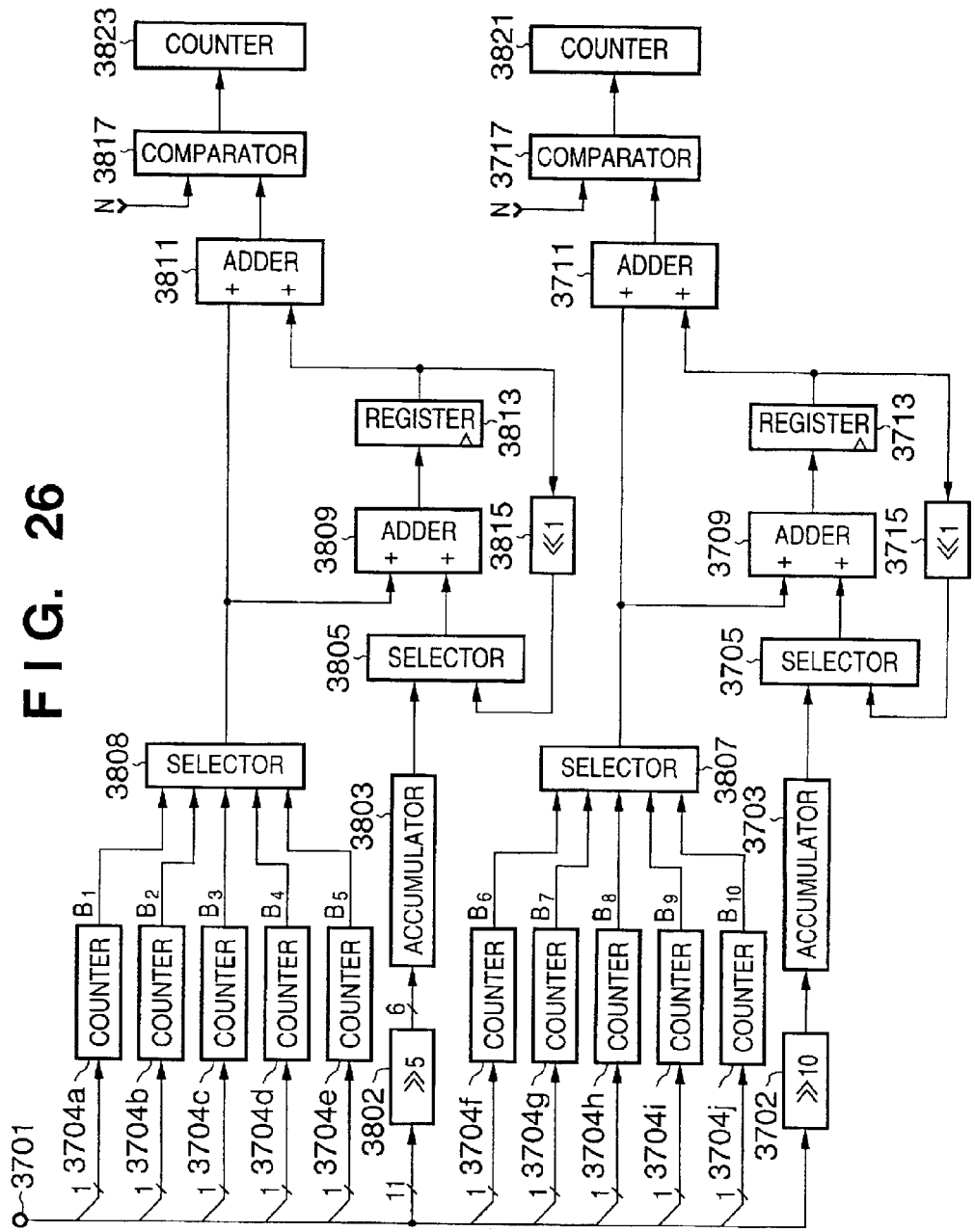
FIG. 26 is a block diagram showing the detailed arrangement of a coding parameter selection unit in the 17th embodiment.

FIG. 26 shows the detailed arrangement of a coding parameter selection unit 105 in the 17th embodiment. In FIG. 26, the same reference numerals as in FIG. 25 described in the 16th embodiment denote the same parts, and a description thereof will be omitted.

In FIG. 26, reference numeral 3802 denotes a shifter for shifting input data by 5 bits to the right; 3803, an accumulator for accumulating an output value from the shifter 3802 and outputting $S_5$; 3807, a selector for selecting one of output values from counters 3704j to 3704f for counting $B_{10}$, $B_9$, $B_8$, $B_7$, and $B_6$; and 3808, a selector for selecting one of output values from counters 3704e to 3704a for counting $B_5$, $B_4$, $B_3$, $B_2$, and $B_1$. Reference numerals 3809 and 3811 denote adders; 3813, a register; 3815, a 1-bit shifter; and 3817, a comparator, which have the same functions as those of the components 3709 and 3711, 3713, 3715, and 3717 shown in FIG. 25 in the 16th embodiment.

Reference numerals 3821 and 3823 denote counters, which correspond to the counter 3719 shown in FIG. 25, and have "10" and "5" as initial values.

As is apparent from FIG. 26, the 17th embodiment adopts two calculation units. An arrangement made up of components 3705, 3709, 3711, 3713, 3715, and 3807 shown in the lower part of FIG. 26 will be called the first calculation unit, and an arrangement made up of the components 3805, 3809, 3811, 3813, 3815, and 3808 will be called the second calculation unit.

The first calculation unit calculates the code amount difference value in the order of $D_{10}$, $D_9$, $D_8$, $D_7$, and $D_6$, and the second calculation unit calculates the code amount difference value in the order of $D_5$, $D_4$, $D_3$, $D_2$, and $D_1$.

The difference values calculated by the respective calculation units are compared with the predetermined value N by the first and second comparators 3717 and 3817. Based on the comparison results, the counters 3821 and 3823 count down the count values. If an output from either of the first and second comparators 3717 and 3817 changes from "0" to "1", the value of the changed counter is adopted as an optical k parameter value.

This is because the comparison results $C_{10}$ to $C_1$ change from "0" to "1" at only one point, as described above, and both outputs from the first and second comparators 3717 and 3817 do not change from "0" to "1".

If these outputs do not change to the end, all the comparison results $C_p$ are "0", and the optimal k parameter value is also "0". This value "0" is output from the counter 3823 in the second calculation unit.

Note that the 17th embodiment employs the two calculation units, but three or more calculation units can be employed.

Since a plurality of pairs of calculation units and comparators can be used to divide the maximum number of effective bits of input data by the pairs of calculation units and comparators and parallel-process the image data, the 17th embodiment can determine an optimal k parameter value at a higher speed.

<18th Embodiment>

The 18th embodiment according to the 18th embodiment will be described. The arrangement of a coding apparatus in the 18th embodiment is the same as in FIG. 1.

The 18th embodiment uses two pairs of calculation units and comparators for performing recursive calculation, like the 17th embodiment, but uses only one accumulator. An optimal k parameter value is determined using a calculation unit (to be referred to as the first calculation unit hereinafter) for performing recursive calculation from $S_6$ to $S_{10}$ as outputs from one accumulator, and a calculation unit (to be referred to as the second calculation unit hereinafter) for performing recursive calculation from $S_5$ to $S_1$, similar to the second calculation unit in the 17th embodiment.

In the first calculation unit, an equation for performing recursive calculation from $S_6$ to $S_{10}$ is based on equation (10) attained by rewriting equation (6):

$$S_p = 2 \times S_{p+} + B_{p+1} \quad (6)$$

$$S_{p+1} + (S_p - B_{p+1})/2 \quad (10)$$

Figure 27:
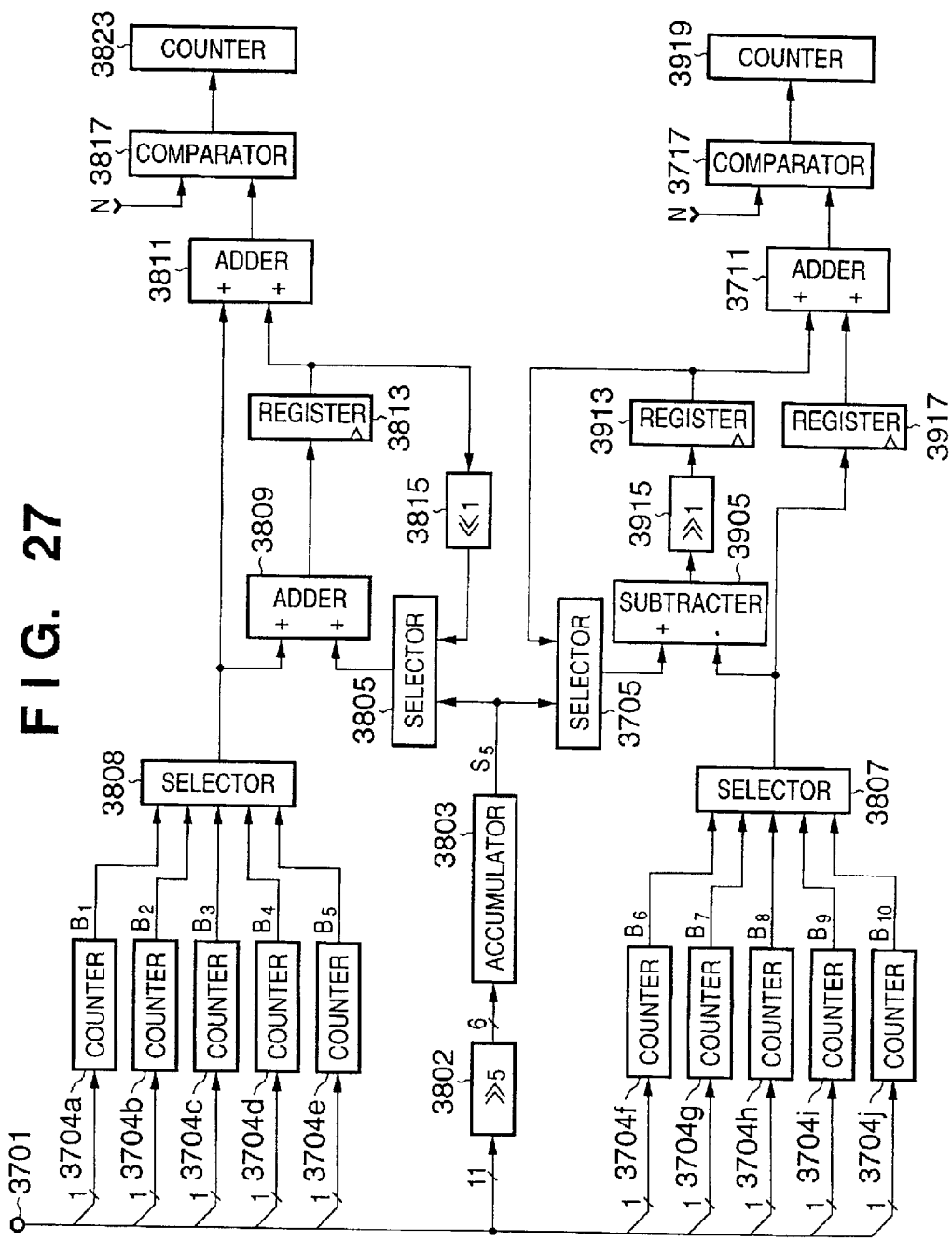
FIG. 27 is a block diagram showing the detailed arrangement of a coding parameter selection unit in the 18th embodiment.

FIG. 27 shows the detailed arrangement of a coding parameter selection unit 105 in the 18th embodiment. In FIG. 27, the same reference numerals as in FIG. 26 described in the 17th embodiment denote the same parts, and a description thereof will be omitted.

In FIG. 27, reference numeral 3905 denotes a subtracter for performing subtraction processing in equation (10); 3915, a 1-bit shifter for realizing division in equation (10) by shifting 1 bit to the right; 3917, a register for delaying $B_p$ in order to synchronize $S_p$ and $B_p$ input to an adder 3711; and 3919, a counter for counting up the count value when an input comparison result $C_p$ is "1".

The upper part in FIG. 27 shows the second calculation unit, which performs the same operation as in the second calculation unit shown in FIG. 26. The lower part in FIG. 27 shows the first calculation unit, which calculates equation (10) based on $S_5$ obtained from the accumulator 3803 to obtain the code amount at the variable-length code portion in the order of $S_6$, $S_7$, $S_8$, $S_9$, and $S_{10}$ while corresponding $B_6$, $B_7$, $B_8$, $B_9$, and $B_{10}$ are added to obtain code amount difference values $D_6$, $D_7$, $D_8$, $D_9$, and $D_{10}$.

Processing in the first calculation unit will be explained in detail. $S_5$ selected by a selector 3705 and $B_6$ selected by a selector 3807 are input to the subtracter 3905 to calculate $S_5 - S_6$. The difference is passed through the 1-bit shifter 3915 to obtain $(S_5 - S_6)/2 = S_6$ from equation (10) and hold it by a register 3913.

$B_6$ selected by the selector 3807 is held by the register 3917, and the values held by the two registers 3913 and 3917 are added by the second adder 3711 to attain $S_6 + B_6 = D_6$.

In the next cycle, the selector 3705 selects $S_6$ as an output value from the register 3913, and the selector 3807 selects $B_7$. By the same calculation, $S_7$ and $D_7$ are attained.

A comparator 3717 compares the difference value attained by the second adder 3711 with the predetermined value N, and the counter 3919 counts up the count value based on the comparison result. The counter 3919 has "5" as an initial value, and counts up the count value one by one every time a comparison result "1" is input. For example, if the comparison results $C_6$, $C_7$, $C_8$ $C_9$, and $C_{10}$ in the comparator 3717 are 1, 1, 0, 0, and 0, the count value of the counter 3919 is counted up by two from "5", and "7" is used as a k parameter value.

The counter 3919 in the first calculation unit determines the count value when the comparison result of the comparator 3717 changes from "1" to "0". If the comparison result is "0" from the beginning, the count value does not change from the initial value. To the contrary, a counter 3823 in the second calculation unit determines the count value when the comparison result of a comparator 3817 changes from "0" to "1". If the comparison result is "1" from the beginning, the count value does not change from the initial value.

When both the values of the counters 3919 and 3823 do not change from the initial values, i.e., the comparison results of the comparators 3717 and 3817 are "0" and "1" from the beginning, the count values remain "5" as the initial values, and "5" is used as a k parameter value.

In other cases, the comparison result of either the comparator 3717 or 3817 necessarily changes, and the count value of either the counter 3919 or 3823 necessarily changes. In this case, a changed/determined count value is used as a k parameter value.

Note that the 18th embodiment has exemplified recursive calculation from $S_5$ to $S_1$ and $S_{10}$, but recursive calculation may start from $S_1$ and $S_{10}$ at the two ends to $S_5$.

Even with one accumulator, the 18th embodiment can determine an optimal k parameter value at a higher speed, similar to the 17th embodiment.

<19th Embodiment>

The 19th embodiment according to the present invention will be described. The arrangement of a coding apparatus in the 19th embodiment is the same as in FIG. 1.

As is apparent from the description of the 18th embodiment, two pairs of calculation units and comparators do not simultaneously execute effective operation. In the 19th embodiment, two pairs of calculation units and comparators are reduced to one pair, and the operations of the two pairs are realized by sharing one pair. The contents of recursive calculation applied in the two pairs are different between equations (6) and (10), and cannot be simply shared by one pair in the 19th embodiment. For this reason, the 19th embodiment requires the following new building component.

Figure 28:
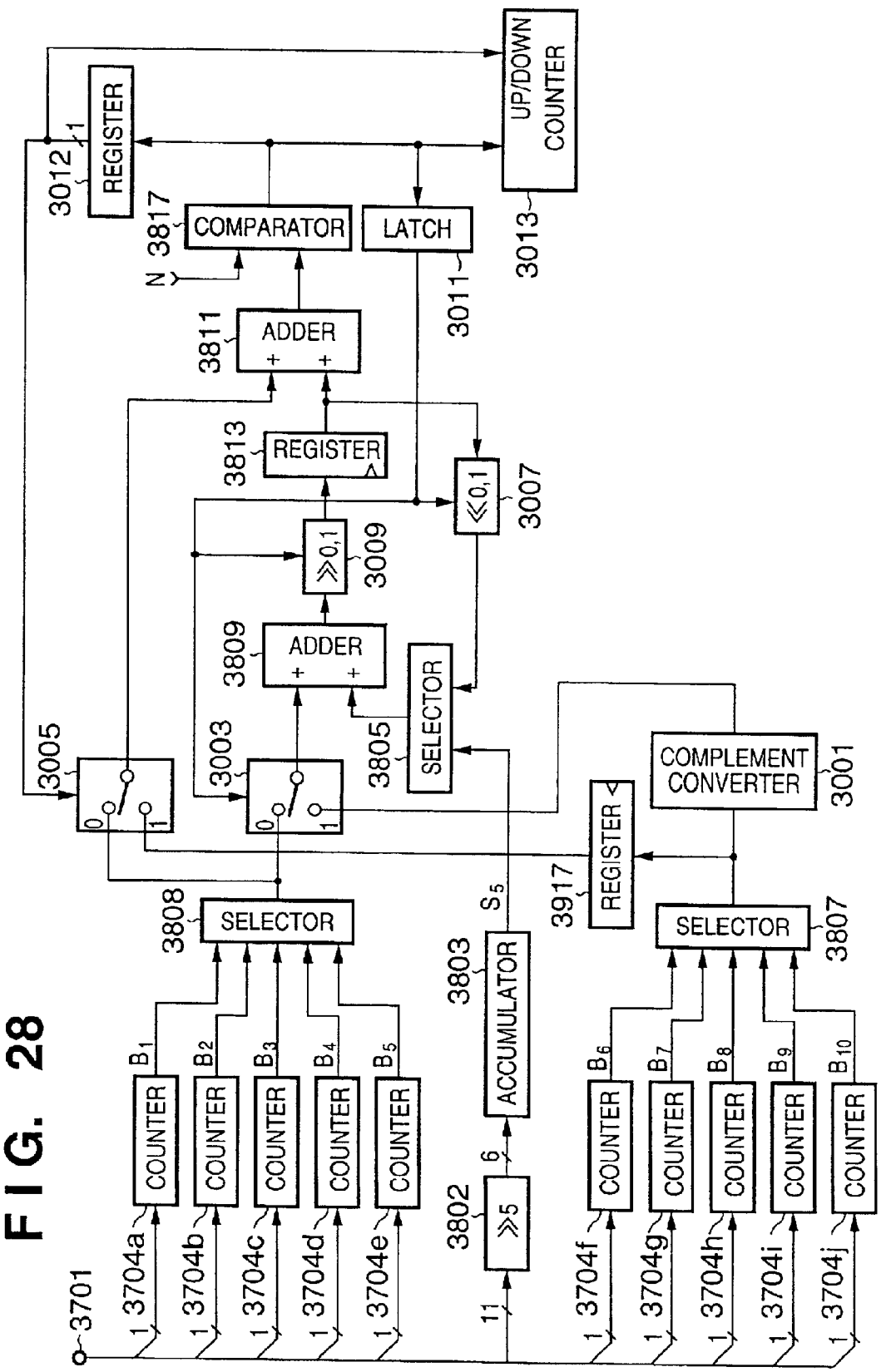
FIG. 28 is a block diagram showing the detailed arrangement of a coding parameter selection unit in the 19th embodiment.

FIG. 28 shows the detailed arrangement of a coding parameter selection unit 105 in the 19th embodiment. In FIG. 28, the same reference numerals as in FIG. 27 described in the 18th embodiment denote the same parts, and a description thereof will be omitted.

In FIG. 28, reference numeral 3001 denotes a complement converter for converting an output value from a selector 3807 into a two's complement; 3003, a selector for selecting either of an output from the complement converter 3001 and an output from a selector 3808; 3005, a selector for selecting either of an output from a register 3917 and an output from the selector 3808; 3007, a 1-bit shifter capable of performing ON/OFF operation of 1-bit left shift in accordance with a control signal; 3009, a 1-bit shifter capable of performing ON/OFF operation of 1-bit right shift in accordance with a control signal; 3011, a 1-bit latch for latching $C_5$ as the first comparison result (outputting an input value in the same cycle); 3012, a 1-bit register for holding the first comparison result $C_5$ (outputting an input value in the next cycle); and 3013, an up/down counter.

In the arrangement shown in FIG. 28, $D_1$ is calculated using $S_5$ output from the accumulator 3803 to obtain the comparison result $C_5$.

The selector 3003, and 1-bit shifters 3007 and 3009 are controlled by a 1-bit control signal output from the latch 3011. The latch 3011 latches "0" as an initial value, and outputs it simultaneously when receiving and latching the comparison result $C_5$ from a comparator 3817 that is obtained in the second cycle. Similarly, the latch 3011 latches and outputs the comparison result in the third and subsequent cycles.

Similarly, the register 3012 holds an initial value "0", receives and holds the comparison result $C_5$ from the comparator 3817 that is obtained in the second cycle, and outputs the comparison result $C_5$ in the third cycle.

Based on the initial value "0", the selectors 3003 and 3005 select an output from the selector 3808. In the first processing cycle, the selector 3808 outputs "0", and sequentially outputs $B_5$, $B_4$, $B_3$, $B_1$, and $B_1$ from the next cycle.

A selector 3805 selects the output $S_5$ from the accumulator 3803 only in the first cycle, and selects an output from the 1-bit shifter 3007 in the next and subsequent cycles.

An adder 3809 adds $S_5$ and "0" in the first cycle, and the sum $S_5$ is input to the adder 3811 via the register 3813 in the next cycle.

$B_5$ output from the selector 3808 in the second cycle is input to the adder 3811 via the selector 3005, and the adder 3811 outputs $S_5+B_5=D_5$. The comparator 3817 compares the sum $D_5$ with the predetermined value N to output the comparison result $C_5$ This comparison result $C_5$ is supplied to the latch 3011 and register 3012, and input to the up/down counter 3013.

The comparison result $C_5$ obtained in the second cycle defines the contents of recursive calculation in the second and subsequent cycles via the latch 3011. In other words, the comparison result $C_5$ controls selection operation of the selector 3003, the calculation contents of the adder 3809, and shift operation of the 1-bit shifters 3007 and 3009, thereby achieving calculation given by equation (6) or (10).

Since calculation of $D_p$ is delayed by one cycle from calculation of $S_p$, the operation of the selector 3005 which selects $B_p$ necessary for calculation of $D_p$ depends on the comparison result $C_5$ in the third and subsequent cycles. Therefore, the selector 3005 is controlled by an output from the register 3012.

When the comparison result $C_5$ is "0", the final "0" position among the comparison results $C_4$, $C_3$, $C_2$, and $C_1$ is important, and thus equation (6) is desirably applied as recursive calculation. At this time, the selector 3003 keeps selecting an output from the selector 3808, and the shifter 3007 executes 1-bit left shift operation. The selector 3005 also keeps selecting an output from the selector 3808.

When the comparison result $C_5$ is "1", the final "1" position among the comparison results $C_6$, $C_7$, $C_8$, $C_9$, and $C_{10}$ is important, and thus equation (10) is desirably applied as recursive calculation. At this time, the selector 3003 selects an output from the complement converter 3001, and the shifter 3009 executes 1-bit right shift operation.

The selector 3005 selects an output from the register 3917 from the third cycle.

The up/down counter 3013 holds "5" as an initial value, similar to the 18th embodiment. The up/down counter 3013 operates as a down counter for a control signal "0" from the register 3012, and as an up counter for a control signal When the up/down counter 3013 operates as a down counter, the counter 3013 actually counts down the count value for a comparison result $C_p$ "0". When the up/down counter 3013 operates as an up counter, the counter 3013 actually counts up the count value for a comparison result $C_p$ "1". As described above, the register 3012 outputs "0" up to the second cycle, and outputs the comparison result $C_5$ from the third cycle. Thus, the up/down counter 3013 counts down the count value when the comparison result $C_5$ input in the second cycle is "0", but does not count down the count value when the comparison result $C_5$ is "1". In the third and subsequent cycles, the up/down counter 3013 is fixed to either count-down operation or count-up operation on the basis of the comparison result $C_5$, and counts the count value to the last.

In the arrangement shown in FIG. 28, the first comparison result $C_5$ is output from the latch 3011 in the second cycle. Alternatively, an adder for adding the output $S_5$ from the accumulator 3803 and the output $B_5$ from the counter 3704e, and a comparator for comparing the sum $D_5$ (=$S_5+B_5$) with the predetermined value N may be separately arranged to calculate the comparison result $C_5$ between $D_5$ and N by different routs at a high speed, thereby outputting the comparison result $C_5$ from the latch 3011 in the first cycle.

Even with a smaller-scale arrangement having only one pair of calculation unit and comparator, the 19th embodiment can determine an optimal k parameter value at a higher speed, similar to the 18th embodiment.

<20th Embodiment>

The 20th embodiment according to the present invention will be described. The arrangement of a coding apparatus in the 20th embodiment is the same as in FIG. 1.

The 16th to 19th embodiments have exemplified simple sequential processing without skipping an intermediate value during calculation. In the 20th embodiment, $S_p$ and $D_p$ are calculated for every other p=10, 8, 6, . . . When the $C_p$ value changes from "0" to "1", the p value is returned to a previous one. $S_p$ and $D_p$ for this p value are calculated and compared with the predetermined value N to obtain a k parameter value in a shorter cycle.

An equation applied in the 20th embodiment can be attained by recursively applying equation (6):

$$S_p = 2 \times S_{p+1} + B_{p+1} \tag{6}$$
$$(S_{p-2} = 2 \times S_{p-1} + B_{p-1})$$

Recursively applying equation (6) yields $$S_{p-2} = 2 \times (2 \times S_p + B_p) + B_{p-1} \tag{11}$$
$$= 4 \times S_p + 2 \times B_p + B_{p-1}$$

Equation (11) enables calculating $S_8$ and $S_6$ from $S_{10}$ and $S_8$, respectively. The 20th embodiment uses equation (10) when the $C_p$ value changes from "0" to "1", and the p value is returned to a previous one.

Figure 29:
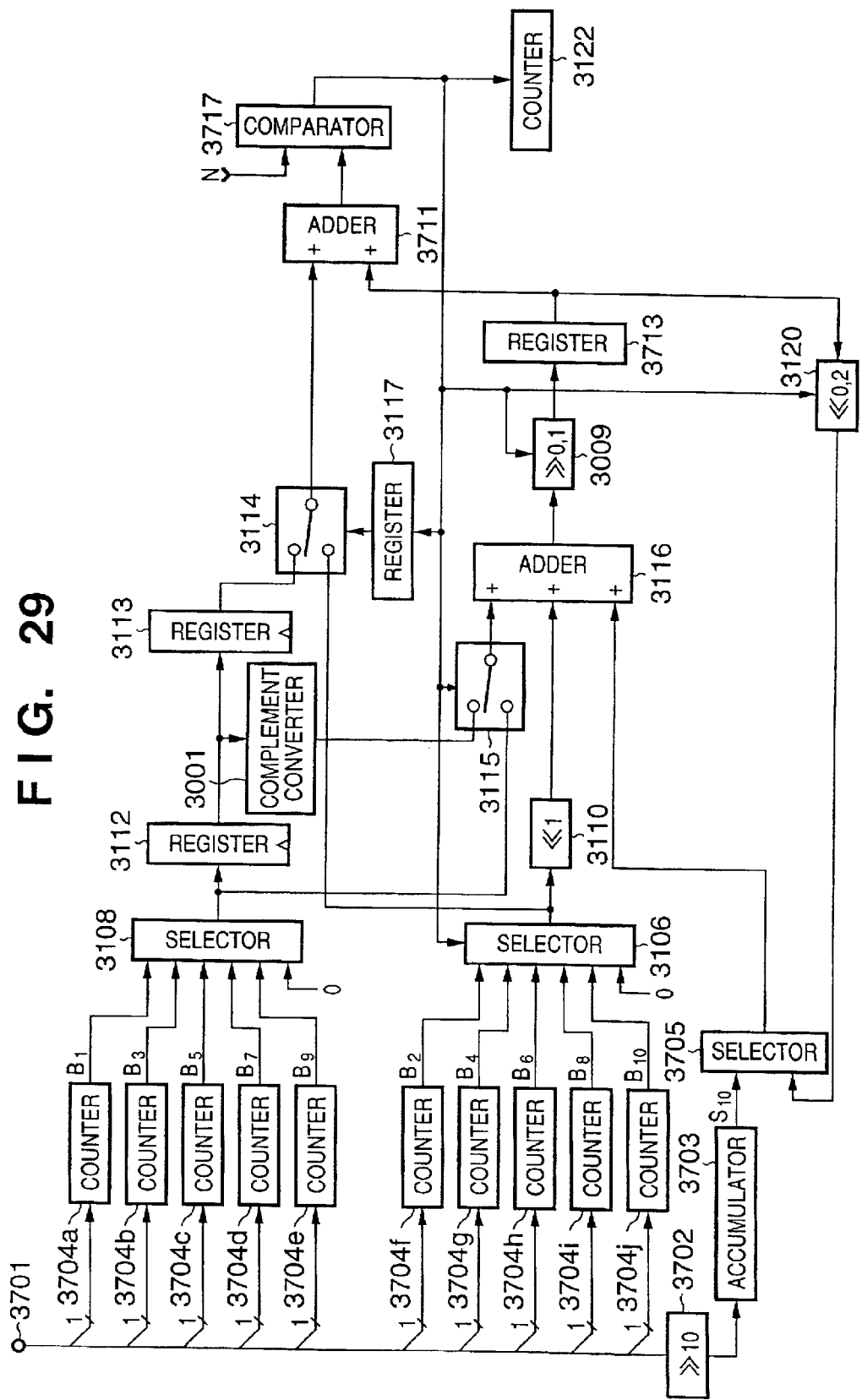
FIG. 29 is a block diagram showing the detailed arrangement of a coding parameter selection unit in the 20th embodiment.

FIG. 29 shows the detailed arrangement of a coding parameter selection unit 105 in the 20th embodiment. In FIG. 29, the same reference numerals as in FIG. 25 described in the 16th embodiment or FIG. 28 described in the 19th embodiment denote the same parts, and a description thereof will be omitted.

In FIG. 29, reference numeral 3106 denotes a selector for selecting $B_p$ in the second term of equation (11); 3108, a selector for selecting $B_{p-1}$ in the third term of equation (11); 3110, a 1-bit shifter for shifting 1 bit to the left in order to double $B_p$; 3112, a register for holding an output from the selector 3108; 3113, a register for holding an output from the register 3112; 3114, a selector for switching between an output from the register 3113 and an output from the selector 3106; 3115, a selector for selecting $B_p$ in the third term of equation (11) on the basis of a control signal; 3116, a 3-input adder for adding three terms in equation (11); 3117, a register for delaying a comparison result output from a comparator 3717 by one cycle; 3120, a 2-bit shifter for shifting 2 bits to the left in order to multiply $S_p$ four times; and 3122, a counter for counting the count value in units of 2 for count-down operation and in units of 1 for count-up operation.

Similar to the 16th to 19th embodiments, a register 3713 receives $S_{10}$ in the first cycle, and outputs it in the second cycle. An adder 3711 adds $B_{10}$ to $S_{10}$, and the comparator 3717 compares the obtained $D_{10}$ with the predetermined value N to attain the comparison result $C_{10}$. If the comparison result $C_{10}$ is "0", $S_8$ is calculated using $S_{10}$ output from the register 3713.

In calculating $S_8$, the selector 3106 outputs $B_{10}$, and the selector 3108 outputs $B_9$.

Similarly, the register 3713 outputs $S_8$ in the third cycle. If the comparison result $C_8$ in the comparator 3717 is "0", $S_6$ is calculated using $S_8$ output from the register 3713. In calculating $S_6$, the selector 3106 outputs $B_8$, and the selector 3108 outputs $B_7$.

In the next cycle, the register 3713 outputs $S_6$. Assume that the comparison result $C_6$ is "1". This comparison result is sent as a control signal to the selectors 3115 and 3106, a 1-bit shifter 3009, and the 2-bit shifter 3120.

Since the control signal has been "0", the calculation result input to the register 3713 is based on equation (11). When the control signal (comparison result) changes to "1", the calculation contents change to ones based on equation (10). That is, the selector 3115 selects an output from the complement converter 3001, the selector 3106 outputs "0", and the bit shifters 3009 and 3120 change to 1-bit right shift operation and no shift operation, respectively.

$B_7$ output from the register 3112 passes through the complement converter 3001, and the adder 3116 adds $S_6$ to $B_7$ to output $S_6$–$B_7$. The sum is shifted by one bit to the right by the 1-bit shifter 3009, and $(S_6$–$B_7)/2=S_7$ is sent to the register 3713.

In the next cycle, the register 3713 outputs $S_7$, and the adder 3711 adds the output $B_7$ from the register 3113 via the selector 3114 to $S_7$ to attain $D_7$. The comparator 3717 obtains the comparison result $C_7$. Note that switching of the selector 3114 is controlled based on a signal prepared by delaying the comparison result in the comparator 3717 by one cycle by the register 3117.

Comparison results obtained by the above operation are $C_{10}$, $C_8$, $C_6$, and $C_7$ whose values are 0, 0, 1, and "undefined". Based on these comparison results, the counter 3122 operates as follows.

The counter 3122 starts count operation from an initial value "10". The counter 3122 counts down the count value in units of 2 upon reception of the first "0" and the next "0", holds a count value "6", and shifts to count-up operation upon reception of the next "1".

If the $C_7$ value is "1", the counter 3122 counts up the count value by one in the last count-up operation to change the count value of the counter 3122 to "7", and outputs "7" as a k parameter value.

If the $C_7$ value remains "0", the counter 3122 holds the count value "6" without any count-up operation. In this case, the counter 3122 outputs "6" as a k parameter value.

In the 20th embodiment, the comparison result $C_p$ is basically calculated for every other input except for the last processing for determining the k parameter. Alternatively, the comparison result $C_p$ can be calculated for every second or third input.

The 20th embodiment can realize higher-speed calculation by not sequentially performing but properly skipping calculation for obtaining an optimal k parameter.

<21st Embodiment>

The 21st embodiment according to the present invention will be described. The arrangement of a coding apparatus in the 21st embodiment is the same as in FIG. 1.

Figure 30A:
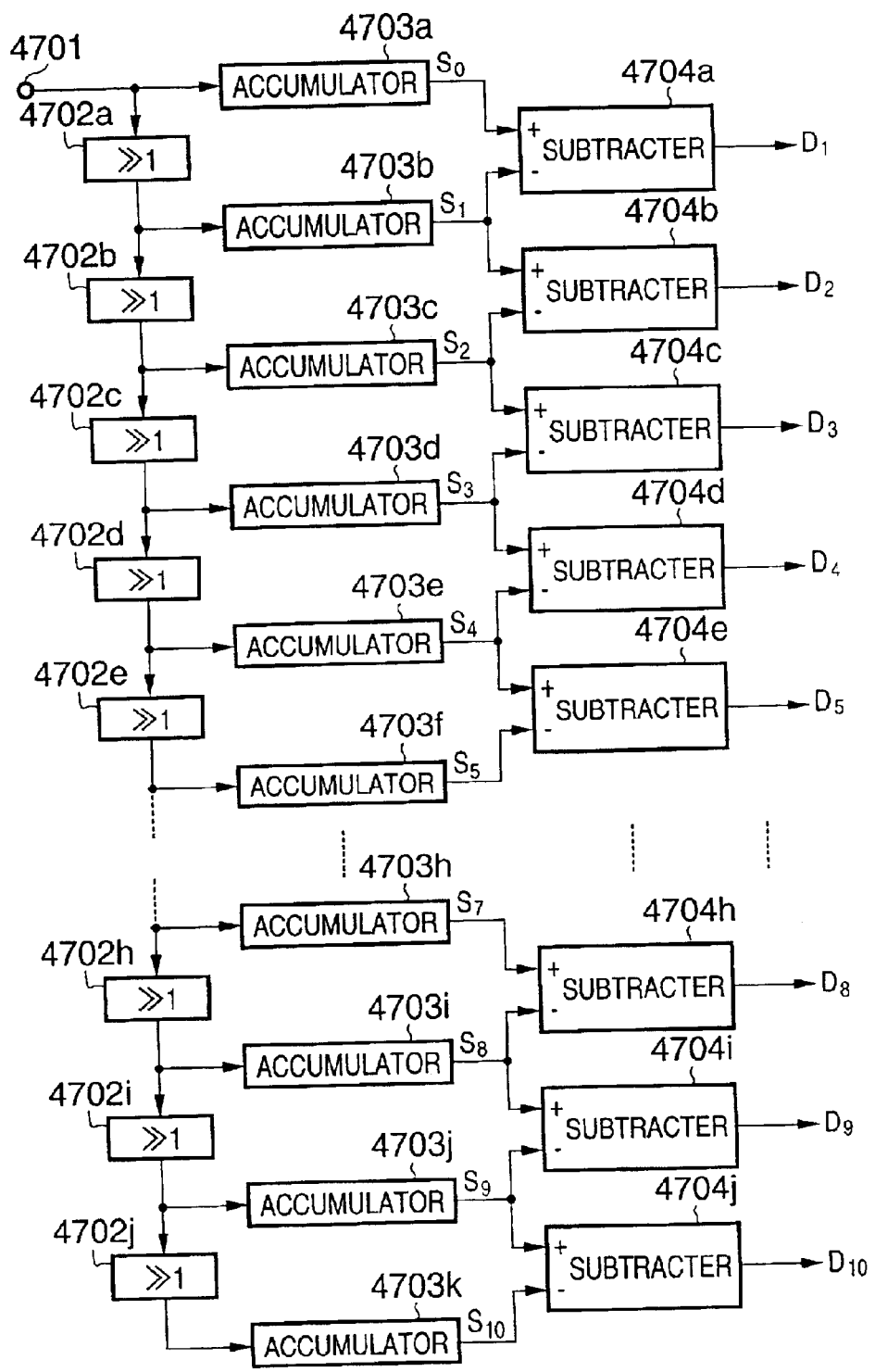
FIGS. 30A and 30B are block diagrams each showing the detailed arrangement of a coding parameter selection unit in the 21st embodiment.
Figure 30B:
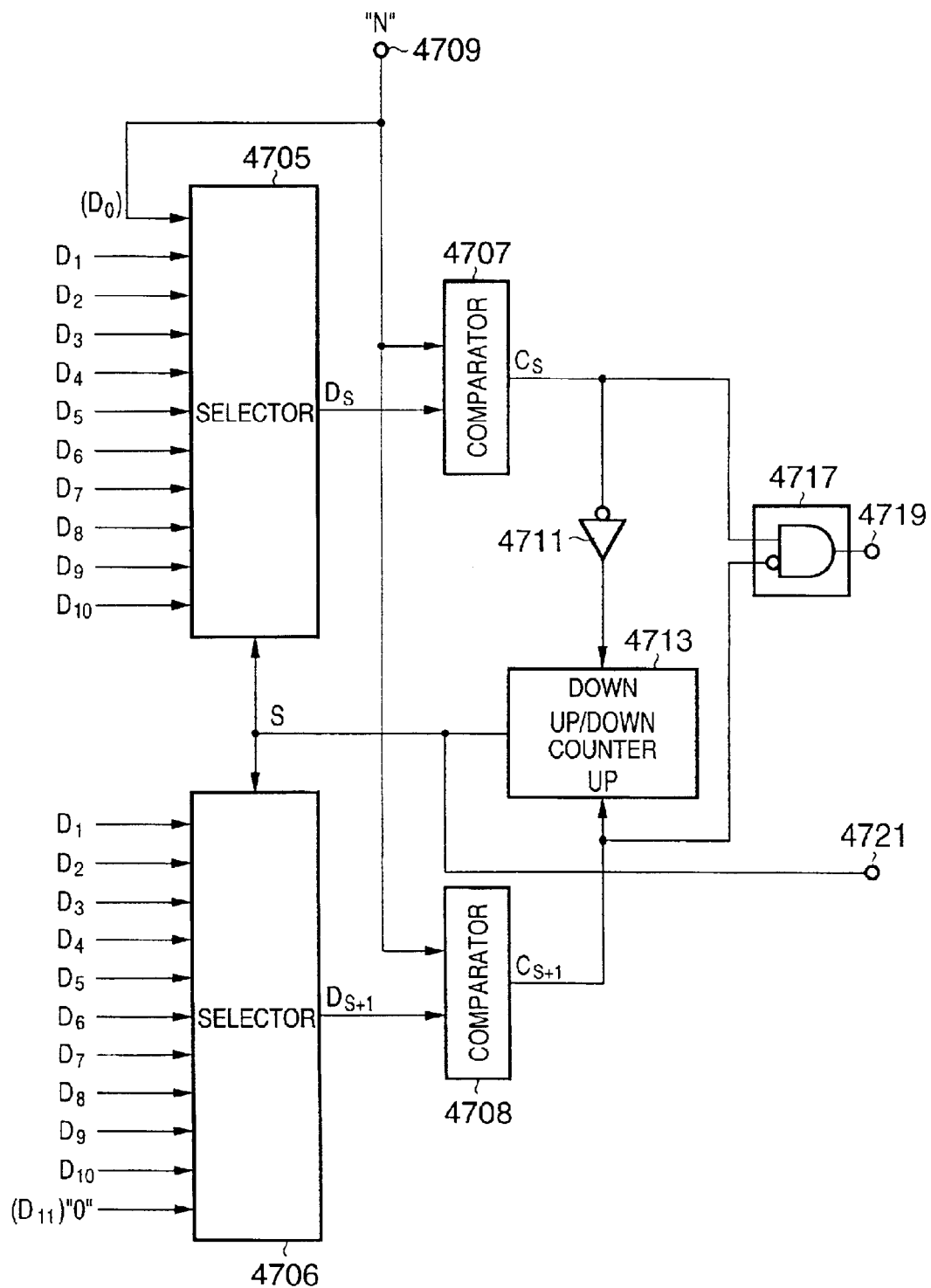

FIGS. 30A and 30B show the block arrangement of a coding parameter selection unit 105 in the 21st embodiment.

In FIG. 30A, reference numeral 4701 denotes a terminal for inputting a quantized value sent from a coefficient quantization unit 104. Assume that the maximum number of effective bits of data input from the terminal 4701 is 11.

Reference numerals 4702a, 4702b, 4702c, . . . , 4702j denote bit shifters for sequentially shifting input quantized value data to the right in units of 1 bit ; 4703a, 4703b, 4703c, . . . , 4703k, accumulators for accumulating N input data; and 4704a, 4704b, 4704c, . . . , 4704j, subtracters for calculating the difference between outputs from two adjacent accumulators.

In FIG. 30B, reference numerals 4705 and 4706 denote first and second selectors for selecting any one of outputs $D_1$ to $D_{10}$ from the subtracters 4704a to 4704j.

Reference numeral 4707 denotes a first comparator for comparing an output value from the first selector 4705 with the predetermined value N; 4708, a second comparator for comparing an output value from the second selector 4706 with the predetermined value N; and 4709, a terminal for inputting the predetermined value N.

As described above, the predetermined value N corresponds to the number of quantized values in the subblock. As the N value, the number of quantized values is counted in advance in quantization by the coefficient quantization unit 104.

Reference numeral 4711 denotes an inverter for inverting an output signal from the first comparator 4707; 4713, an up/down counter for counting up/down the count value on the basis of the comparison results of the first and second comparators 4707 and 4708; 4717, a detector for detecting the end of processing in the coding parameter selection unit 105; 4719, a terminal for outputting a signal from the detector 4717; and 4721, a terminal for outputting an optimal value of an obtained k parameter.

Accumulated values $S_0$ to $S_{10}$ obtained by the accumulators 4703a to 4703k represent code amounts at the variable-length code portion for the k parameter=0, 1, 2, . . . , 9, 10. That is, the accumulators 4703a to 4703k output $S_0$ to $S_{10}$ after all the quantized values in the subblock are input.

The output values $S_0$ to $S_{10}$ from the accumulators are passed through the subtracters 4704a to 4704j to obtain difference values $D_p$ (p=1, 2, . . . , 9, 10) of the variable-length code amount defined by equation (7). These difference values $D_p$ are input to the first and second selectors 4705 and 4706.

The predetermined value N input from the terminal 4709 is input as $D_0$ to the first selector 4705. Although $D_0$ does not meet the above-mentioned definition, the coding parameter selection unit 105 in the 21st embodiment can normally function so long as $D_0$ satisfies $D_0 \geq N$.

An operation when the initial value of the up/down counter 4713 is "0" will be explained.

The counter 4713 holds an initial value "0" in accordance with a control signal (not shown) until all quantized values are input. After all the quantized values are input, the counter 4713 cancels this holding, and operates as follows.

The value of the counter 4713 is sent to the first and second selectors 4705 and 4706. When the count value is S, the first and selectors 4705 and 4706 select and output $D_S$ and $D_{S+1}$, respectively. If the counter 4713 holds the initial value, the count value S is "0", and the first and second selectors 4705 and 4706 select $D_0$ and $D_1$, respectively.

$D_0$ and $D_1$ are respectively sent to the first and second comparators 4707 and 4708 where $D_0$ and $D_1$ are compared with the predetermined value N. As described above, the predetermined value N satisfies $D_0 \geq N$. Assume that $D_0 \geq D_1 \geq D_2 \geq D_3 \geq N > D_4 \geq D_5 \ldots$ holds. Since both $D_0$ and $D_1$ are equal to or larger than N, both the first and second comparators 4707 and 4708 output "1".

The output from the first comparator 4707 is inverted to "0" by the inverter 4711, and input to the count-down control terminal of the up/down counter 4713. On the other hand, the output "1" from the second comparator 4708 is directly input to the count-up control terminal of the up/down counter 4713. Hence, the up/down counter 4713 enters the count-up mode, and counts up the count value from "0" to "1" based on a clock input (not shown).

For the count value =1, the first and second selectors 4705 and 4706 output $D_1$ and $D_2$, respectively. Since $D_1, D_2 \geq N$, the up/down counter 4713 counts up the count value from "1" to "2", similar to the case of the count value=0. Also for the count value=2, the up/down counter 4713 counts up the count value from "2" to "3".

However, when the count value reaches "3", the comparison results in the first and second comparators 4707 and 4708 change from the previous ones, and the operation of the up/down counter 4713 also changes. In this case, the first and second selectors 4705 and 4706 output $D_3$ and $D_4$, and the corresponding comparators 4707 and 4708 output "1" and "0". In other words, an output from the second comparator 4708 changes, and an input to the count-up terminal of the up/down counter 4713 changes from "1" to "0". Accordingly, the up/down counter 4713 holds the count value "3" without executing any count-up/count-down operation.

The count value in the up/down counter 4713 is output from the terminal 4721. At this time, the detector 4717 detects that outputs from the first and second comparators 4707 and 4708 change to "1" and "0", and outputs "1" to the terminal 4719. Then, the end of optimal value selection processing for the k parameter is externally notified.

The operation when the initial value of the up/down counter 4713 is "0" has been described. An operation when the initial value is "10" will be explained.

When the count value of the up/down counter 4713 is "10", the first and second selectors 4705 and 4706 select $D_{10}$, and "0" as $D_{11}$, respectively. Since $D_{10}$ and "0" are smaller than N, both the first and second comparators 4707 and 4708 output "0". An output from the first comparator 4707 is inverted to "1" by the inverter 4711, and supplied to the count-down control terminal of the up/down counter 4713. Then, the up/down counter 4713 counts down the count value from "10" to "9" upon reception of one clock (not shown).

When the up/down counter 4713 has the count value=9, the first and second selectors 4705 and 4706 output $D_1$ and $D_{10}$, respectively. Since $D_9, D_{10} < N$, the up/down counter 4713 counts down the count value from "9" to "8", similar to the case of the count value="10". Also for the count values=8, 7, 6, 5, and 4, the up/down counter 4713 counts down the count value from "8" to "3".

When the count value reaches "3", the comparison results in the first and second comparators 4707 and 4708 change from the previous ones, and the operation of the up/down counter 4713 also changes. In this case, the first and second selectors 4705 and 4706 output $D_3$ and $D_4$, and the corresponding comparators 4707 and 4708 output "1" and "0", respectively. In other words, an output from the first comparator 4707 changes, and an input to the count-down terminal of the up/down counter 4713 changes from "1" to "0". Accordingly, the up/down counter 4713 holds the count value "3" without executing any count-up/count-down operation.

The count value in the up/down counter 4713 is output from the terminal 4721. At this time, the detector 4717 detects that the outputs from the first and second comparators 4707 and 4708 change to "1" and "0", and outputs "1" to the terminal 4719. Then, the end of optimal value selection processing for the k parameter is externally notified.

Since the up/down counter 4713 finally converges on the same count value regardless of an initial value "0" or "10", the same result can be obtained as an optimal k parameter. Even when an initial value other than "0" and "10" is set, the same result can be obtained.

If the initial value is limited to "0", the up/down counter 4713 need not perform any count-down operation, and can be replaced by a simple up counter. Similarly, if the initial value is limited to "10", the up/down counter 4713 need not perform any count-up operation, and can be replaced by a down counter.

As described above, the 21st embodiment can determine an optimal k value at a high speed by comparing the difference value of the variable-length code amount with a predetermined value for each k by a simple arrangement in performing Golomb Rice coding for an image data stream based on the k parameter. <Modification of 21st Embodiment>

Figure 31:
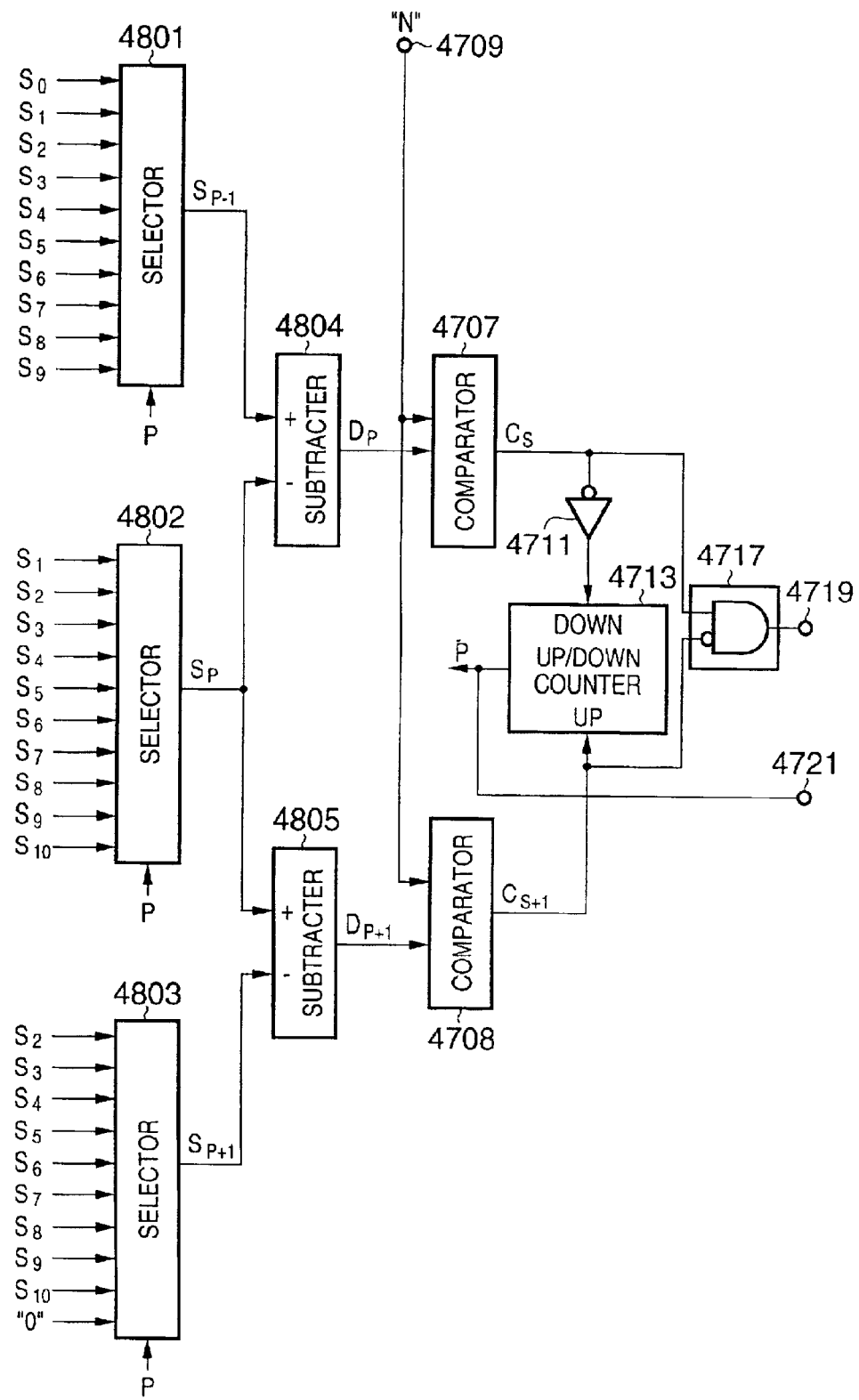
FIG. 31 is a block diagram showing the detailed arrangement of the coding parameter selection unit in the 21st embodiment.

The arrangement of the coding parameter selection unit 105 described in the 21st embodiment may be modified into an arrangement shown in FIG. 31. In this arrangement, the subtracters (4704a to 4704j) and selectors (4705, 4706) shown in FIGS. 30A and 30B are exchanged to reduce the 10 subtracters 4704a to 4704j to two subtracters (4804, 4805).

That is, selectors 4801 to 4803 shown in FIG. 31 directly receive outputs $S_0$ to $S_{10}$ from the accumulators 4703a to 4703k. The respective selectors output $S_{p-1}, S_p$, and $S_{p-1}$ in accordance with the count value P of the up/down counter 4713. $S_{p-1}, S_p$, and $S_{p-1}$ are input to the subtracters 4804 and 4805. Then, the subtracter 4804 outputs $D_p$ as $S_{p-1}-S_p$, whereas the subtracter 4805 outputs $D_{9-1}$, as $S_p-S_{p+1}$.

The remaining operation is the same as in the 21st embodiment, and an optimal k parameter value can be attained.

<22nd Embodiment>

The 22nd embodiment according to the present invention will be described. The arrangement of a coding apparatus in the 22nd embodiment is the same as in FIG. 1.

Figure 32:
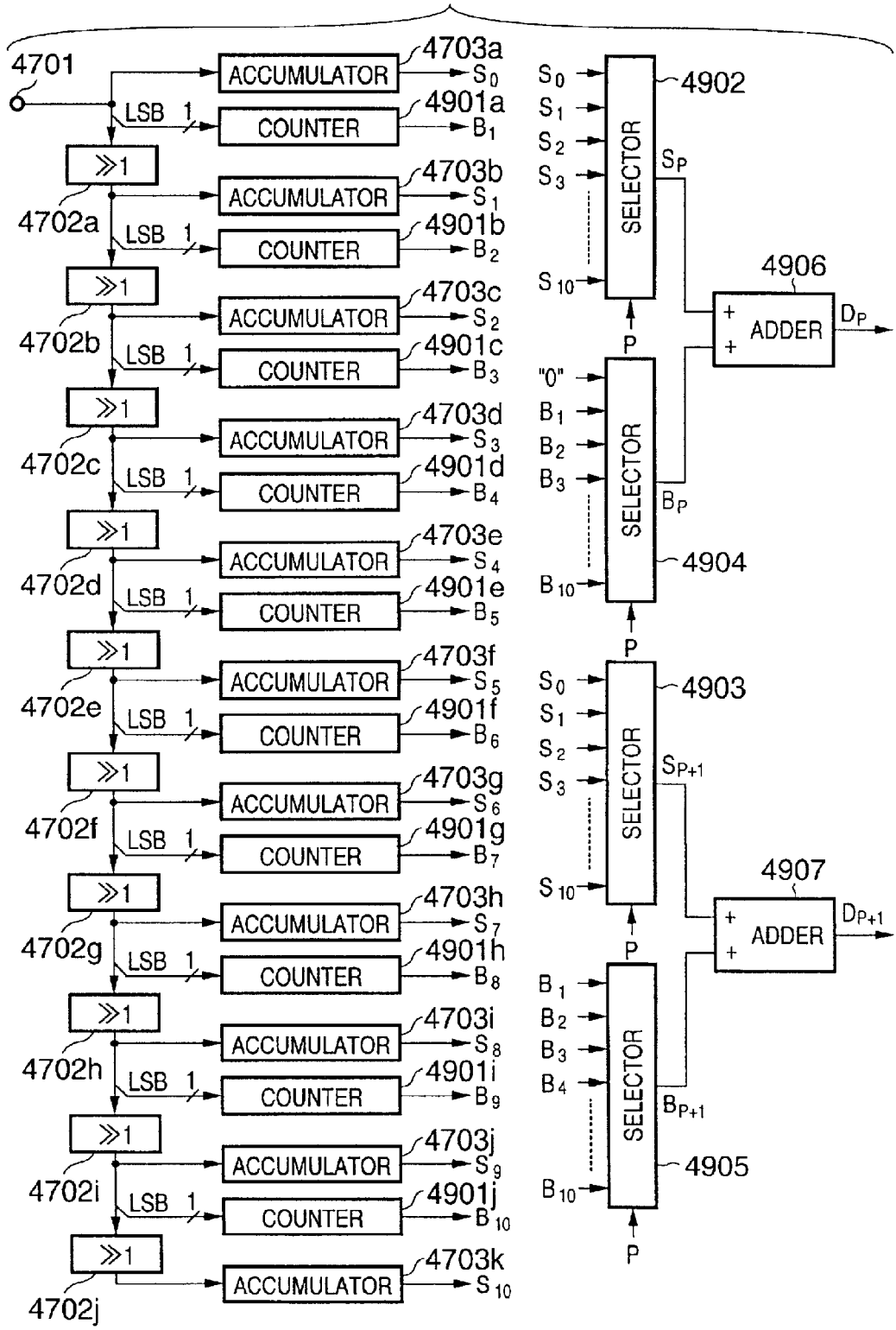
FIG. 32 is a block diagram showing the detailed arrangement of a coding parameter selection unit in the 22nd embodiment.

FIG. 32 shows the detailed arrangement of a coding parameter selection unit 105 in the 22nd embodiment. In FIG. 32, the same reference numerals as in FIGS. 30A and 30B described in the 21st embodiment denote the same parts, and a description thereof will be omitted.

The 21st embodiment uses the subtracters (4704a to 4704j) in order to obtain $D_p$ and $D_{p+1}$, as difference values of the variable-length code amount. Instead, the 22nd embodiment uses an adder. A method of obtaining $D_p$ and $D_{p+1}$ by addition is given by equation (7):

$$D_p = S_{p+1} - S_p = (2 \times S_p + B_p) - S_p = S_p + B_p \quad (p \geq 1) \qquad (7)$$

Applying equation (7) requires a counter for counting the number ($B_1$, $B_2$, $B_3$, . . . $B_{10}$, $B_{11}$) of "1"s in each bit plane of an input quantized value.

In FIG. 32, reference numerals 4901$a$, 4901$b$, 4901$c$, . . . , 4901$j$ denote counters for counting the number of "1"s in each bit plane of an input quantized value; 4902 and 4903, selectors for selecting and outputting $S_p$ and $S_{p+1}$ in correspondence with the count value P of an up/down counter 4713; 4904 and 4905, selectors for selecting and outputting $B_p$ and $B_{p+1}$ in correspondence with the count value P of the up/down counter 4713; and 4906 and 4907, adders for adding $S_p$ and $B_p$ and $S_{p+1}$ and $B_{p+1}$, respectively.

After $D_p$ and $D_{9+1}$ are calculated by the arrangement shown in FIG. 32, processing is done by the same arrangement as the arrangement subsequent to the selectors 4705 and 4706 shown in FIG. 30B in the 21st embodiment.

After all the quantized values in a subblock are input, $S_0$ to $S_{10}$, and $B_p$ to $B_{p+1}$ are respectively output from accumulators 4703$a$ to 4703$k$ and counters 4901$a$ to 4901$j$, and input to the selectors 4902 to 4905. The selector 4904 receives "0" instead of the Bo value for P=0.

The selectors 4902, 4903, 4904, and 4905 respectively select and output $S_p$, $S_{p+1}$, $B_p$ and $B_{p+1}$ in correspondence with the count value P of the up/down counter 4713.

The adders 4906 and 4907 add $S_p$, $S_{p+1}$, $B_p$, and $B_{p+1}$. The adder 4906 outputs $S_p + B_p$ (=$D_p$), whereas the adder 4907 outputs $S_{p+1} + B_{p+1}$ (=$D_{p+1}$). For P=0, $S_0 + 0 = S_0 (\geq N)$ is output as $D_0$.

In this manner, the difference values $D_p$ and $D_{p+1}$ of the variable-length code amount input to the comparators 4707 and 4708 are the same as in the arrangement shown in FIG. 30B in the 21st embodiment. For this reason, an optimal k parameter value can be finally output by the same operation as in the 21st embodiment.

In the arrangement shown in FIG. 32, the accumulator 4703$a$ for obtaining $S_0$ may be omitted, and the predetermined value N may be input to the selector 4902 in place of $S_0$.

As described above, the 22nd embodiment can determine an optimal k parameter value at a high speed by a simple arrangement as shown in FIG. 32.

<23rd Embodiment>

The 23rd embodiment according to the present invention will be described. The arrangement of a coding apparatus in the 23rd embodiment is the same as in FIG. 1.

In the 21st and 22nd embodiments, processing of obtaining an optimal k parameter value starts after all the quantized values in a subblock are input. This requires several clocks until an optimal k parameter value is obtained, and processing for the next subblock cannot quickly start.

To the contrary, in the 23rd embodiment, processing of obtaining an optimal k parameter value starts before all the quantized values in a subblock are input.

The 23rd embodiment uses the following property of the k parameter:

"An optimal k parameter is greatly influenced by the next input quantized value for a small number of input quantized values, but as the number of input quantized values increases, is hardly influenced by the next input quantized value."

Assume that the total number of quantized values in a subblock is 50. The k parameter value is originally obtained after all 50 quantized values are input. However, the 23rd embodiment interprets that all the quantized values have been input when, e.g., 40 quantized values are input, and starts processing of obtaining an optimal k parameter value. Hence, quantized values are sequentially input even during processing. Since processing of obtaining an optimal k parameter value is always done based on the latest updated information, the k parameter value converges to the latest information.

Even if an optimal k parameter value for 49 quantized value inputs is different by one from an optimal k parameter value for 50 quantized value inputs, this can be followed by one clock. An optimal k parameter value can, therefore, be obtained at the same time as the end of inputting all quantized values.

Figure 30C:
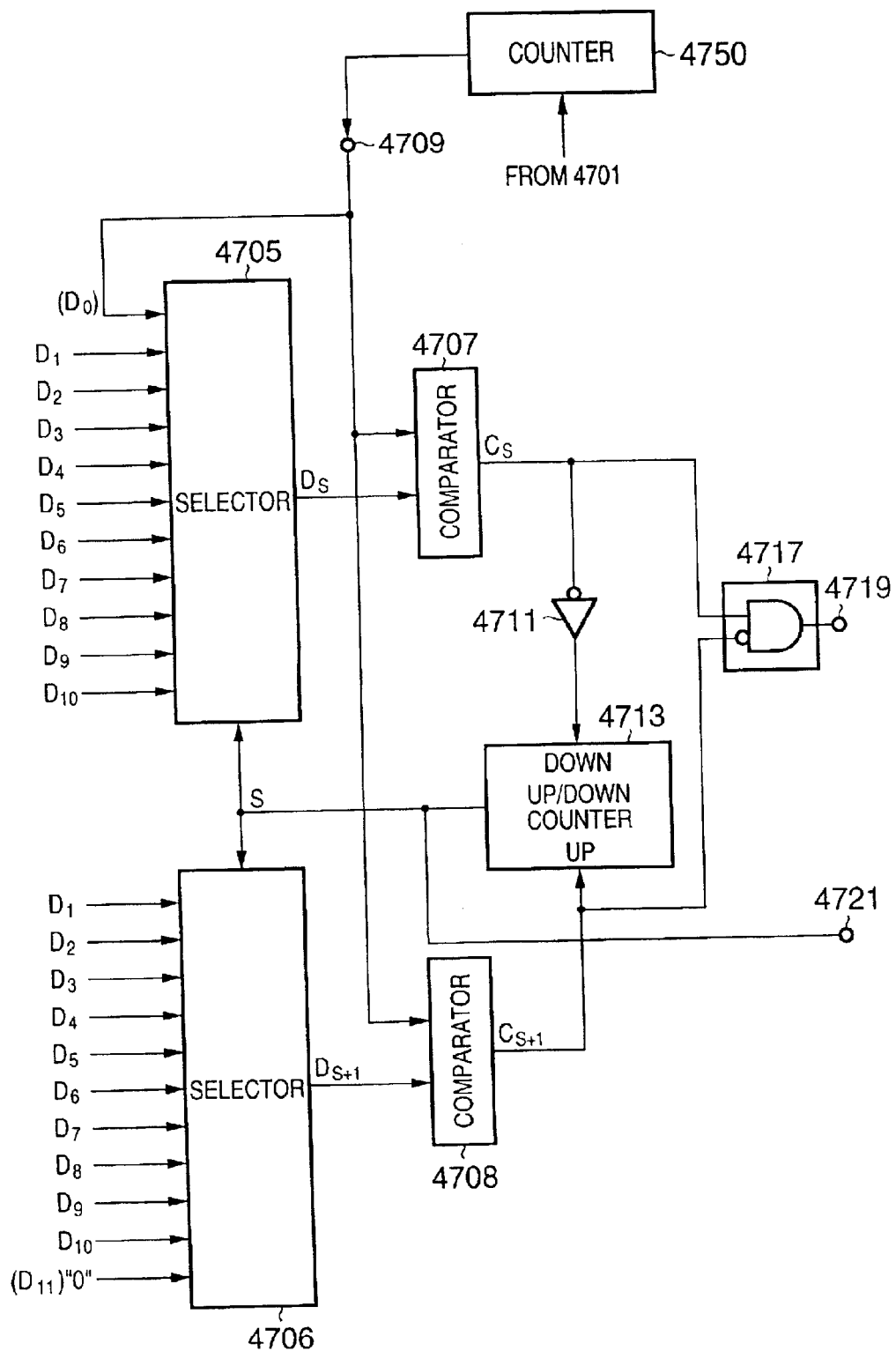
FIG. 30C is a block diagram showing the detailed arrangement of a coding parameter selection unit in the 23rd embodiment.

FIGS. 30A and 30C show the detailed arrangement of a coding parameter selection unit 105 in the 23rd embodiment. In FIG. 30C, the same reference numerals as in FIG. 30B described in the 21st embodiment denote the same parts, and a description thereof will be omitted.

To realize the above processing, the coding parameter selection unit 105 in the 23rd embodiment comprises a second counter 4750 for counting the number of input quantized values, in addition to the arrangements shown in FIGS. 30A and 30B. The value of the second counter 4750 is input to a terminal 4709 instead of "N", and fed back to an up/down counter 4713. Every time a quantized value is input, the count value of the up/down counter 4713 is controlled to come close to an optimal k parameter value at that time.

At various timings, holding of the initial value of the up/down counter 4713 can be canceled to shift processing to the above-described one. In the above example, holding of the initial value is canceled when 40 of all 50 quantized values are input. If holding of the initial value is set to be canceled when 32 quantized values are input, holding of the initial value is canceled at a timing at which the sixth-bit signal of the second counter 4750 changes to "1". This realizes simpler control.

As much simpler control, processing of obtaining an optimal k parameter value may start when the first quantized value is input without holding any initial value. Alternatively, setting of the initial value may be omitted.

Since processing more quickly shifts to the next subblock, the 23rd embodiment can determine an optimal k parameter value at a higher speed.

The control described in the 23rd embodiment can be applied to not only the arrangement shown in FIG. 30C, but also an arrangement using an up/down counter in each of the following embodiments.

<24th Embodiment>

The 24th embodiment according to the present invention will be described. The arrangement of a coding apparatus in the 24th embodiment is the same as in FIG. 1.

Figure 33:
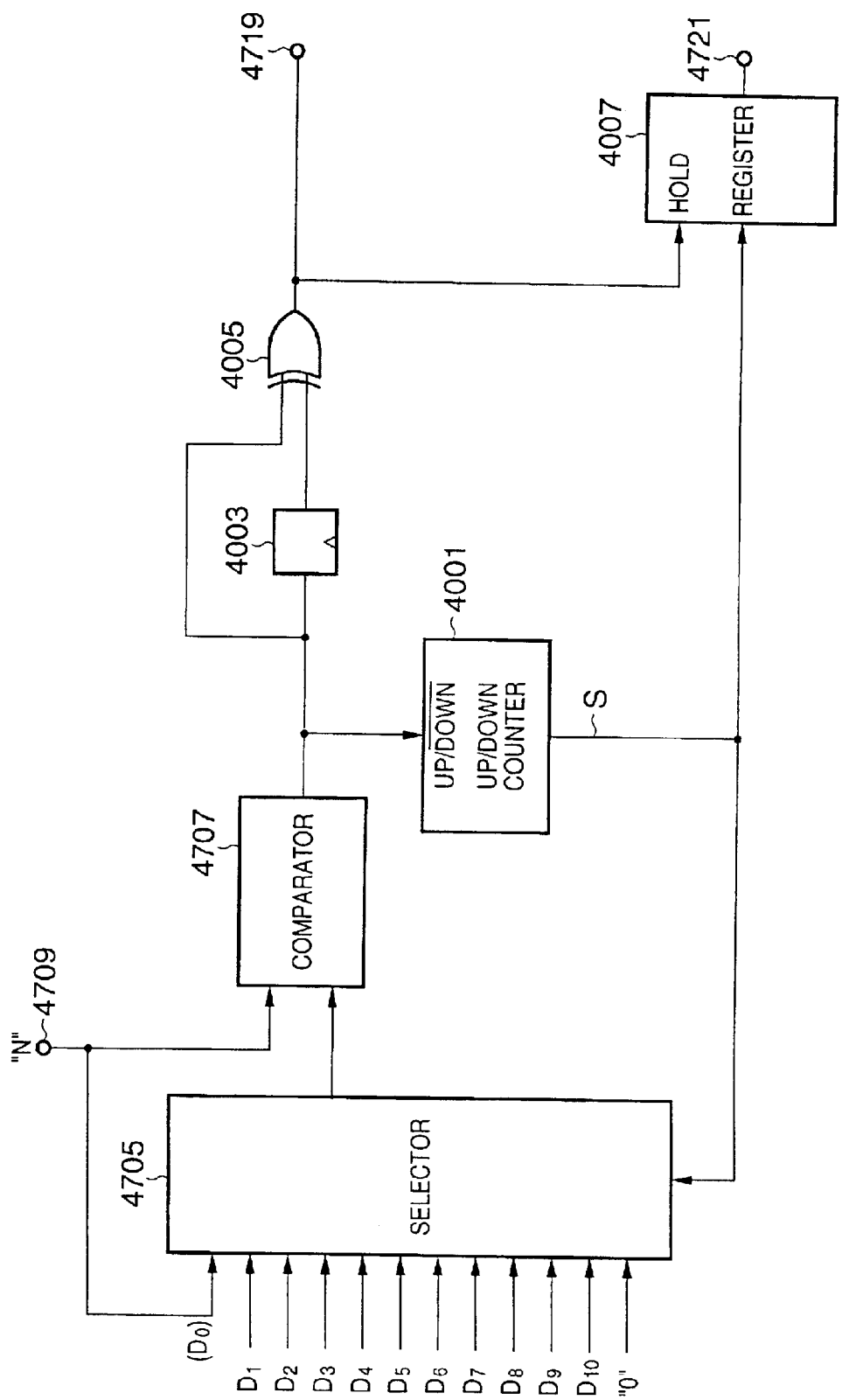
FIG. 33 is a block diagram showing the detailed arrangement of a coding parameter selection unit in the 24th embodiment.

FIGS. 30A and 33 show the detailed arrangement of a coding parameter selection unit 105 in the 24th embodiment. In FIG. 33, the same reference numerals as in FIG. 30B described in the 21st embodiment denote the same parts, and a description thereof will be omitted.

In the 21st to 23rd embodiments, the coding parameter selection unit 105 uses two comparators (4707, 4708). In the 24th embodiment, the coding parameter selection unit 105 comprises only one comparator 4707. In accordance with this, the coding parameter selection unit 105 comprises only one selector 4705.

In the arrangement having two comparators, the two comparators output the same value until the k parameter converges to an optimal value, as described in detail in the 21st embodiment. After the k parameter converges, an output from one comparator changes to "1", and an output from the other changes to "0". Therefore, this function can be sufficiently achieved by only one comparator until the k parameter converges.

However, one comparator cannot maintain the convergent state by the same method as in the 21st to 23rd embodiments. An optimal value determination method in the 24th embodiment will be described.

In FIG. 33, reference numeral 4001 denotes an up/down counter using a single control terminal for both count-up and count-down control terminals; 4003, a 1-bit D flip-flop (to be referred to as a D-FF hereinafter); 4005, an exclusive-OR element (to be referred to as an EXOR hereinafter); and 4007, a register.

In the 24th embodiment, N quantized values in a subblock are input to a terminal 4709, and the initial value of the up/down counter 4001 is "0". After all the N quantized values are input, processing of obtaining an optimal k parameter value starts. Similar to the 21st embodiment, assume that $D_1 \geq D_2 \geq D_3 \geq N > D_4 \geq D_5 \geq \ldots$ holds.

The value of the up/down counter 4001 is sent to a selector 4705. The selector 4705 outputs N input from the terminal 4709 as $D_0$ in correspondence with the count value. The output value $D_0$ from the selector 4705 is compared with the predetermined value N by the comparator 4707. Since $D_0 = N$, the comparator 4707 outputs "1".

The output from the comparator 4707 is sent to the 1-bit D-FF 4003, and at the same time, input to the count control terminal of the up/down counter 4001. The up/down counter 4001 enters the count-up mode in accordance with a control signal "1", and counts up a count value S from "0" to "1" based on a clock input (not shown).

For the count value=1, the selector 4705 outputs $D_1$. Since $D_1 \geq N$, the count value is counted up from "1" to "2", similar to the case of $D_0$. Also for the count value=2 and 3, the count value is counted up from "2" to "3" and from "3" to "4".

The count value S is also input to the register 4007, and the register 4007 receives and outputs the count value in synchronism with a clock input. For example, when the count value reaches "4", the register 4007 outputs "3" to a terminal 4721, and receives "4".

At this time (count value S=4), $D_4$ output from the selector 4705 satisfies $D_4 < N$, so that the output "1" from the comparator 4707 changes to "0". The EXOR 4005 detects this change, and sends a control signal "1" for keeping holding output data to the register 4007.

Since the output from the comparator 4707 changes to "0", the up/down counter 4001 enters the count-down mode, and counts down the count value from "4" to "3" based on a clock input (not shown). An output from the D-FF 4003 changes to "0".

When the count value of the up/down counter 4001 return to "3", an output from the comparator 4707 also returns to "1". However, an output from the EXOR 4005 remains "1", and thus an output from the register 4007 remains "3".

Then, the up/down counter 4001 enters the count-up mode again, and counts up the count value from "3" to "4". The subsequent count value alternately changes between "3" and "4".

Figure 34:
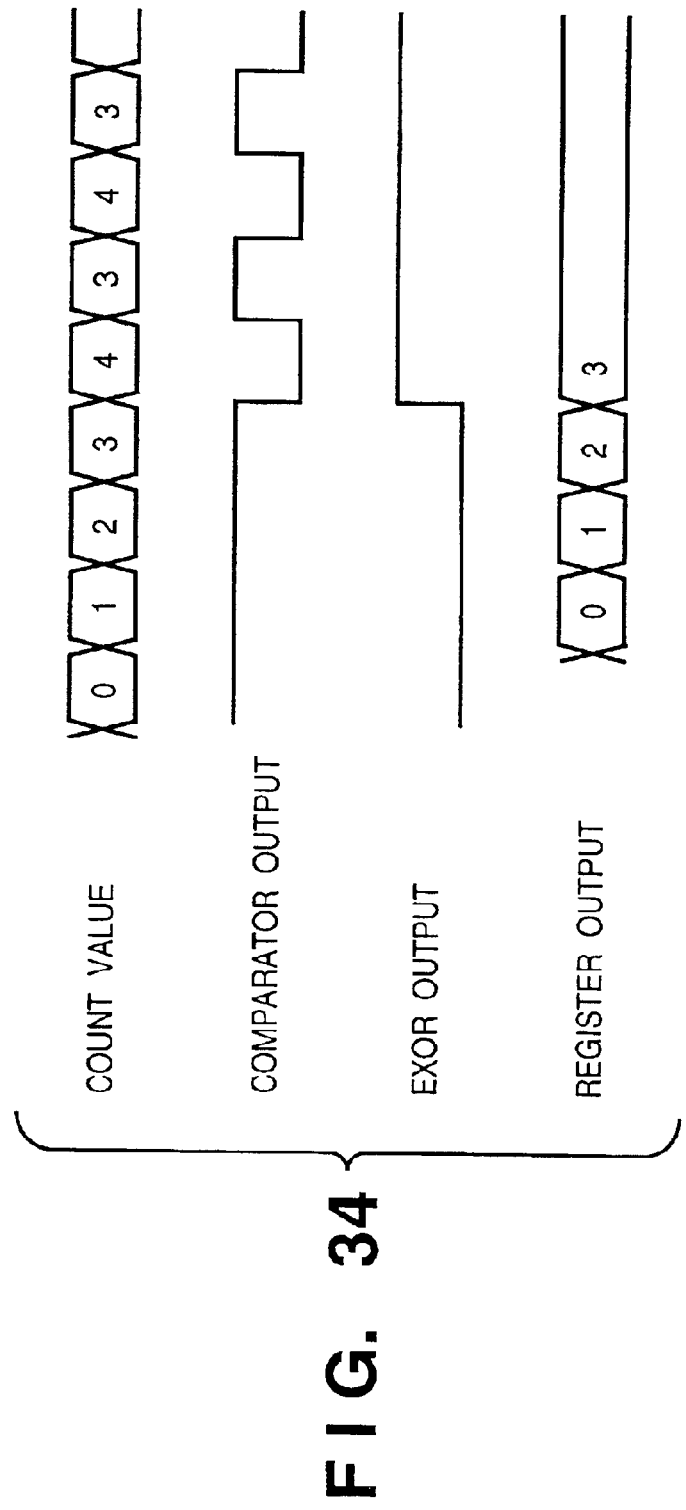
FIG. 34 is a timing chart in the arrangement shown in FIG. 33.

FIG. 34 is a timing chart in the arrangement shown in FIG. 33. In FIG. 34, the count value S, an output from the comparator 4707, an output from the EXOR 4005 and an output from the register 4007 are represented.

As shown in FIG. 34, an output from the EXOR 4005 changes to "1" to hold an output "3" from the register 4007 after a cycle in which an output from the comparator 4707 changes to "0" for the first time.

As described above, in the arrangement shown in FIG. 33, when the terminal 4719 serving as the output of the EXOR 4005 changes to "1", an optimal k parameter value is determined and obtained from the terminal 4721 serving as the output of the register 4007.

Even with a simpler arrangement having only one selector and one comparator as shown in FIG. 33, the 24th embodiment can determine an optimal k parameter value at a high speed.

<25th Embodiment>

The 25th embodiment according to the present invention will be described. The arrangement of a coding apparatus in the 25th embodiment is the same as in FIG. 1.

In the 24th embodiment, the initial value of the up/down counter 4001 is set to "0". In the 25th embodiment, the initial value of an up/down counter 4001 is set to "10" as the maximum candidate value of the k parameter.

Figure 35:
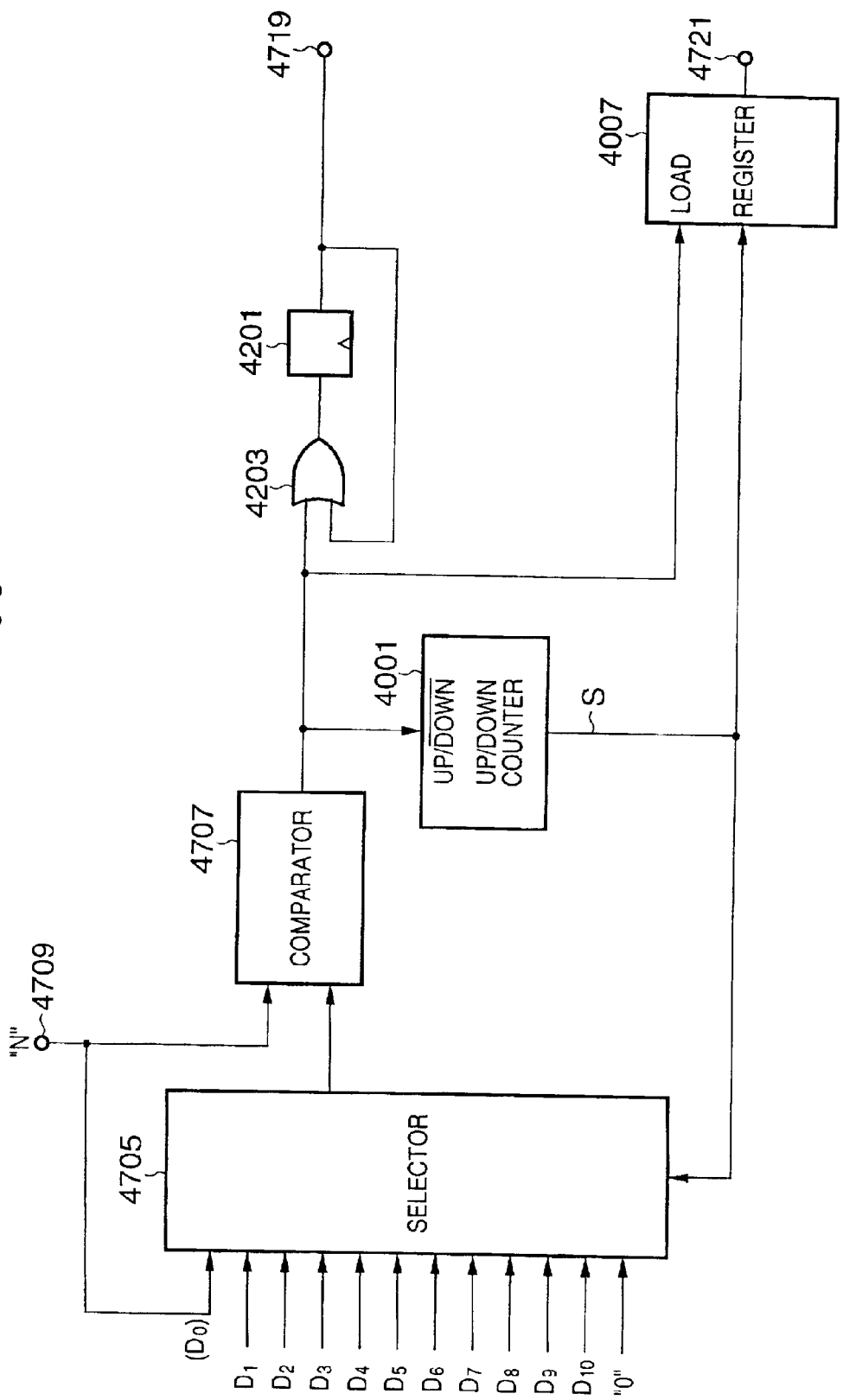
FIG. 35 is a block diagram showing the detailed arrangement of a coding parameter selection unit in the 25th embodiment.

FIGS. 30A and 35 show the detailed arrangement of a coding parameter selection unit 105 in the 25th embodiment. In FIG. 35, the same reference numerals as in FIG. 33 described in the 24th embodiment denote the same parts, and a description thereof will be omitted.

In FIG. 35, reference numeral 4201 denotes a D flip-flop (to be referred to as a D-FF hereinafter) having a reset function; 4203, a 2-input OR element (to be referred to an OR hereinafter); and 4205, a register for receiving input data for a control signal "1" and holding output data for "o".

Also in the 25th embodiment, N quantized values in a subblock are input to a terminal 4709, and processing of obtaining an optimal k parameter value starts after all the N quantized values are input. Similar to the 24th embodiment, assume that $D_1 \geq D_2 \geq D_3 \geq N > D_4 \geq D_5 \geq \ldots$ holds.

In the arrangement shown in FIG. 35, the up/down counter 4001 is initialized to "10", as described above. The D-FF 4201 is reset to "0" in accordance with a control signal (not shown).

The initial value "10" of the up/down counter 4001 is sent to a selector 4705, and the selector 4705 outputs $D_{10}$ corresponding to the initial value.

The output value $D_{10}$ from the selector 4705 is compared with the predetermined value N by a comparator 4707. Since $D_{10} < N$, the comparator 4707 outputs "0".

The output from the comparator 4707 is input to the OR 4203 and up/down counter 4001, and at the same time, supplied as a control signal to the register 4205. For a control signal "0", the register 4205 does not receive the count value S (input data) sent from the up/down counter 4001, and keeps holding a value which has been held. An output from the OR 4203 remains "0". The D-FF 4201 receives the same value "0" as an output from the D-FF 4201, and keeps outputting "0" in the next cycle.

The up/down counter 4001 enters the count-down mode in accordance with a control signal "0" input from the comparator 4707, and counts down the count value from "10" to "9" in synchronism with a clock input (not shown).

For the count value=9, the selector 4705 outputs $D_9$. Since $D_9 < N$, the up/down counter 4001 counts down the count value from "9" to "8", similar to the case of $D_{10}$. Also for the count value=8, 7, 6, 5, and 4, the up/down counter 4001 keeps counting down the count value up to "3". During this operation, outputs from the register 4205 and D-FF 4201 do not change.

When the count value of the up/down counter 4001 reaches "3", an output from the comparator 4707 changes to "1" for the first time. The comparison result is input to the OR 4203 and up/down counter 4001, and at the same time, supplied as a control signal to the register 4205. As a result, an output from the OR 4203 changes to "1", and the up/down counter 4001 enters the count-up mode. An output from the D-FF 4201 changes from "0" to "1" in synchronism with a clock input (not shown), and the counter counts up the count value to "4". The register 4205 receives and outputs the count value "3" in accordance with the comparison result "1" from the comparator 4707 serving as a control signal.

When the count value of the up/down counter 4001 returns to "4", an output from the comparator 4707 also returns to "0". Then, the up/down counter 4001 enters the count-down mode, and counts down the count value from "4" to "3" in synchronism with a clock input. The register 4205 changes to a holding state, and keeps outputting "3". An output from the OR 4203 remains "1", and an output from the D-FF 4201 also remains "1".

When the count value of the up/down counter 4001 reaches "3" again, an output from the comparator 4707 also changes to "1". Then, the up/down counter 4001 enters the count-up mode again, and counts up the count value from "3" to "4" in synchronism with a clock input. At this time, the register 4205 receives the same value as a value which has already been held, so an output from the register 4205 does not change. After that, the count value of the up/down counter 4001 alternately changes between "3" and "4".

Figure 36:
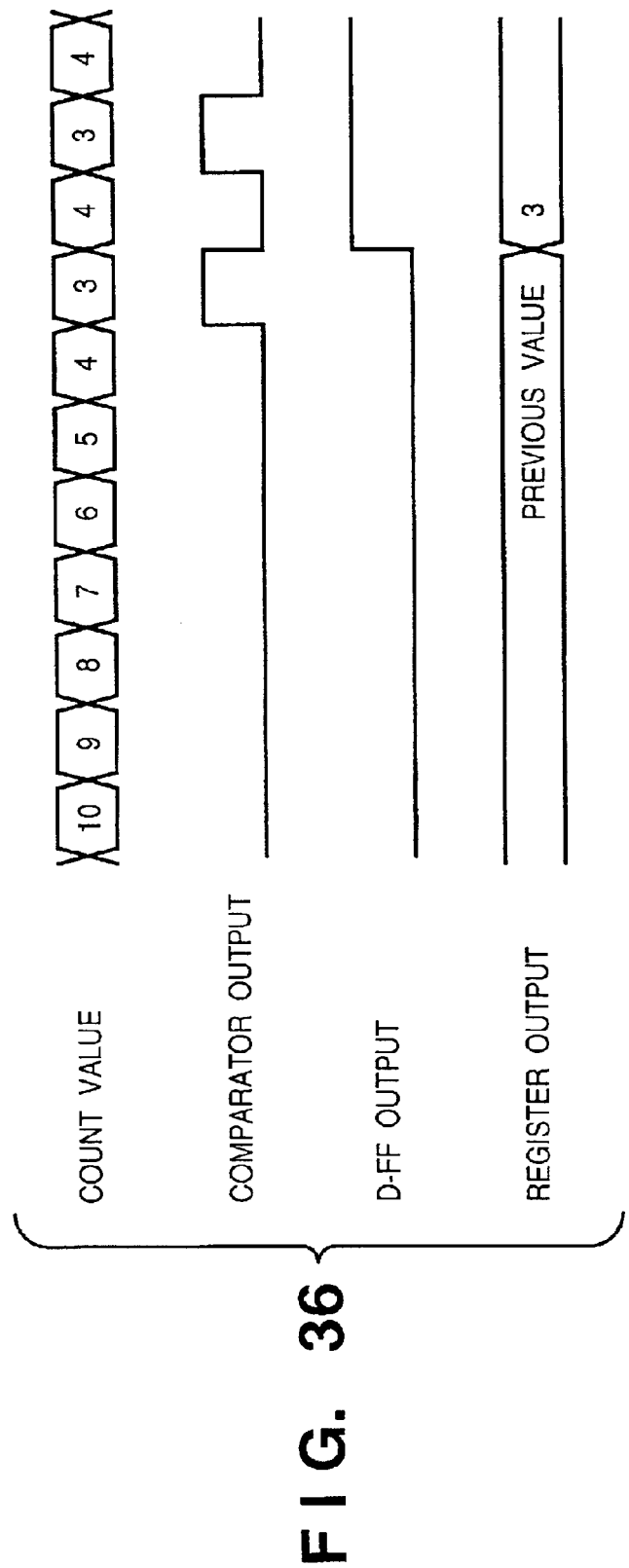
FIG. 36 is a timing chart in the arrangement shown in FIG. 35.

FIG. 36 is a timing chart in the arrangement shown in FIG. 35. In FIG. 36, the count value, an output from the comparator 4707, an output from the D-FF 4201 and an output from the register 4205 are represented.

As shown in FIG. 36, an output from the D-FF 4201 changes to "1" to hold an output value "3" from the register 4205 after a cycle in which an output from the comparator 4707 changes to "1" for the first time.

As described above, in the arrangement shown in FIG. 35, when a terminal 4719 serving as the output of the D-FF 4201 changes to "1", an optimal k parameter value is determined and obtained from a terminal 4721 serving as the output of the register 4205.

The 25th embodiment can determine an optimal k parameter value at a high speed while limiting the maximum candidate value of the k parameter by the initial value of the up/down counter.

<26th Embodiment>

The 26th embodiment according to the present invention will be described. The arrangement of a coding apparatus in the 26th embodiment is the same as in FIG. 1.

All the 21st to 25th embodiments adopt an up/down counter. The 26th embodiment adopts a down counter having no count-up mode. That is, the initial value of the down-counter is set to the maximum candidate value "10" of the k parameter. While the count value is counted down to "0", an optimal k parameter value is detected.

Figure 37:
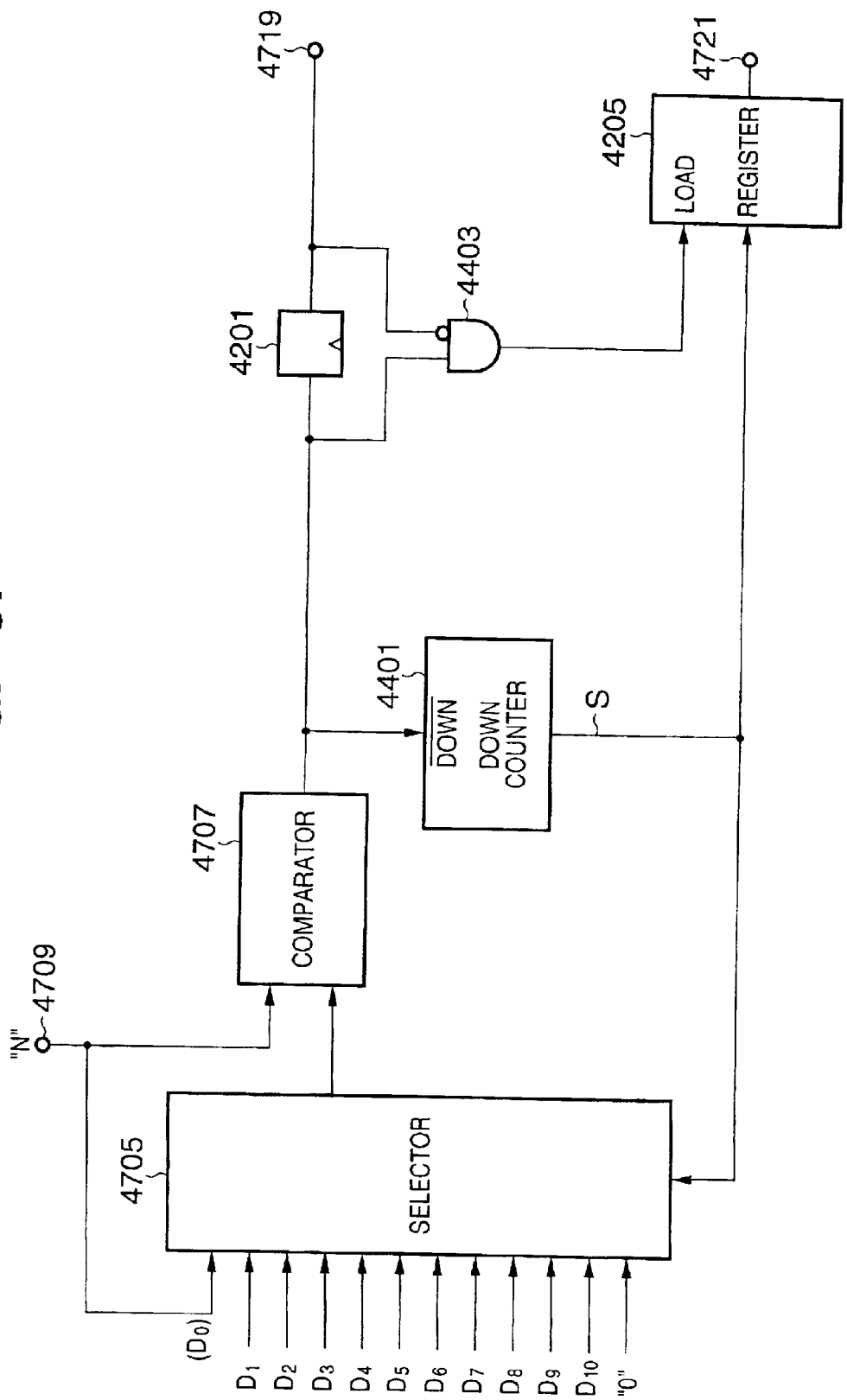
FIG. 37 is a block diagram showing the detailed arrangement of a coding parameter selection unit in the 26th embodiment.

FIGS. 30A and 37 show the detailed arrangement of a coding parameter selection unit 105 in the 26th embodiment. In FIG. 37, the same reference numerals as in FIG. 35 described in the 25th embodiment denote the same parts, and a description thereof will be omitted.

In FIG. 37, reference numeral 4401 denotes a down counter for only counting down the count value; and 4403, a detector for generating a control signal for causing a register 4205 to receive the count value of the down counter 4401.

Also in the 26th embodiment, N quantized values in a subblock are input to a terminal 4709, and processing of obtaining an optimal k parameter value starts after all the N quantized values are input. Similar to the 25th embodiment, assume that $D_1 \geq D_2 \geq D_3 \geq N > D_4 \geq D_5 \geq \ldots$ holds.

Similar to the 25th embodiment, the down counter 4401 is initialized to "10", and keeps counting down the count value up to "3".

When the count value of the down counter 4401 reaches "3", an output from a comparator 0.4707 changes to "1" for the first time. Then, the comparison result "1" and an output "0" from a D-FF 4201 are detected by the detector 4403, which supplies a detection result "1" as a control signal to the register 4205.

The register 4205 receives the control signal "1" as a load (register reception) signal, and receives and outputs the count value "3".

While a control signal from the comparator 4707 is "0", the down counter 4401 executes count-down operation. When the count value reaches "3", an output from the comparator 4707 changes to "1", and the down counter 4401 stops count operation. As a result, the count value is fixed to "3".

In a cycle in which the count value reaches "3" for the first time, an output from the detector 4403 is "1". In the next cycle, both input and output signals to and from the D-FF 4201 (two input signals to the detector 4403) change to "1", so that an output from the detector 4403 changes to "0".

An output from the register 4205 is also fixed to "3", which is output as an optimal k parameter value to a terminal 4721.

Figure 38:
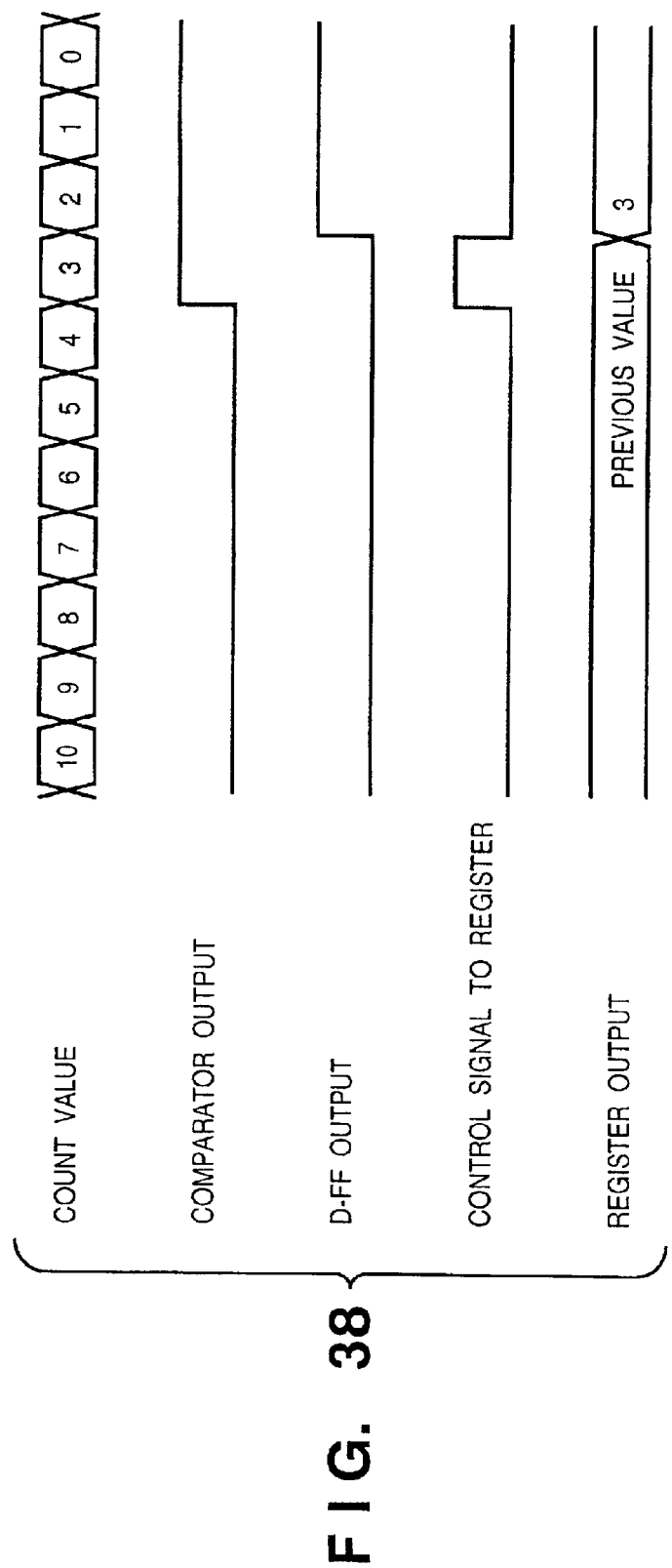
FIG. 38 is a timing chart in the arrangement shown in FIG. 37.

FIG. 38 is a timing chart in the arrangement shown in FIG. 37. In FIG. 38, the count value, an output from the comparator 4707, an output from the D-FF 4201, a control signal to the register 4205 and an output from the register 4205 are represented.

As shown in FIG. 38, an output from the register 4205 is determined at a timing at which an output from the D-FF 4201 changes from "0" to "1".

As shown in FIG. 35 in the 25th embodiment, if an output from the comparator 4707 changes to "1" even once, this value is held by the D-FF 4201. That is, the 2-input OR element (OR 4203 in FIG. 35) is arranged on the input side of the D-FF 4201 to hold a count value "3" in the down counter 4401. However, the down counter 4401 need not hold the count value "3", and can continue count-down operation. In this case, the comparator 4707 need not supply any control signal to the down counter 4401.

Even with an arrangement using the down counter, the 26th embodiment can determine an optimal k parameter value at a high speed.

<27th Embodiment>

The 27th embodiment according to the present invention will be described. The arrangement of a coding apparatus in the 27th embodiment is the same as in FIG. 1.

The 21st to 26th embodiments employ one or two pairs of selectors and comparators for comparing outputs from the selectors with a predetermined value. To the contrary, the 27th embodiment employs three pairs of selectors and comparators. By increasing the number of pairs of selectors and comparators, the 27th embodiment can search for an optimal k parameter value at a higher speed.

Figure 39:
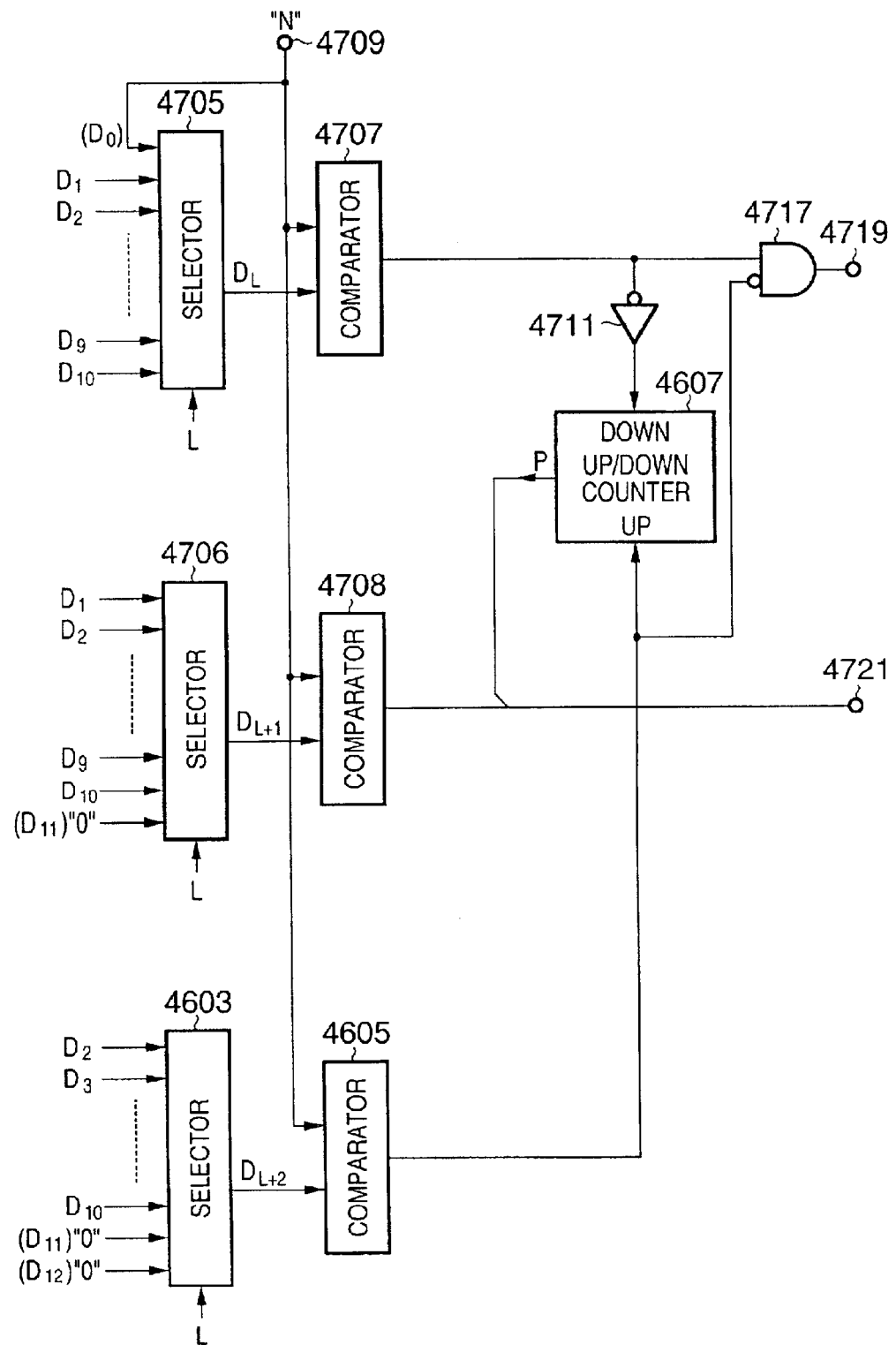
FIG. 39 is a block diagram showing the detailed arrangement of a coding parameter selection unit in the 27th embodiment.

FIGS. 30A and 39 show the detailed arrangement of a coding parameter selection unit 105 in the 27th embodiment. In FIG. 39, the same reference numerals as in FIG. 30B described in the 21st embodiment denote the same parts, and a description thereof will be omitted.

In FIG. 39, reference numeral 4603 denotes a third selector; 4605, a third comparator for comparing an output from the third selector 4603 with the predetermined value N; and 4607, an up/down counter constituted by omitting the least significant bit from the up/down counter 4713 shown in FIG. 30B.

In the 27th embodiment, two, logical value L and physical value P having a relation: L=P×2 must be recognized as the count value of the up/down counter 4607. The logical value L is limited to an even number. In count-up/count-down operation by the up/down counter 4607, the count value is physically counted up/down by one, which is logically interpreted to be counted up/down by two. The remaining basic operation is the same as in the 21st embodiment.

A first selector 4705, a second selector 4706, and the third selector 4603 select and output DL, $D_L$, $D_{L+1}$ and $D_{L+2}$ for the logical value L of the up/down counter 4607.

In the 27th embodiment, when an output from a first comparator 4707 changes to "1", and an output from the third comparator 4605 changes to "0", the operation of the up/down counter 4607 stops to determine an optimal k parameter value. If the logical value of the up/down counter 4607 at this time is T, the optimal k parameter value is T or T+1.

In determining an optimal k parameter value, the 27th embodiment takes two states in which an output from a second comparator 4708 is "0" and "1".

In the former, which is the same as in the 21st embodiment, the logical value T of the up/down counter 4607 is an optimal k parameter value. In the former state, the k parameter takes only an even number. However, in the latter, the k parameter takes an odd number.

In the latter, i.e., when an output from the second comparator 4708 is "1", the up/down counter 4713 is controlled to count up the count value in the 21st embodiment. From this, an optimal k parameter value becomes larger than the logical value of the up/down counter 4713. In the 27th embodiment, the optimal k parameter value is determined to be T+1 as far as the logical value of the up/down counter 4607 is T.

In the 27th embodiment, an output from the second selector 4706 is added to the least significant bit of the physical count value P output from the up/down counter 4607, thereby generating T+1 as an optimal k parameter value. This optimal value generation method is also applied to the former state, i.e., the case wherein an output from the comparator 4708 is "0".

In the arrangement shown in FIG. 39, the number of pairs of selectors and comparators is larger than in the arrangement in FIG. 30B described in the 21st embodiment. However, since the number of different output values from the selectors is halved, the circuit scale of each selector can be almost halved. In addition, the number of bits of the up/down counter 4607 is also decreased by one. Although the circuit scale seems to be large owing to a large number of building components, each building component is actually downsized. Further, the search time (the number of cycles) for an optimal k parameter value can be almost halved.

The 27th embodiment can determine an optimal k parameter value at a higher speed while reducing the circuit scale as a whole.

<28th Embodiment>

The 28th embodiment according to the present invention will be described. The arrangement of a coding apparatus in the 28th embodiment is the same as in FIG. 1.

The 27th embodiment comprises three pairs of selectors and comparators. The 28th embodiment comprises five pairs of selectors and comparators to search for an optimal k parameter value at a higher speed.

Figure 40:
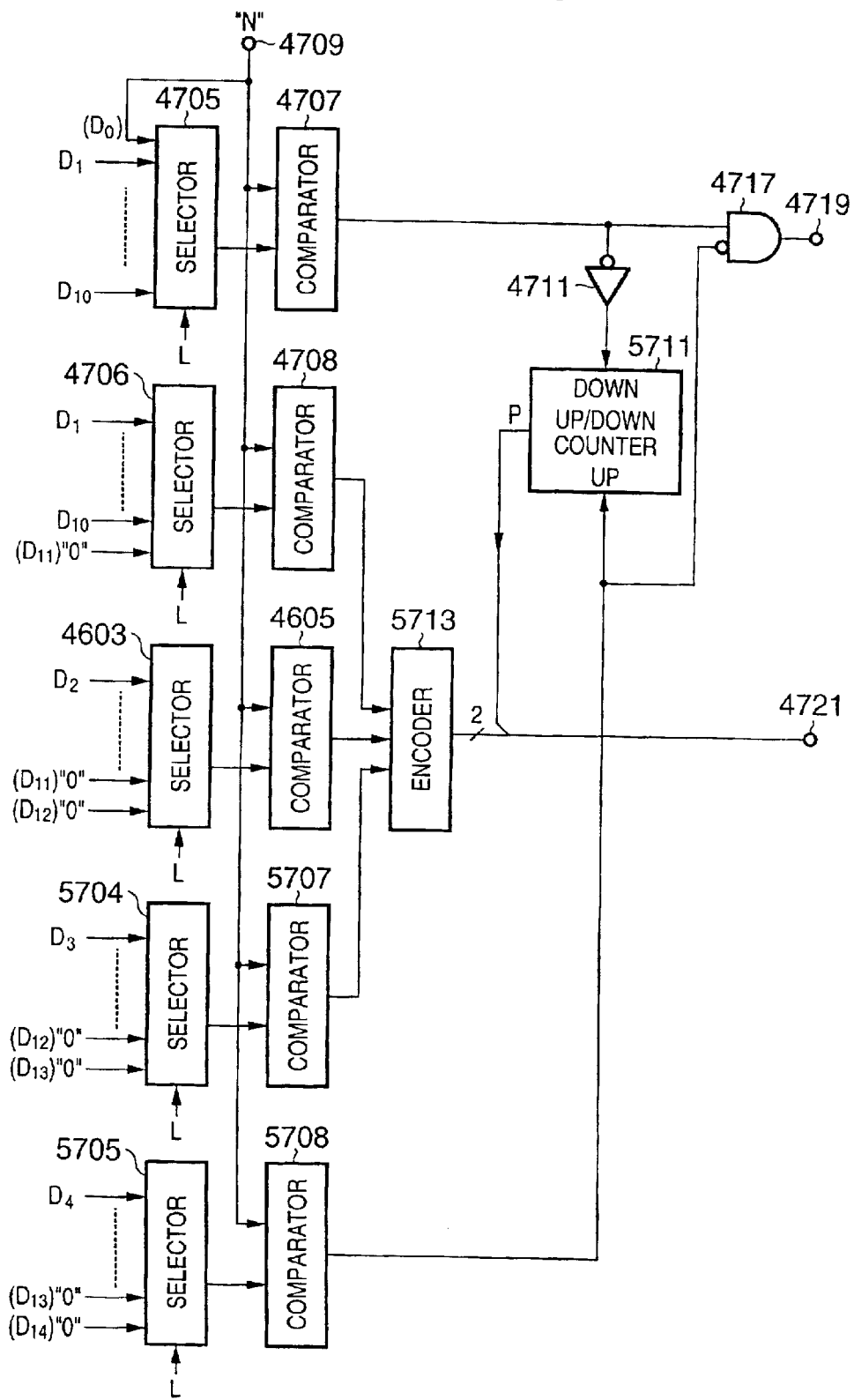
FIG. 40 is a block diagram showing the detailed arrangement of a coding parameter selection unit in the 28th embodiment.

FIGS. 30A and 40 show the detailed arrangement of a coding parameter selection unit 105 in the 28th embodiment. In FIG. 40, the same reference numerals as in FIG. 39 described in the 27th embodiment denote the same parts, and a description thereof will be omitted.

In FIG. 40, reference numeral 5704 denotes a fourth selector; 5705, a fifth selector; 5707, a fourth comparator for comparing an output value from the fourth selector 5704 with the predetermined value N; 5708, a fifth comparator for comparing an output value from the fifth selector 4705 with the predetermined value N; 5711, an up/down counter which is constituted by omitting the least significant bit from the up/down counter 4607 shown in FIG. 39, i.e., is smaller in number by 2 bits than the up/down counter 4713 shown in FIG. 30B in the 21st embodiment; and 5713, an encoder for encoding outputs from a second comparator 4708, a third comparator 4605, and the fourth comparator 5707 into 2-bit signals.

Also in the 28th embodiment, two, logical value L and physical value P having a relation: L=P×4 must be recognized as the count value of the up/down counter 5711. The logical value L is limited to a multiple of 4. In count-up/count-down operation by the up/down counter 5711, the count value is physically counted up/down by one, which is logically interpreted to be counted up/down by four. The remaining basic operation is the same as in the 27th embodiment.

A first selector 4705, a second selector 4706, a third selector 4603, the fourth selector 5704, and the fifth selector 5705 select and output $D_L$, $D_{L+1}$, $D_{L+2}$, $D_{L+3}$ and $D_{L+4}$ for the logical value L of the up/down counter 5711.

In the 28th embodiment, when an output from the first comparator 4707 changes to "1", and an output from the fifth comparator 4708 changes to "0", the operation of the up/down counter 5711 stops to determine an optimal k parameter value. If the logical value of the up/down counter 5711 at this time is T, the optimal k parameter value is T, T+1, T+2, or T+3.

In determining an optimal k parameter value, the 28th embodiment takes four states "000", "100", "110", and "111" as combinations of outputs from the second, third, and fourth comparators 4708, 4605, and 5707. In this case, the status "ABC" means that outputs from the second, third, and fourth comparators 4708, 4605, and 5707 are "A", "B", and "C", respectively.

The four k parameter values (T, T+1, T+2, and T+3) correspond to these four states. The encoder 5713 encodes the four states into 2-bit codes "00", "01", "10", and "11", and adds them as lower 2 bits to the physical count value P output from the up/down counter 5711 to generate an optimal k parameter value.

As described above, the 28th embodiment can search for an optimal k parameter value at a higher speed about twice the speed in the 27th embodiment and about four times the speed in the 21st embodiment. Note that the search speed can be further increased by increasing the numbers of selectors and comparators.

<29th Embodiment>

The 29th embodiment according to the present invention will be described. The arrangement of a coding apparatus in the 29th embodiment is the same as in FIG. 1.

Figure 41:
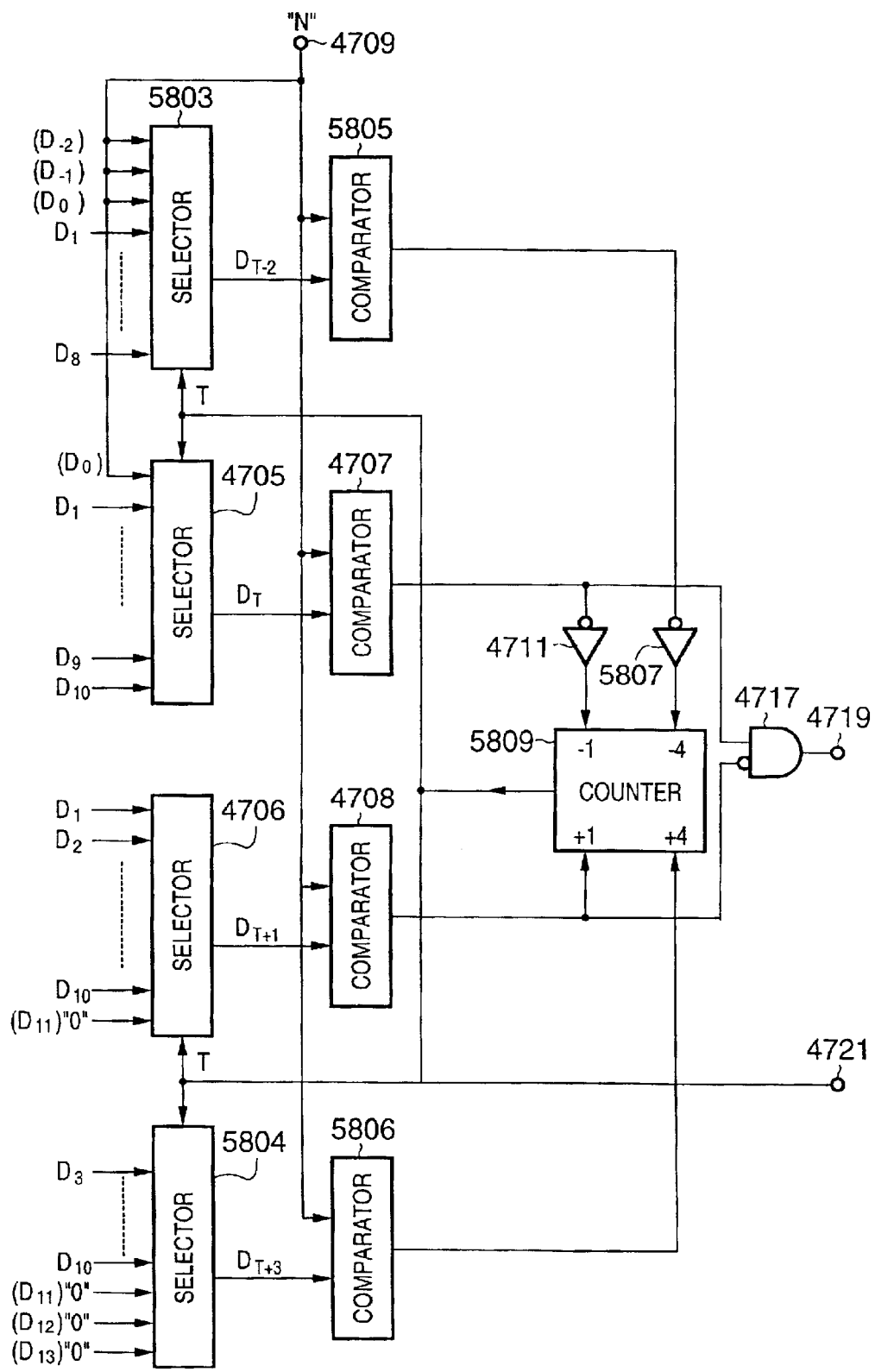
FIG. 41 is a block diagram showing the detailed arrangement of a coding parameter selection unit in the 29th embodiment.

FIGS. 30A and 41 show the detailed arrangement of a coding parameter selection unit 105 in the 29th embodiment. In FIG. 41, the same reference numerals in FIG. 30B described in the 21st embodiment denote the same parts, and a description thereof will be omitted.

In the 27th and 28th embodiments, the subscripts of D parameters (difference values of the variable-length code amount) output from the selectors are successive. In the 29th embodiment, the subscripts of D parameters are not successive. The 29th embodiment uses four pairs of selectors and comparators, and is characterized by D parameters output from the third and fourth selectors.

In FIG. 41, reference numeral 5803 denotes a third selector; 5804, a fourth selector; 5805, a third comparator for comparing an output value from the third selector 5803 with the predetermined value N; 5806, a fourth comparator for comparing an output value from the fourth selector with the predetermined value N; 5807, an inverter for inverting an output signal from the third comparator 5805; and 5809, a multi-mode up/down counter having a plurality of count modes.

The third and fourth selectors 5803 and 5804 select an d output $D_{T-2}$ and $D_{T+3}$ for the count value T of the up/down counter 5809. First and second selectors 4705 and 4706 select and output $D_T$ and $D_{T+1}$, similar to the 21st embodiment. The up/down counter 4809 is controlled by outputs from first and second comparators 4707 and 4708, similar to the 21st embodiment.

In the 29th embodiment, the count value of the up/down counter 5809 when outputs from the first and second comparators 4707 and 4708 change to "1" and "0" is determined as an optimal k parameter value.

Since $D_{T-2}<N$ is established when an output from the third comparator 5805 is "0", the optimal k parameter value is smaller by three or more than the current count value T of the up/down counter 5809.

Since $D_{T+3} \geqq N$ is established when an output from the fourth comparator 5806 is "1", the optimal k parameter value is larger by three or more than the current count value T of the up/down counter 5809.

For this reason, the 29th embodiment controls the up/down counter 5809 to count down the count value by four when an output from the third comparator 5805 is "0", and to count up the count value by four when an output from the fourth comparator 5806 is "1". By controlling the count value±4 in this manner, the count value may be counted up/down excessively by one. In this case, the count of the up/down counter 5809 is returned by one on the basis of outputs from the first and second comparators 4707 and 4708 to determine the count value.

That is, the 29th embodiment controls the up/down counter 5809 by ±4, and by ±1 for a precise value, thereby converging the count value to an optimal k parameter value at a higher speed.

FIG. 42 shows the count amount of the up/down counter 4809 for output signals from the four comparators 5805, 4707, 4708, and 5806 shown in FIG. 41. As shown in FIG. 42, the count amount of the up/down counter 5809 is controlled in accordance with an output from each comparator. Note that FIG. 42 merely shows an example of count control. For example, the count amount may be +3 and −3 or +5 and −5, instead of +4 and −4.

The arrangement shown in FIG. 41 in the 29th embodiment is not limited to four pairs of selectors and comparators, and can be easily applied to three pairs or five or more pairs of selectors and comparators.

As described above, the 29th embodiment can determine an optimal k parameter value at a higher speed by controlling the count amount of the up/down counter.

[Other Embodiment]

Each embodiment adopts the arrangement in FIG. 1, but processing in FIG. 1 can be realized by a program.

Since a device for inputting an image may be a network, video camera, image scanner, or storage device (floppy disk or the like), the present invention can be applied to a system or general-purpose information processing apparatus (personal computer or the like) having any one of them.

Hence, the object of the present invention is achieved even by supplying a storage medium (or recording medium) storing software program codes for realizing the functions of the above-described embodiments to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As has been described above, the present invention can easily perform variable-length coding for a multilevel image at a high speed.

As many apparently widely different embodiments of the present invention can be made without departing from the spirit and scope thereof, it is to be understood that the invention is not limited to the specific embodiments thereof except as determined in the appended claims.

What is claimed is:

1. A computer implemented coding method of coding a symbol set at a variable-length code portion and a fixed-length code portion on the basis of a parameter, comprising the step of:

evaluating a code amount at the variable-length code portion for respective values of the parameter, thereby determining an optimal value of the parameter, wherein the optimal value of the parameter is a parameter value that minimizes a sum amount of the code amount at the variable-length code portion and that at the fixed-length code portion.

2. The computer implemented method according to claim 1, further comprising the step of comparing a code amount difference value between the parameters with a predetermined value in evaluating the code amount at the variable-length code portion.

3. The computer implemented method according to claim 2, wherein the code amount difference value at the variable-length code portion is a difference value when values of the parameter are different by one.

4. The computer implemented method according to claim 2, wherein the code amount difference value at the variable-length code portion is a difference value when values of the parameter are different by at least two.

5. The computer implemented method according to claim 2, further comprising the step of calculating the code amount difference value at the variable-length code portion using information representing the number of "1"s in each bit place of a symbol set to be coded.

6. The computer implemented method according to claim 2, further comprising the step of comparing a difference value stream of code amount difference values at the variable-length code portion arranged in an ascending or descending order of parameter values with the predetermined value sequentially from an end.

7. The computer implemented method according to claim 6, further comprising the step of determining a subsequent comparison order on the basis of a comparison result between an intermediate value of the difference value stream and the predetermined value.

8. The computer implemented method according to claim 1, wherein the parameter represents a code length at the fixed-length code portion.

9. The computer implemented method according to claim 8, further comprising the step of performing Golomb Rice coding for the symbol set on the basis of the parameter.

10. The computer implemented method according to claim 1, wherein the symbol set corresponds to a subblock obtained by performing wavelet transformation for multi-level image data.

11. The computer implemented method according to claim 2, wherein the predetermined value corresponds to the number of symbols in the symbol set.

12. A coding apparatus having coding means for coding a symbol set at a variable-length code portion and a fixed-length code portion on the basis of a parameter, comprising:

difference means for calculating code amount difference values at the variable-length code portion between parameter values different by one;

comparison means for comparing the plurality of difference values with a predetermined value; and determination means for determining a parameter value applied to coding on the basis of a comparison result.

13. The apparatus according to claim 12, wherein said determination means obtains the parameter by transforming a plurality of comparison results by said comparison means.

14. The apparatus according to claim 12, wherein said difference means comprises:

accumulation means for parallel-accumulating the symbol set in accordance with a digit position; and subtraction means for performing subtraction between a plurality of accumulation results.

15. The apparatus according to claim 14, wherein said subtraction means parallel-performs necessary subtraction processing by a plurality of subtracters.

16. The apparatus according to claim 14, wherein said subtraction means sequentially performs subtraction processing by a single subtracter.

17. The apparatus according to claim 12, wherein said difference means comprises:

subtraction means for subtracting the symbol set between digit positions; and accumulation means for accumulating subtraction results.

18. The apparatus according to claim 12, wherein said difference means comprises:

bit addition means for adding 1-bit data to the symbol set for each digit; and accumulation means for accumulating values for the digit position subjected to bit addition.

19. The apparatus according to claim 12, wherein said subtraction means comprises accumulation means for accumulating the symbol set for each digit position, and said accumulation means comprises a full adder having a 1-bit carry input function.

20. The apparatus according to claim 12, wherein said subtraction means comprises:

accumulation means for accumulating the symbol set for each digit position;

count means for counting the number of predetermined values for each digit position of the symbol set; and first addition means for adding an accumulated value and a count value.

21. The apparatus according to claim 20, wherein the apparatus further comprises:

multiplication means for multiplying the accumulated value of said accumulation means by a predetermined number of times; and second addition means for adding the accumulated value of said accumulation means, the count value of said count means, and an accumulated value multiplied by the predetermined number of times by said multiplication means, and said accumulation means accumulates the symbol set for each of predetermined digit position, and applies said second addition means to digit positions other than the predetermined digit positions.

22. The apparatus according to claim 12, wherein said comparison means parallel-performs necessary comparison processing by a plurality of comparators.

23. The apparatus according to claim 12, wherein said comparison means sequentially performs comparison processing by a single comparator.

24. The apparatus according to claim 12, wherein said determination means comprises a priority encoder.

25. The apparatus according to claim 12, wherein said determination means comprises a counter.

26. The apparatus according to claim 12, wherein the parameter represents a code length at the fixed-length code portion.

27. The apparatus according to claim 26, wherein said coding means performs Golomb Rice coding.

28. The apparatus according to claim 12, wherein said determination means determines a parameter value that minimizes a sum amount of the code amount at the variable-length code portion and that at the fixed-length code portion.

29. The apparatus according to claim 12, wherein the symbol set corresponds to a subblock obtained by performing wavelet transformation for multilevel image data.

30. The apparatus according to claim 12, wherein the predetermined value in said comparison means corresponds to the number of symbols in the symbol set.

31. A coding apparatus having coding means for coding a symbol set at a variable-length code portion and a fixed-length code portion on the basis of a parameter, comprising:

count means for counting the number of "1"s for each bit plane of the symbol set;

difference means for calculating, based on a count value of said count means, a code amount difference value at the variable-length code portion between parameter values different by one;

comparison means for comparing the difference value with a predetermined value; and generation means for generating a parameter applied to coding in said coding means on the basis of a comparison result.

32. The apparatus according to claim 31, wherein said generation means comprises a counter for performing count operation on the basis of the comparison result of said comparison means.

33. The apparatus according to claim 31, wherein said difference means comprises:

accumulation means for obtaining an accumulated value for a predetermined bit plane of the symbol set; and recursive calculation means for sequentially adding count values of said count means for respective bit planes to the accumulated value, thereby recursively obtaining accumulated values for the respective bit planes.

34. The apparatus according to claim 33, wherein said difference means comprises a plurality of pairs of accumulation means and recursive calculation means.

35. The apparatus according to claim 33, wherein said difference means comprises a plurality of recursive calculation means.

36. The apparatus according to claim 33, wherein said recursive calculation means performs either of addition and subtraction on the basis of the comparison result of said comparison means.

37. The apparatus according to claim 31, wherein said difference means calculates the code amount difference value at the variable-length code amount between parameter values different by one, at a predetermined interval between the parameter values.

38. The apparatus according to claim 31, wherein the parameter represents a code length at the fixed-length code portion.

39. The apparatus according to claim 38, wherein said coding means performs Golomb Rice coding.

40. The apparatus according to claim 31, wherein said determination means determines a parameter value that minimizes a sum amount of the code amount at the variable-length code portion and that at the fixed-length code portion.

41. The apparatus according to claim 31, wherein the symbol set corresponds to a subblock obtained by performing wavelet transformation for multilevel image data.

42. The apparatus according to claim 31, wherein the predetermined value in said comparison means corresponds to the number of symbols in the symbol set.

43. A coding apparatus having coding means for coding a symbol set at a variable-length code portion and a fixed-length code portion on the basis of a parameter, comprising:

difference means for calculating a code amount difference value at the variable-length code portion between parameter values different by one;

comparison means for comparing the difference value with a predetermined value; and generation means for performing count operation based on a comparison result, thereby generating a parameter applied to coding in said coding means.

44. The apparatus according to claim 43, wherein said generation means comprises a counter for performing count-up operation or count-down operation on the basis of the comparison result of said comparison means.

45. The apparatus according to claim 43, wherein said difference means comprises:

accumulation means for parallel-accumulating the symbol set for respective bit planes to obtain a plurality of accumulated values; and subtraction means for parallel-performing subtraction between the plurality of accumulated values to output a plurality of difference values.

46. The apparatus according to claim 45, wherein the apparatus further comprises selection means for selecting a specific difference value from the plurality of difference values on the basis of a count value of said generation means, and said comparison means compares the difference value selected by said selection means with the predetermined value.

47. The apparatus according to claim 43, wherein said difference means comprises:

accumulation means for parallel-accumulating the symbol set for respective bit planes to obtain a plurality of accumulated values;

selection means for selecting a predetermined number of specific accumulated values from the plurality of accumulated values on the basis of a count value of said generation means; and subtraction means for performing subtraction between the selected specific accumulated values to output the difference value.

48. The apparatus according to claim 43, wherein said difference means comprises:

accumulation means for accumulating the symbol set for each bit plane;

count means for counting the number of "1"s for each bit plane of the symbol set; and addition means for adding an accumulated value of said accumulation means and a count value of said count means to output the difference value.

49. The apparatus according to claim 43, wherein the apparatus further comprises count means for counting the number of symbols input to said difference means, and said comparison means uses a count value of count means as the predetermined value.

50. The apparatus according to claim 43, wherein the apparatus further comprises holding means for holding the parameter generated by said generation means on the basis of the comparison result of said comparison means, and said comparison means comprises one comparator.

51. The apparatus according to claim 50, wherein said generation means sets an initial count value based on the comparison result to a maximum candidate value of the parameter.

52. The apparatus according to claim 51, wherein said generation means comprises a down counter for performing count-down operation on the basis of the comparison result of said comparison means.

53. The apparatus according to claim 46, wherein the apparatus further comprises at least three pairs of selection means and comparison means, and said generation means omits a lower bit of the parameter to generate a parameter, adds the comparison result of said comparison means to a lower bit of the generated parameter, and outputs the generated parameter.

54. The apparatus according to claim 43, wherein said generation means comprises an up/down counter for controlling a count amount of count-up operation or count-down operation on the basis of the comparison result of said comparison means.

55. The apparatus according to claim 43, wherein the parameter represents a code length at the fixed-length code portion.

56. The apparatus according to claim 55, wherein said coding means performs Golomb Rice coding.

57. The apparatus according to claim 43, wherein said determination means determines a parameter value that minimizes a sum amount of the code amount at the variable-length code portion and that at the fixed-length code portion.

58. The apparatus according to claim 43, wherein the symbol set corresponds to a subblock obtained by performing wavelet transformation for multilevel image data.

59. The apparatus according to claim 43, wherein the predetermined value in said comparison means corresponds to the number of symbols in the symbol set.

* * * * *

UNITED STATES PATENT AND TRADEMARK OFFICE
CERTIFICATE OF CORRECTION

PATENT NO. : 6,865,299 B1
APPLICATION NO. : 09/618461
DATED : March 8, 2005
INVENTOR(S) : Tadayoshi Nakayama It is certified that error appears in the above-identified patent and that said Letters Patent is hereby corrected as shown below:

COLUMN 1:

Line 11, "contain" should read --contains--.≪

COLUMN 2:

Line 56, "Embodiment;" should read --embodiment;--; and
Line 64, "Embodiment;" should read --embodiment;--.

COLUMN 3:

Line 3, "Embodiment;" should read --embodiment;--; and
Line 6, "Embodiment;" should read --embodiment;--.

COLUMN 5:

Line 17, "be" should be deleted;
Line 47, (close up right margin); and
Line 48, (close up left margin).

COLUMN 6:

Line 49, "amount-increases" should read --amount increases--.

COLUMN 7:

Line 31, "$D_{p-1}, D_{p+1},$" should read --$D_{p-1}, D_p, D_{p+1},$--;
Line 46, "$D_{1+1}=N,$" should read --$D_{a+1}=N,$--;
Line 60, "nd" should read --and--; and
Line 64, "$Da \geq N \geq D_{1+1}$" should read --$Da \geq N \geq D_{a+1}$--.

COLUMN 8:

Line 6, "searing" should read --searching--.

COLUMN 10:

Line 7, "$S_{p-1},$" should read --$S_{p-1}$--;
Line 30, "$S_{p-1}1=2xS_p+B_p,$" should read --$S_{p-1}=2xS_p+B_p$--; and
Line 45, "$S, < N$" should read --$S_i < N$--;

UNITED STATES PATENT AND TRADEMARK OFFICE
CERTIFICATE OF CORRECTION

PATENT NO. : 6,865,299 B1
APPLICATION NO. : 09/618461
DATED : March 8, 2005
INVENTOR(S) : Tadayoshi Nakayama It is certified that error appears in the above-identified patent and that said Letters Patent is hereby corrected as shown below:

COLUMN 11:

Line 61, "SN" should read --$SN_i$--; and
Line 67, "(YESin" should read --YES in--.

COLUMN 12:

Line 55, "step S1504," should read --step S1504),--.

COLUMN 13:

Line 49, "i to o" should read --i to O--;
Line 53, "to o" should read --to O--; and
Line 59, "i-i" should read --i -1--.

COLUMN 14:

Line 15, "$S_{p-1}$," should read --$S_{p-1}$--; and
Line 19, "$C_p = O$ : for $D_p > N$" should read --$C_p = O$ : for $D_p > N$ . . . (9)--.

COLUMN 15:

Line 45, "703c," should read --703c . . . .--.

COLUMN 18:

Line 17, "$S_p 32\ 2xS_{p+1}{}^+ B_{9+1}$" should read --$Sp = 2xS_{p+1}{}^+ B_{p+1}$--.

COLUMN 19:

Line 52, "$C_p = 1$" should read --$C_1 = 1$--.

COLUMN 20:

Line 44, "and B," should read --and $B_1$.--.

UNITED STATES PATENT AND TRADEMARK OFFICE
CERTIFICATE OF CORRECTION

PATENT NO.       : 6,865,299 B1
APPLICATION NO.  : 09/618461
DATED            : March 8, 2005
INVENTOR(S)      : Tadayoshi Nakayama It is certified that error appears in the above-identified patent and that said Letters Patent is hereby corrected as shown below:

COLUMN 21:

Line 22, "18$^{th}$ embodiment" (second occurrence) should read --present invention--.
    Line 38, "$S_p = 2xS_{p+}{}^{+} B_{p+1}$" should read -- $S_p = 2xS_{p+1}{}^{+} B_{p+1}$ --;
    Line 39, "$S_{p+1}{}^{+} (S_p{}^{-} B_{p+1})/2$" should read --$S_{p+1} = (S_p{}^{-} B_{p+1})/2$--; and

COLUMN 22:

Line 13, "$C_8 C_9$," should read --$C_8, C_9$,--.

COLUMN 23:

Line 10, "$D_1$" should read --$D_5$--;
    Line 28, "$B_3, B_1$," should read --$B_3, B_2$,--; and
    Line 39, "$C_5$" (first occurrence) should read --$C_5$.--.

COLUMN 24:

Line 5, "signal" should read --signal "1".--; and
    Line 28, "routs" should read --routes--.

COLUMN 25:

Line 8, "$B_p$" should read --$B_{p-1}$--.

COLUMN 27:

Line 9, "and" (first occurrence) should read --and second--;
    Line 57, "$D_{10}$," (first occurrence) should read --$D_{10}$--; and
    Line 66, "$D_1$" should read --$D_9$--.

UNITED STATES PATENT AND TRADEMARK OFFICE
CERTIFICATE OF CORRECTION

PATENT NO. : 6,865,299 B1
APPLICATION NO. : 09/618461
DATED : March 8, 2005
INVENTOR(S) : Tadayoshi Nakayama It is certified that error appears in the above-identified patent and that said Letters Patent is hereby corrected as shown below:

COLUMN 28:

Line 38, "parameter. < Modification"
    should read --parameter. ¶ < Modification--.
Line 49, "$S_{p-1}$" (second occurrence) should read --$S_{p+1}$--;
Line 51, "$S_{p-1}$" (second occurrence) should read --$S_{p+1}$--;
Line 53, "$D_{9-1}$" should read --$D_{p+1}$--; and
Line 67, "$D_{p+1}$," should read $D_{p+1}$--.

COLUMN 29:

Line 4, "$D_p = S_{p+1} - S_p = (2xSp+Bp) - S_p = S_p + B_p \ (p \geq 1)$"
    should read --$D_p = S_{p-1} - S_p = (2xS_p + B_p) - S_p = S_p + B_p \ (p \geq 1)$--;
Line 7, "$B_2 \ B_3$," should read --$B_2, B_3$,--;
Line 17, "$B_p$" should read --$B_p$,--;
Line 18, "$D_{9+1}$" should read --$D_{p+1}$--;
Line 23, "$S_{10}$, and $B_p$ to $B_{p+1}$" should read --$S_{10}$ and $B_1$ to $B_{10}$--; and
Line 26, "BO value" should read --$B_O$ value--.

COLUMN 31:

Line 24, "value" should read --value "O".--; and
Line 54, "return" should read --returns--.

COLUMN 32:

Line 27, "an" should read --as--; and
Line 29, ""o"." should read --"O".--.

UNITED STATES PATENT AND TRADEMARK OFFICE
CERTIFICATE OF CORRECTION

PATENT NO. : 6,865,299 B1
APPLICATION NO. : 09/618461
DATED : March 8, 2005
INVENTOR(S) : Tadayoshi Nakayama It is certified that error appears in the above-identified patent and that said Letters Patent is hereby corrected as shown below:

COLUMN 33:

Line 62, "4401." should read --4401.--.

COLUMN 34:

Line 4, "O.4707" should read --4707--.

COLUMN 35:

Line 10, "output DL," should read --output--.

COLUMN 36:

Line 27, "$D_{L+3}$" should read --$D_{L+3}$,--.

COLUMN 37:

Line 12, "an d" should read --and--; and
Line 36, "value ± 4" should read --value ±4--.

Signed and Sealed this

Eighth Day of January, 2008

JON W. DUDAS
*Director of the United States Patent and Trademark Office*